(12) United States Patent
Ghimire et al.

(10) Patent No.: US 12,464,490 B2
(45) Date of Patent: Nov. 4, 2025

(54) UPLINK UE POSITIONING

(71) Applicant: Fraunhofer-Gesellschaft zur Förderung der angewandten Forschung e.V., Munich (DE)

(72) Inventors: Birendra Ghimire, Erlangen (DE); Mohammad Alawieh, Erlangen (DE); Ernst Eberlein, Großenseebach (DE); Norbert Franke, Erlangen (DE); Mohammad Momani, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 238 days.

(21) Appl. No.: 18/065,767

(22) Filed: Dec. 14, 2022

(65) Prior Publication Data

US 2023/0111603 A1    Apr. 13, 2023

Related U.S. Application Data

(63) Continuation of application No. PCT/EP2021/065700, filed on Jun. 10, 2021.

(30) Foreign Application Priority Data

Jun. 17, 2020 (EP) .................................. 20180582

(51) Int. Cl.
*H04W 64/00* (2009.01)
*G01S 5/00* (2006.01)
(Continued)

(52) U.S. Cl.
CPC ......... *H04W 64/003* (2013.01); *G01S 5/0036* (2013.01); *G01S 5/0205* (2013.01);
(Continued)

(58) Field of Classification Search
CPC ... H04W 64/00; H04W 64/003; H04W 24/08; H04W 24/10; H04W 16/28;
(Continued)

(56) References Cited

U.S. PATENT DOCUMENTS

2005/0239479 A1* 10/2005 Bednasz ........... H04M 1/72457
455/456.1
2017/0332192 A1* 11/2017 Edge ..................... G01S 5/0036
(Continued)

OTHER PUBLICATIONS

International Search Report and Written Opinion dated 2021-08-09, issued in application No. PCT/EP2021/065700.
(Continued)

*Primary Examiner* — Siu M Lee

(74) *Attorney, Agent, or Firm* — McClure, Qualey & Rodack, LLP

(57) ABSTRACT

A method for operating a wireless communication network that supports a plurality of reference signals such as sounding reference signals as provided. The method comprises analyzing a channel condition between a UE and TRPs, providing a measurement report to the wireless communication network and determining parameters of an uplink RS based on the measurement report. The method further comprises receiving, with the user equipment, at least one instruction signal comprising information indicating the determined parameters of the uplink RS, and transmitting the uplink RS within the UE so as to allow determining uplink transmission links for a UE multi-TRP communication or a position of the UE in the wireless communication network based on an evaluation of transmittal of the instructed uplink RS.

34 Claims, 21 Drawing Sheets

(51) Int. Cl.
*G01S 5/02* (2010.01)
*H04L 5/00* (2006.01)
*H04W 24/08* (2009.01)
*H04W 24/10* (2009.01)

(52) U.S. Cl.
CPC .......... *H04L 5/0048* (2013.01); *H04W 24/08* (2013.01); *H04W 24/10* (2013.01)

(58) Field of Classification Search
CPC .... G01S 5/0009; G01S 5/0036; G01S 5/0205; H04L 5/0048; H04L 5/0025; H04L 5/0051; H04L 5/0091; H04B 7/024; H04B 7/0421; H04B 7/0695; H04B 7/088
See application file for complete search history.

(56) References Cited

U.S. PATENT DOCUMENTS

| | | | | |
|---|---|---|---|---|
| 2020/0169312 | A1* | 5/2020 | Black | H04B 7/0695 |
| 2020/0383021 | A1* | 12/2020 | Chin | H04W 56/0045 |
| 2021/0014848 | A1* | 1/2021 | Davydov | H04W 72/23 |
| 2021/0314931 | A1* | 10/2021 | Farag | H04B 7/0617 |
| 2022/0109541 | A1* | 4/2022 | Cirik | H04L 5/0053 |
| 2023/0028861 | A1* | 1/2023 | Yao | H04W 52/54 |
| 2024/0155501 | A1* | 5/2024 | Zhang | H04W 52/367 |

OTHER PUBLICATIONS

Sony; "Considerations on UL-based Positioning in NR;" 3GPP TSG RAN WG1 #96; Feb. 2019; pp. 1-4.

Oppo; Remaining Issues on Measurements for NR Positioning; 3GPP TSG RAN WG1 #100bis; Apr. 2020; pp. 1-3.

3GPP TS 38.214; "3rd Generation Partnership Project; 1-68 Technical Specification Group Radio Access Network; NR; Physical layer procedures for data (Release 16);" Apr. 2020; pp. 1-151.

Fraunhofer IIS et al.; "Aspects of UL-based NR positioning techniques;" 3GPP TSG RAN WG1; Jan. 2019; pp. 1-8.

Fraunhofer IIS et al.; "Potential positioning enhancements;" 3GPP TSG RAN WG1; Oct. 2020; pp. 1-17.

3GPP TS 38.213 V16.1.0; "3rd Generation Partnership Project; Technical Specification Group Radio Access Network; NR; Physical layer procedures for control (Release 16);" Mar. 2020; pp. 1-156.

3GPP TS 37.355 V16.0.0; 3GPP 3rd Generation Partnership Project; Technical Specification Group Radio Access Network; LTE Positioning Protocol LPP) (Release 16); Mar. 2020; pp. 1-281.

3GPP TS 38.331 V16.0.0; "3GPP 3rd Generation Partnership Project; Technical Specification Group Radio Access Network; NR; Radio Resource Control (RRC) protocol specification (Release 16);" Mar. 2020; pp. 1-835.

3GPP TS 38.305 V15.4.0; "3GPP 3rd Generation Partnership Project; Technical Specification Group Radio Access Network; NG Radio Access Network (NG-RAN); Stage 2 functional specification of User Equipment (UE) positioning in NG-RAN (Release 15);" Jun. 2019; pp. 1-72.

3GPP TS 38.215 V16.1.0; "3GPP 3rd Generation Partnership Project; Technical Specification Group Radio Access Network; NR; Physical layer measurements (Release 16);" Mar. 2020; pp. 1-22.

\* cited by examiner

| DL-RS ID (i) | A | B | C |
|---|---|---|---|
| RX filter 1 | 90 | 80 | 77 |
| RX filter 2 | 120 | 112 | 140 |
| RX filter 3 | 200 | 180 | 167 |

Fig. 7

| $P_{SRS,max(k,i,j)} = P_{RX,max(k,i,j)} + PL_{(k,i,j)}$ | | | | | | | | |
|---|---|---|---|---|---|---|---|---|
| filter A | 80 | 110 | inf | inf | inf | 40 | 30 | 20 |
| filter B | 90 | inf | inf | inf | inf | 70 | 60 | 40 |
| filter C | 80 | 80 | inf | inf | 100 | 90 | 60 | 50 | 30 |
| SSB-ID | 1 | 3 | 4 | 5 | 6 | 7 | 8 | 9 |
| SSB-index | 1 | 3 | 1 | 2 | 3 | 1 | 2 | 3 |

Fig. 10c

| | | |
|---|---|---|
| SRS configuration feedback { | | |
| | Number of spatial filters needed (K): INTEGER | |
| | LIST OF (1 to K INSTANSTS) of Spatial Filter | |
| | | Spatial filter |
| | | ID — Indentifier for this SRS configuration |
| | | Beams measured — List of DL-RS measured |
| | | Spatial relation: — Indication of which DL RS (CSI-RS, SSB, DL-BRS, etc) is used as spatial relation. It may also be UE-signalled index. |
| | | Optimised for — Indicate which is the best DL RS received by this spatial relation |
| | | Preferred beams on other TRPs — Indicate which is the best beam on other TRPs reachable by this SRS configuration. |
| | | Acceptable beams on other TRPs — Indicate the beams where the SRS might be acceptably received at the TRPs |
| | | Overloaded beams — Indicate the beams that should not be turned on, otherwise oversaturation may happen. |
| | | Measurement for — Signaling which of the DL beams are reported with the measurement values below (for example bitmap with respect to the beams measured field). |
| | | Measurement values — List of measurement values |

```
1  SRS-PosResourceSet-r16 ::=           SEQUENCE {
       srs-PosResourceSetId-r16             SRS-PosResourceSetId-r16,
       srs-PosResourceSetIdList-r16         SEQUENC (SIZE (1..maxNrofSRS-ResourcePerSet)) OF
   SRS-PosResourceId-r16
5
       OPTIONAL, -- Cond Setup
       resourceType-r16                     CHOICE {
         aperiodic-r16                      SEQUENCE {
           aperiodicSRS-ResourceTriggerList-r16   SEQUENCE (SIZE (1..maxNrofSRS-TriggerStates-
10 1))
       1)  OPTIONAL, -- Need M                      OF INTEGER (1..maxNrofSRS-TriggerStates-
       slotOffset-r16                       INTEGER (1..32)
       OPTIONAL, -- Need S
15       ...
         },
         semi-persistent-r16                SEQUENCE {
           ...
20       },
         periodic-r16                       SEQUENCE {
           ...
         }
       },
25     ...
       OPTIONAL, -- Need M
30  }
```

Fig. 15a

```
SRS-PosResourceSet-r16 ::=    SEQUENCE {
    ...
    alpha-r16                     Alpha
    OPTIONAL,  -- Need S
    p0-r16                        INTEGER (-202..24)
    OPTIONAL,  -- Cond Setup
    pathlossReferenceRS-Pos-r16   CHOICE {
        ssb-Index-16                  SSB-Index,
        csi-RS-Index-r16              NZP-CSI-RS-ResourceId,
        ssb-r16                       SSB-InfoNcell-r16,
        dl-PRS-r16                    DL-PRS-Info-r16
    }
    OPTIONAL,  -- Need M
    fallBackPathlossReferenceRS-Pos-r16   CHOICE {
        ssb-Index-16                  SSB-Index,
        csi-RS-Index-r16              NZP-CSI-RS-ResourceId,
        ssb-r16                       SSB-InfoNcell-r16,
        dl-PRS-r16                    DL-PRS-Info-r16
    }
    OPTIONAL,  -- Need M
    ...
}
```

Fig. 15b

```
SRS-PosResource-r16 ::=     SEQUENCE {
 ... (unchanged parts not repeated)
 spatialRelationInfoPos-r16      SRS-SpatialRelationInfoPos-r16
OPTIONAL,    -- Need R
 fallbackSpatialRelationInfoPos-r17       SRS-SpatialRelationInfoPos-r17
OPTIONAL,    -- Need S
 ...
}

(unchanged parts not repeated)
...
SRS-SpatialRelationInfoPos-r17 ::=    =
 servingCellId-r17
 referenceSignal-r17            SEQUENCE {
  ssb-IndexServing-r17            ServCellIndex
  csi-RS-IndexServing-r17         CHOICE {
  srs-SpatialRelation-r17          SSB-index,
  resourceSelection-r17            NZP-CSI-RS-ResourceId,
   srs-ResourceId                  SEQUENCE {
   srs-PosResourceId-r17            CHOICE {
  },                                 SRS-ResourceId,
  uplinkBWP-r17                     SRS-PosResourceId
 },                                BWP-Id
 ssbNcell-r17                     SSB-InfoNcell-r17,
 dl-PRS-r17                       DL-PRS-Info-r17
}
```

Fig. 16

```
-- ASN1START
-- TAG-POS-RS-MEAS-FAILURE-RESOLUTION-START

PosRsMeasFailureResolution ::=    SEQUENCE {
    posRsResolutionPerSetList         SEQUENCE (SIZE (1..maxNrofSRS-ResourceSet)) OF
PosRsResolutionPerSet,
    ...
}

PosRsResolution ::= ENUMERATED ( NOTRANSMISSION, FALLBACK, DEFAULT), OPTIONAL -- Need R
PosRsResolutionPerSet ::= SEQUENCE {
    srs-PosResourceSetId-r16            Srs-PosResourceSetId-r16
    srs-PosResourceIdList-r16           SEQUENCE (SIZE (1..maxNrofSRS-ResourcesPerSet)) OF
SRS-PosResourceId-r16
    srs-PosResolutionList-r16           SEQUENCE (SIZE (1..maxNrofSRS-ResourcesPerSet)) OF
PosRsResolution;
}

-- TAG-POS-RS-MEAS-FAILURE-RESOLUTION-STOP
-- ASN1STOP
```

Fig. 17

UPLINK UE POSITIONING

CROSS-REFERENCE TO RELATED APPLICATIONS

This application is a continuation of copending International Application No. PCT/EP2021/065700, filed Jun. 10, 2021, which is incorporated herein by reference in its entirety, and additionally claims priority from European Application No. EP20180582.7, filed Jun. 17, 2020, which is also incorporated herein by reference in its entirety.

The present invention relates to methods for operating a wireless networks and to apparatuses that may form at least parts thereof such as user equipment (UE), a controller entity. The present invention further relates to a wireless communication network and to a computer program. The present invention in particular relates to configuring spatial relation and path loss reference signal (RS) for positioning.

BACKGROUND OF THE INVENTION

In wireless networks there may be a task for locating or positioning devices. Such a positioning may be implemented by transmitting, receiving and evaluating wireless signals. Such signals may be referred to as positioning reference signals (PRS). Sounding reference signals (SRS) is an uplink reference signal, which was enhanced with Rel.16 of NR (new radio) specifications to enable the uplink (UL) positioning methods, such as UL-TDOA (time difference of arrival), AoA (angle of arrival) based methods and joined uplink and downlink methods such as multi-RTT (round trip time). The UE is configured to transmit SRS by its serving gNB (serving base station) by means of RRC (radio resource control) signaling. A Rel. 16 UE can be configured with up to 16 SRS resource sets for positioning depending on the UE capability. Each resource set can be configured with up to 16 resources. Some of the parameters of the SRS are defined at resource level as depicted in FIG. 18 while other parameters are defined at a resource-set level as illustrated in FIG. 19.

Unlike SRS used for determining the channel conditions for data transmissions, where the SRS was intended to be received only by its serving cell, the SRS used for positioning needs to be typically received at a larger number of TRPs (transmission and reception points). SRS transmission power and beamforming at the TRP and UE needs to be carefully adjusted to ensure that the resulting SRS transmission does not cause detectability issues or oversaturation issues. However, the available measurements for the mobility management (measurement reported over RRC) and measurements reported using downlink reference signals (measurements reported over LPP (LTE Positioning Protocol)) do not convey enough information to the coordinating entity, either location server or the serving gNB, to be able to determine optimum SRS combination and at the same time avoid detectability and oversaturation issues. In connection with this, FIG. 18 shows configuration parameters for SRS-position resource for positioning whilst FIG. 19 shows configuration parameters for SRS Resource set for positioning according to release 16 of TS 38.331.

For determining optimum configuration of SRS resources for positioning, there are three important parameters which need to be configured properly:

1) Pathloss reference RS, defined at the SRS resource set level
2) Spatial relation, defined at SRS resource level
3) Nominal receive power (p0), defined at SRS resource set level Using a downlink RS as a reference for determining pathloss assumes certain degree of channel reciprocity between the uplink (UL) and downlink (DL) transmission. The pathloss estimated using downlink reference signals, such as DL-PRS or synchronization signal block (SSB) can be used as a reasonable estimate of pathloss of uplink signals, such as SRS. Therefore, the network can configure a UE to use a certain downlink reference signal to use as a reference to determine its pathloss and consequently its uplink transmit power. Likewise, the network can also provide a recommendation to use the same spatial filter as the one the UE used for receiving a certain downlink signal or for transmitting a different uplink reference signal. The network can recommend the UE to use the same spatial filter for the SRS in consideration and a second reference signal by specifying a parameter called spatial relation.

According to TS 38.213 (Rel.16, v16.1.1), the following is specified as power control operation for SRS for positioning:

If a UE transmits SRS based on a configuration by IE SRS-Positioning-Config on active UL BWP b of carrier f of serving cell c, the UE determines the SRS transmission power $P_{SRS,b,f,c}(i,q_s)$ in SRS transmission occasion i as $$P_{SRS,b,f,c}(i, q_s) = \min\begin{Bmatrix}P_{CMAX,f,c}(i),\\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d)\end{Bmatrix}[dBm]$$

where, $P_{O,SRS,b,f,c}(q_s)$ and $\alpha_{O,SRS,b,f,c}(q_s)$ are provided by p0 and alpha respectively, for active UL BWP b of carrier f of serving cell c, and SRS resource set $q_s$ is indicated by SRS-ResourceSetId from SRS-ResourceSet, and $PL_{b,f,c}(q_d)$ is a downlink pathloss estimate in dB calculated by the UE, as described in Clause 7.1.1 in case of an active DL BWP of a serving cell c, using RS resource indexed $q_d$ in a serving or non-serving cell for SRS resource set $q_s$ [TS 38.214]. A configuration for RS resource index $q_d$ associated with SRS resource set $q_s$ is provided by pathlossReferenceRS if a ssb-Index is provided, referenceSignalPower is provided by ss-PBCH-BlockPower if a dl-PRS-ResourceId is provided, referenceSignalPower is provided by dl-PRS-ResourcePower If the UE determines that the UE is not able to accurately measure $PL_{b,f,c}(q_d)$, the UE calculates $PL_{b,f,c}(q_d)$ using a RS resource obtained from the SS/PBCH block of the serving cell that the UE uses to obtain MIB The UE indicates a capability for a number of pathloss estimates that the UE can simultaneously maintain.

There is, thus, a need for precisely determining configuration parameters for SRS.

SUMMARY

According to an embodiment, a method for operating a wireless communication network that supports a plurality of reference signals (RS) such as sounding reference signals, may have the steps of: receiving, with a user equipment (UE), a first set of beamformed signals having at least one beamforming signal from a first transmission and reception point (TRP) using at least a first spatial reception filter; and at least a second set of beamformed signals having at least one beamformed signal from a second TRP using at least a second spatial reception filter; analyzing a first channel condition between the first TRP and the UE and a second channel condition between the second TRP and the UE; providing a measurement report indicating the first channel condition and the second channel condition; and reporting the measurement report to the wireless communication network such that the measurement report includes a filter information indicating the first spatial reception filter and the second spatial reception filter; determining, based on the measurement report, parameters of a uplink RS, the parameters including at least a RS characteristic and a spatial information of the RS; wherein the uplink RS is adapted based on a channel condition between the UE and at least the first TRP and the second TRP; receiving, with the UE, at least one instruction signal including information indicating the parameters of the uplink RS; transmitting the uplink RS with the UE; receiving the uplink RS with the first TRP and evaluating reception of the first TRP to obtain a first evaluation result and receiving the uplink RS with the second TRP and evaluating reception of the second TRP to obtain a second evaluation result; and determining uplink transmission links for a UE multi-TRP communication or estimating, for a positioning procedure in the wireless communication network, a position of the UE in the wireless communication network based on the first evaluation result and the second evaluation result.

According to another embodiment, a method for operating a wireless communication network that supports a plurality of reference signals such as sounding reference signals, may have the steps of: receiving, with a user equipment, at least one instruction signal including information indicating instructions to the UE to transmit an uplink RS; determining parameters of the uplink RS with the UE and based on the instruction signal; determining, using the UE, a spatial relation of the UE; deriving a derived spatial filter to be used by the UE based on the spatial relation; transmitting the uplink RS with the UE using the derived spatial filter and using the parameters of the uplink RS; receiving the uplink RS with the TRP and evaluating reception of the TRP to obtain an evaluation result; and determining uplink transmission links for a UE multi-TRP communication or estimating, for a positioning procedure in the wireless communication network, a position of the UE in the wireless communication network based on the evaluation result.

According to another embodiment, a user equipment configured for operating in a wireless communication network that supports a plurality of reference signals such as sounding reference signals, may have: a wireless interface configured for transceiving signals; wherein the UE is capable of beamforming with the wireless interface so as to form different beams; wherein the UE is configured for receiving a first set of beamformed signals having at least one beamforming signal from a first transmission and reception point using at least a first spatial reception filter; and at least a second set of beamformed signals having at least one beamformed signal from a second TRP using at least a second spatial reception filter; wherein the UE is configured for analyzing a first channel condition between the first TRP and the UE and a second channel condition between the second TRP and the UE; wherein the UE is configured for providing a measurement report indicating the first channel condition and the second channel condition; and reporting the measurement report to the wireless communication network such that the measurement report includes a filter information indicating the first spatial reception filter and the second spatial reception filter; wherein the UE is configured for receiving, based on the measurement report, at least one instruction signal including information indicating parameters of a uplink RS, the parameters including at least a RS characteristic and a spatial information of the RS; and wherein the UE is configured for transmitting the uplink RS according to the instruction signal.

According to another embodiment, a user equipment configured for operating in a wireless communication network that supports a plurality of reference signals such as sounding reference signals, may have: a wireless interface configured for transceiving signals; wherein the UE is configured for: receiving at least one instruction signal including information indicating instructions to the UE to transmit a uplink RS; determining parameters of the uplink RS and based on the instructions signal; determining a spatial relation of the UE; deriving a derived spatial filter to be used based on the spatial relation; and transmitting the uplink RS using the derived spatial filter and using the parameters of the uplink RS.

Another embodiment may have a controller entity configured for controlling at least a part of an operation of a wireless communication network that supports a plurality of reference signals such as sounding reference signals, the wireless communication network including a plurality of transmission and reception points, e.g., being part of a gNB, wherein the wireless communication network is adapted to communicate with a user equipment, the controller entity being configured for: transmitting, to the UE, a first set of beamformed signals having at least one beamforming signal from a first TRP; and at least a second set of beamformed signals having at least one beamformed signal from a second TRP; receiving a measurement report from the UE, indicating the first channel condition and the second channel condition; and including a filter information indicating a first spatial reception filter associated with the first set of beamformed signals; and a second spatial reception filter associated with the second set of beamformed signals; determining, based on the measurement report, parameters of a uplink RS, the parameters including at least a RS characteristic and a spatial information of the uplink RS; wherein the uplink RS is adapted based on a channel condition between the UE and at least the first TRP and the second TRP, wherein the spatial information of the RS is determined based on the filter information; transmitting, to the UE, at least one instruction signal including information indicating the parameters of the uplink RS; receiving a first evaluation result indicating an evaluation of a reception of the uplink RS with the first TRP and receiving a second evaluation result indicating an evaluation of a reception of the uplink RS with the second TRP; and determining uplink transmission links for a UE multi-TRP communication or estimating for a positioning procedure in the wireless communication network, a position of the UE in the wireless communication network based on the first evaluation result and the second evaluation result.

Another embodiment may have a controller entity configured for controlling at least a part of an operation of a wireless communication network that supports a plurality of reference signals such as sounding reference signals, the wireless communication network including a plurality of transmission and reception points (e.g., being part of a gNB, wherein the wireless communication network is adapted to communicate with a user equipment, the controller entity being configured for: transmitting, to the UE, information indicating boundaries of a parameter of a uplink RS within the boundaries to instruct the UE to select the parameter within the boundaries.

Another embodiment may have a base station configured for operating at least a cell of a wireless communication network, wherein the base station includes any of the inventive controller entities.

Another embodiment may have a location server configured to operate in a wireless communication network, wherein the communication server includes any of the inventive controller entities.

The inventors have found that by making the spatial characteristics used or selected at the UE transparent for the network, the network can efficiently determine the spatial filters and/or configurations of the UE so as to avoid unwanted effects such as a insufficient or an oversaturating signal power used by the UE and/or radiating the signal in wrong directions. A same or similar effect may be obtained by determining the spatial relation, e.g., based on determining the parameters of the positioning RS with the UE, i.e., to perform autonomous decisions at the UE, the precise knowledge of the UE about its own spatial filters may be used. The inventors have further found that such a well adapted RS may be used for communication, in particular for communication directed to more than one TRP, e.g., ultra reliable low latency communication (URLLC).

According to an embodiment, a method for operating a wireless communication network that supports a plurality of reference signals (RS) such as sounding reference signals (SRS) comprises receiving, with a user equipment (UE), a first set of beamformed signals having at least one beamforming signal from a first transmission and reception point (TRP) using at least a first spatial reception filter; and at least a second set of beamformed signals having at least one beamformed signal from a second TRP using at least a second spatial reception filter. The method comprises analyzing a first channel condition between the first TRP and the UE and a second channel condition between the second TRP and the UE. The method comprises providing a measurement report indicating the first channel condition and the second channel condition; and reporting the measurement report to the wireless communication network. The measurement report comprises a filter information indicating the first spatial reception filter and the second spatial reception filter. The method comprises determining, based on the measurement report, parameters of a positioning RS, the parameter including at least a RS characteristic and a spatial information of the RS. The positioning RS is adapted based on a channel condition between the UE and at least the first TRP and the second TRP, i.e., based on the first and the second channel condition. The method comprises receiving, with the UE, at least one instruction signal comprising information indicating the parameters of the positioning RS. The method comprises transmitting the positioning the RS with the UE and receiving the positioning RS with the first TRP and evaluating reception of the first TRP to obtain a first evaluation result. The method further comprises receiving the positioning RS with the second TRP and evaluating reception of the second TRP to obtain a second evaluation result. The method comprises determining uplink transmission links for a UE multi-TRP communication and/or estimating, for a positioning procedure in the wireless communication network, a position of the UE in the wireless communication network based on the first evaluation result and the second evaluation result. The method allows to determine the position of the UE whilst having precise acknowledge about the used spatial filters used at the UE which, thus, allow to reduce or avoid inaccuracies in the determining of the position based on assumptions along which exact directions beams of the UE are pointing.

According to an embodiment, a method for operating a wireless communication network that supports a plurality of reference signals (RS) such as sounding reference signals (SRS) comprises receiving, with a user equipment (UE), at least one instruction signal comprising information indicating instructions to the UE to transmit a positioning RS. The method comprises determining parameters of the positioning RS with the UE and based on the instruction signal. The method further comprises determining a spatial relation of the UE using the UE, i.e., the UE determines the spatial relation. The method further comprises deriving a derived spatial filter to be used by the UE based on the spatial relation, transmitting the positioning RS with the UE using the derived spatial filter and using the parameters of the positioning RS, receiving the positioning RS with the TRP and evaluating reception of the TRP to obtain an evaluation result and determining a position of the UE in the wireless communication network based on the evaluation result. As the UE has precise estimates that allow to obtain the spatial relation, it can therefore adjust its measurements and spatial filters in an accurate manner to allow a very precise determination of the position.

By determining the spatial relation, e.g., based on determining the parameters of the positioning RS with the UE, i.e., to perform autonomous decisions at the UE, the precise knowledge of the UE about its own spatial filters may be used.

Further embodiments relate to user equipment to operate in wireless communication networks, to controller entities configured for controlling at least a part of such wireless communication networks, a base station and a location server comprising such controller entities, to a wireless communication network and to a computer program product. Further embodiments are defined in the dependent claims.

BRIEF DESCRIPTION OF THE DRAWINGS

Embodiments of the present invention will be detailed subsequently referring to the appended drawings, in which:

FIG. 7 shows a schematic tabular representation of measurement results obtained by a UE according to an embodiment;

FIG. 10*a-c* show schematic representations of information that may be calculated and/or derived from the measurement report of FIG. 9, according to an embodiment;

FIG. 12 shows a schematic illustration of a possible content which may be comprised in a measurement report according to an embodiment together with explanations of such content;

FIGS. 15*a-b* show a representation of example code to implement embodiments;

FIG. 16 shows additional ASN.1 code to implement embodiments;

FIG. 17 shows further ASN.1 code to implement embodiments;

DETAILED DESCRIPTION OF THE INVENTION

Figure 1:
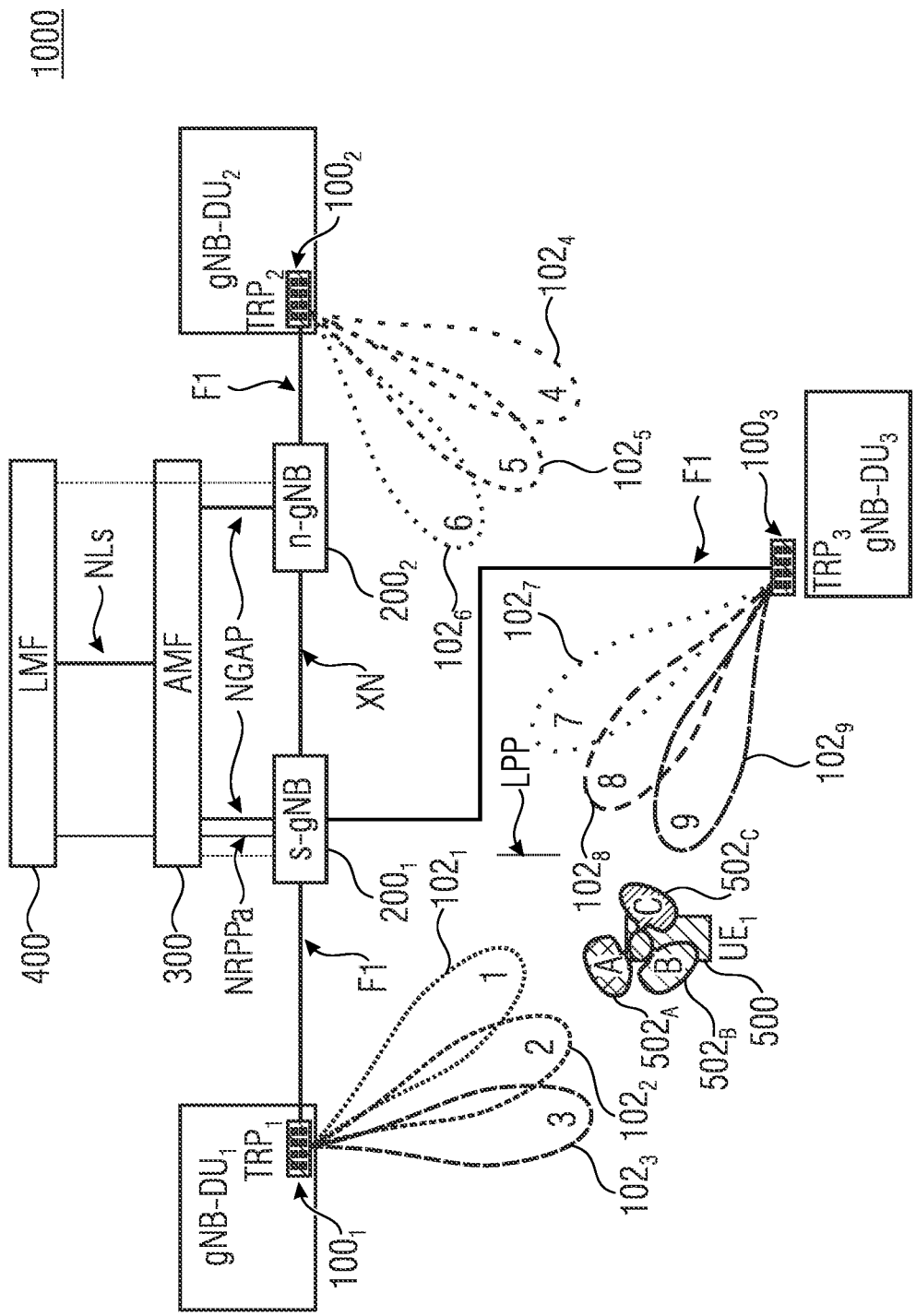
FIG. 1 shows a schematic block diagram of a known wireless communication network.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Some embodiments described herein relate to positioning in a wireless communication network, i.e., to estimate or determine a position of a device, e.g., a user equipment (UE) in the wireless network. Some embodiments make use of transmitting a reference signal (RS), e.g., demodulation RS (DMRS) together with data with a UE so as to receive this RS with one or more transmission and reception points (TRP), i.e., multi-TRP communication, e.g., in URLLC or sounding reference signal (SRS) to determine the parameters of data transmission later in a multi-TRP communication. Such RS may be used for positioning, i.e., to determine a position of the source of the RS in the wireless communication network. However, such RS may be used without limitation to establish and/or maintain communication links within a wireless communication network, e.g., in said multi-TRP communication. Although embodiments described herein relate to positioning, the description provided applies, mutatis mutandis, to determining uplink transmission links or parameters thereof, e.g., for a UE multi-TRP communication. A use for both purposes jointly is not excluded from the embodiments but forms a part thereof.

In connection with the embodiments being described in more detail and relating to a positioning procedure, the uplink RS is referred to as positioning RS. However, in case of using the uplink RS for determining uplink transmission links for a UE multi-TRP communication, the uplink RS may also be named differently.

The 5G-NR is characterized by use of beam both at TRP (part of base station) and user equipment. The UE and the TRP may each be capable of generating multiple beams. Assuming that the UE can generate $n_i$ different beams, $n_k$ TRPs are available and each TRP generates $n_{j(k)}$ beams, the total number of possible beam pairs is given by:

$$n_i \Sigma_{k=1}^{n_k} n_{j(k)}.$$

Out of the above possible combination of beam pairs, only a few beams provide an acceptable signal quality at the UE, and selection of suitable beam pairs at the TRP and at UE and determining suitable transmit power for the UE is a challenge. For communication, the UE only needs to communicate with the TRP that provides the best gain using the spatial filter that provides the best gain to the said TRP. For positioning, by contrast, the UE may need to receive signal from and transmit to multiple TRPs for positioning using ToA, AoA, RTT or TDOA based positioning systems. However, depending on radiation patterns of the antenna array used, the UE may need several beams to cover the TRPs providing good dilution of precision (DOP). Likewise, the TRP beams may also cover only a small area and needs to activate several beams to provide network coverage to several UEs.

The 5G-NR standard allows the network to recommend the UE to use a certain spatial filter for transmitting uplink positioning reference signal by pointing to another reference signal either in downlink (DL-PRS/SSB/CSI-RS) or another uplink signal (a different SRS resource). The spatial filter used by the network for receiving uplink signal or for transmitting downlink reference signal is transparent to the UE. The UE does not know and also does not need to know which filter the TRP is using, as long as it can do measure and report the signal parameters on the reference signal. The measurements from the UE and/or the TRP enable the UE and the network to use suitable beams. In principle, the channel may be considered reciprocal and the same TRP/UE beam pair in downlink may also be used in uplink. If the number of beams that need to be simultaneously activated to receive the UE signal can be reduced, the number of RF resources and thus the processing complexity can be reduced accordingly.

The invention targets an optimal selection SRS resources including spatial filters and transmit power for efficient positioning, fulfilling one or more of the criteria Minimize the time/frequency occupancy of reference signal needed for positioning. For example, by minimizing the number of SRS resources needed for uplink measurements such that the signal is received:
by least at a certain number of TRPs, or by a certain set of TRPs selected by the network.
with needed quality at the TRPs that need to measure this signal. The quality may include signal quality such as RSRP, RSRQ or measurement quality such as ToA error and so on.

Transmit power is selected such that
  The target TRPs shall receive the signal with sufficient signal strength
  A low number of even none of the TRPs receive branches is overloaded
Providing redundant links for diversity purposes. For example: a UE may be configured with more than one SRS resource and a TRP may receive one or more SRS resource. This may provide diversity gain or interference randomization effect if the SRS resources have different resource occupancy in different cells. As a result, robustness can be enhanced.

A high level overview of the procedure is as follows:
The TRPs transmit downlink reference signals
The UE performs a measurement on these downlink reference signal using one or more spatial filter available at the UE. The UE associates the measurement made with a particular spatial filter to an identifier, and when referred to this identifier it can relate back to the spatial filter it used.
The UE may either
  report the measurement back to the network, associating the measurement with an identifier associating the measurement to a spatial filter.
  or determine the suitable spatial filter and also select the transmit power within the ranges provided by the network.
The network entity (location management function (LMF) or gNB) may
  Either set constant transmit power (disable transmit power)
  Based on measurement reported by the UE, determine a suitable pathloss reference RS and recommend a spatial filter by specifying spatial relation. By doing so, the network enables power control by needing UE to measure a certain downlink RS, possibly using the recommended spatial filter and set uplink power accordingly.
  Note that the measured RSRP on the same downlink reference signal using the first spatial receive filter and the second spatial receive filter may be different because of different beam gains. Consequently, the power control algorithm gives a different value of transmit power for these two spatial filters when used for transmitting.
The signal received at the TRP is analysed at the network to estimate channel propagation parameters, such as ToA, TDOA, AoA, RSRP . . . etc.

The embodiments described in this invention may be applicable to the UL-TDOA, AoA or for the uplink part of RTT methods (multi-RTT or single-cell RTT).

The described embodiments may also be applicable to adjust the DL signals or to provide assistance data to the UE in selecting the spatial filter subset on which the measurements shall be performed.

FIG. 1 shows a schematic block diagram of a known wireless communication network 1000 having a plurality of transmission and reception points (TRP) $100_1$, $100_2$ and $100_3$ being part of different gNB (base station) distributed unit (gNB-DU) which may be part of a serving gNB (s-gNB) as illustrated for TRPs $100_1$ and $100_3$ but may also be a part of a different gNB (n-gNB). gNBs may communicate with the TRPs by using function F1 and may communicate with each other using function XN. Wireless communication network 1000 may further allow to communicate s-gNB $200_1$ and n-gNB $200_2$ with an Access and Mobility Management Function (AMF) 300, e.g., using Next Generation Application Protocol (NGAP). The AMF may communicate with a location management function (LMF) 400 using a Next Layer (NL) interface. LMF 400 may also communicate directly with one or more base stations 200.

Using an LTE Positioning Protocol (LPP) a UE 500 may be instructed to transmit sounding reference signals (SRS) $502_A$, $502_B$ and $502_C$ along different directions. TRPs $100_1$, $100_2$ and $100_3$ may form reception beam patents $102_1$-$102_9$ to implement at least a part of a positioning procedure.

In other words, positioning methods such as multi round trip time (RTT) or uplink time difference of arrival (UL-TDOA) use the sounding reference signal (SRS) as the uplink reference signal for estimating parameters such as time difference of arrival (TDOA), round trip time (RTT), Angle of Arrival (AoA), . . . etc.

A generalized 5G network deployment offering positioning services according to architecture specified in TS 38.305 is depicted in FIG. 1, where a use of extensive beamforming at both TRPs and UE is depicted.

The user equipment (UE) is commanded to transmit the SRS by its s-gNB. This SRS needs to be received by multiple TRPs which may either be hosted by the same s-gNB as well as neighboring gNBs. In general, the location management function residing within the 5G core network determines which of the TRPs available within the network shall be used for positioning. The actual algorithm with which the TRPs are selected is beyond the scope of this invention, but it is assumed that the LMF has selected a set of TRPs suitable for positioning the aforesaid UE. This can be achieved by using coarse UE location obtained using other positioning methods such as the enhanced cell ID (ECID), to determine the relevant TRPs within the positioning area.

The serving gNB needs to configure SRS to the UE using RRC signaling (defined in TS 38.331), so that the SRS can be received by the needed number of TRPs. Uplink data transmission using physical uplink shared channel (PUSCH), UE feedback using physical uplink control channel (PUCCH) or initial access using physical random access channel (PRACH), where the transmitted signal needs to be received with sufficient strength at one receiving entity (aka TRP transmitting the PCI of the serving cell), the positioning signal transmitted using SRS need to be received at multiple TRPs. To this goal, the s-gNB needs to appropriately configure the "spatial relation" (used for the selection of the filter for transmitting the signal) and the pathloss reference RS (including related RX filter used to measure the strength of a DL signal for adjusting transmit power, if pathloss compensation is configured), to indicate the recommended UE beamforming and the TRP beamforming.

When the SRS transmitted at the UE is intended to be received only by a single TRP, then the SRS can be configured in a straight-forward manner by relying on UE measurements reported for RRM (radio resource management), which are already reported to the network as a part of UE mobility. If the UE is equipped to perform receive beamforming, the UE carries out measurement on different downlink reference signals and identifies the best K downlink beams and reports the measurement according to the measurement configuration the UE has received. The UE may choose to use the receive beam to maximize the receive signal power or according to some other criteria, which may be UE implementation specific and not mandated or instructed by the standards. The network may then assume channel reciprocity between the uplink and downlink channels, and use the best DL beam reported by the UE as the downlink reference RS and indicate by means of specifying the spatial relation, the receive filter the UE is supposed to use to transmit the SRS. According to the Rel. 16, the spatial relation may point to the UE beamforming used for transmitting another SRS or the UE beamforming used to receive a certain SSB, certain PRS or in case of serving cell a CSI-RS resource.

As discussed earlier, the SRS transmitted for positioning purposes needs to be received at multiple TRPs. When SRS is transmitted so that the UE uses the best UE beam towards the serving cell, this suffers from the following shortcomings:
1) The signal power may or may not be received with sufficient strength or quality at other TRPs. In order to achieve good positioning accuracy, it is needed that the SRS is received at TRPs over a wider spatial region, such that good dilution of precision (DOP) is maintained.
2) A UE beamforming other than the one that provides the best gain to a certain TRP (for example the TRP hosting the serving cell) may enable the SRS transmitted to be received with sufficient quality at a larger number of TRPs than the best UE beamforming to the serving cell.
3) When the pathloss reference signal is selected to enable power control to serving cell, the signal may not be received at TRPs with larger pathloss to the UE (often those that are located far away from the UE). Conversely, the TRP hosting the serving cell and/or nearby TRPs may be overloaded if the pathloss reference signal were chosen to ensure reception with sufficient signal power at a TRPs with larger pathloss. In particular, the side lobes of the radiation pattern of the antenna array could already cause overload at the serving cell due to smaller pathloss.

Measurement reported for RRM purposes or for positioning according to Rel. 16 does not necessitate measurement of different RS using a particular beam at the UE. Consequently, the measurements are performed using different beams at the UE for different transmit beams at the TRP. Hence, the coordinating entity at the network (s-gNB or LMF) does not have enough information about the signal strength received at various TRPs, if the SRS is transmitted with a certain spatial relation.

That is, FIG. 1 shows a depiction of network entities involved in computing the positioning of a UE (labeled $UE_1$). Beamforming is depicted at both the UE and the TRP.

Figure 2:
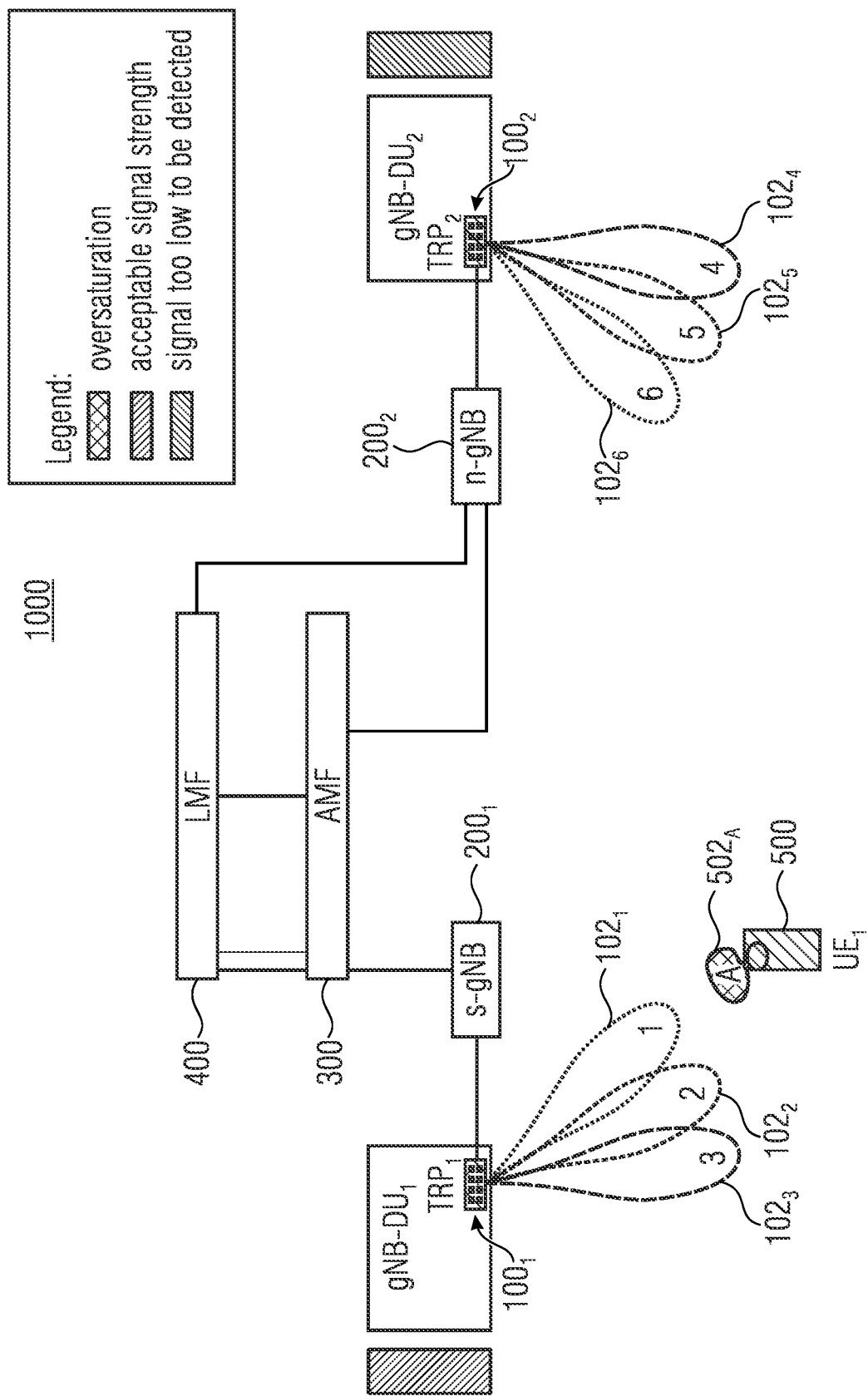
FIG. 2 shows a schematic block diagram of a section of the network of FIG. 1 to illustrate a first scenario of transmitted signals.
Figure 3:
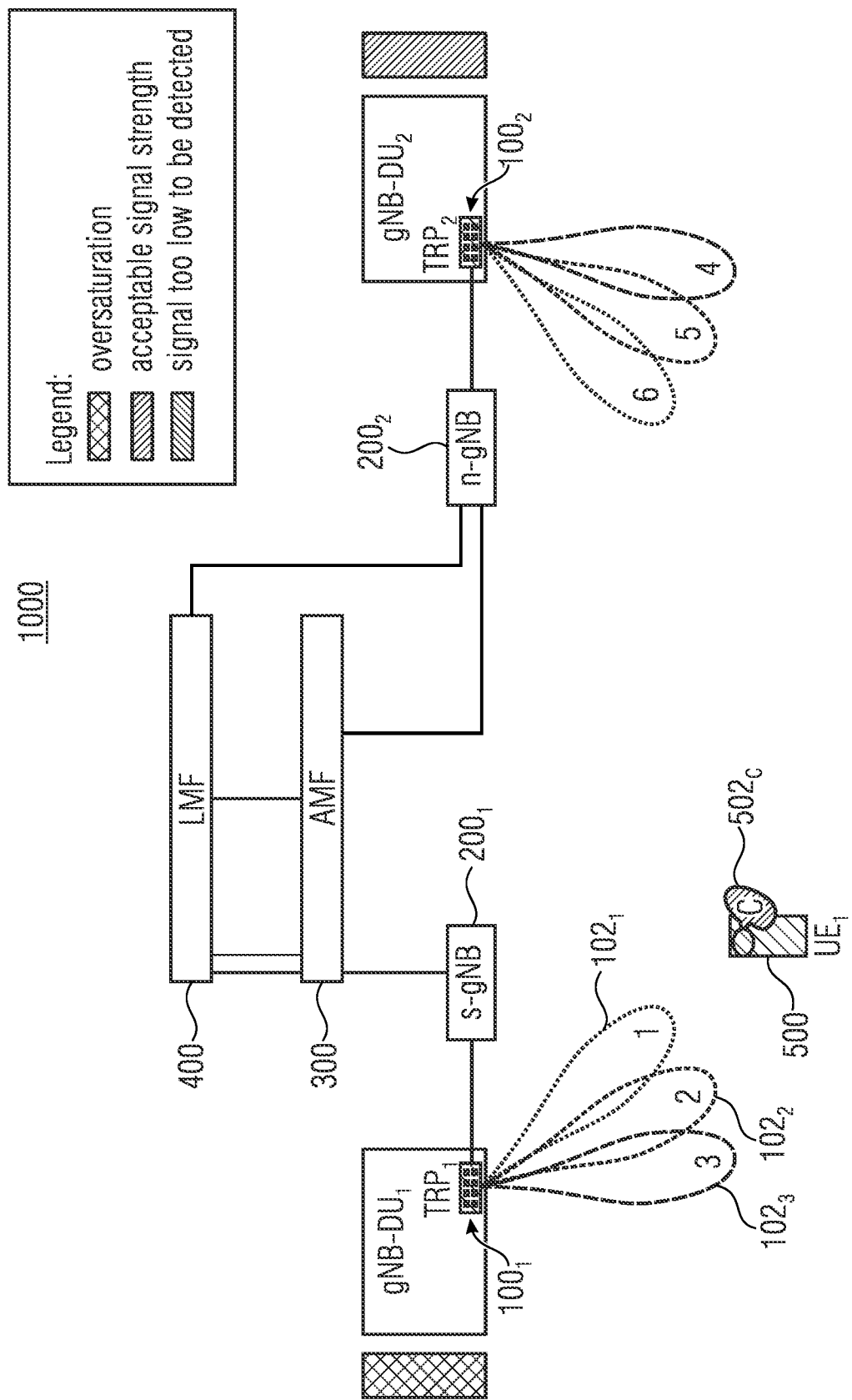
FIG. 3 shows a schematic block diagram of a section of the network of FIG. 1 to illustrate a second scenario of transmitted signals.

To further elucidate the issue, a section of the of wireless communication network 1000 shown in FIG. 1 where power control with respect to the serving cell is carried out is depicted in FIG. 2, and an alternating scenario in wireless communication network 1000 is shown where the power control with respect to the neighboring cell is carried out is depicted in FIG. 3. Without loss of generality, three beams in each of the two TRPs are depicted and labelled as 1 to 3 ($102_1$-$102_3$) and 4 to 6 ($102_4$-$102_6$) respectively for illustration purposes. The beams may be SSB beams, PRS beams or in case of serving cell, beams bearing CSI-RS, and different set of parameters may be needed to uniquely identify a beam from other depending on the type of RS it carries and which network component transmits the signal. However, to illustrate the principle, we use a generic integer index to distinguish a beam from other.

A TRP may transmit downlink reference signals in different beams and a UE can potentially use different UE beamforming (different spatial filters) to receive the various beams. Hence, the estimate of pathloss, and hence the SRS transmit power, depends on the combination of UE beamforming and the TRP beamforming.

FIG. 2, the SRS signal is power controlled with respect to the serving cell. The assumption that the best beam at the TRP and the UE beamforming providing the best gain to the aforesaid TRPs are selected from the set of the available UE transmit beams is made. This means the UE measures low pathloss to TRP1 and attempts to control the SRS transmit power, so that the configured receive power at TRP1 is achieved but the received power may be too low at TRP2.

Alternatively, if the if the power control is carried out by setting pathloss reference signal to reach the TRP of the neighboring cell (i.e. TRP2), this could potentially cause saturation at the serving cell as depicted in FIG. 3. When the UE beamforming 'C' is selected and beam '5' is selected for pathloss estimation, the estimated pathloss is high and the SRS transmit power would be high. Hence, even if the UE1 only has a side lobe in the direction of TRP1, it could still cause oversaturation at TRP1, due to relatively small pathloss between UE1 and TRP1 in comparison to UE1 and TRP2.

According to 3GPP specifications, the UE is configured with a pathloss reference RS so that the pathloss estimation obtained with the configured pathloss reference RS is used for power control. If the reference signal cannot be measured, then the pathloss estimate is with respect to the beam used for obtaining the MIB, so that the serving cell is not overloaded if the intended TRP cannot be reached. Note that, such transmission would then be received at very low signal levels at other TRPs. For positioning applications, the dynamic range of the received SRS signal strength is very high. SRS received with very low signal power can also be used for estimating signal characteristics and the loss caused by non-linearities in case of high input power may also be tolerable. Hence, it is not necessary to have the pathloss fully compensated at all TRPs. For positioning it is sufficient to keep the power received at TRP within a window defined by $P_{min}$ and $P_{max}$ for each of k TRPs available for positioning the UE considered. Assuming that the UE needs to measure i RSs and the UE supports j spatial filters, the total number of links is i·j.

The key issue to address is that when the UE is configured with a pathloss reference RS and a spatial relation to target the TRP with the largest pathloss, this could cause oversaturation of the frontend at one or more TRPs which have lower pathloss.

In other words, FIG. 2 shows a schematic diagram of a power control by setting reference RS to a beam from a serving cell, and a spatial providing a best gain among the set of available relations at the UE.

In other words, FIG. 3b shows a schematic diagram of implementing a power control by setting reference RS to a beam from a neighboring cell, and a spatial relation providing best gain towards the neighboring cell among the set of available spatial relations at the UE.

Embodiments of the present invention solve this issue. Some aspects of the present invention may be formulated as:
Signaling the UE to generate additional measurement reports, whereby the UE transmits measurement reports for all indicated downlink RSs using a particular UE beamforming from a set of available UE beamforming.
Calculating at the coordinating entity, either the location server or the s-gNB, the set of SRS resources that are needed to ensure reception at certain selected TRPs from the set of TRPs available in the network.

The coordinating entity may take into account at least one of more of the following when determining the SRS resources
  the receiver dynamics at the TRP, which includes
    margin between the minimum power and the target reference power,
    headroom margin to oversaturation with respect to the target reference power.
  the transmit power of the reference signals that are used for downlink signal measurement, and
  the measurement generated by the UE
Signaling the UE to transmit the SRS using the resources computed. If the parameters of the SRS are determined by the location server, then the information is conveyed to the s-gNB.
Signaling the TRPs which beam needs to be activated to receive the signal, and which beam needs to be deactivated to avoid oversaturation.
Getting the UE to transmit the SRS as configured by the s-gNB and adjusting the allocation based on measurements at the TRPs.

The inventors have found, amongst other things, with the current specifications and discussions in the 3GPP standardization, the serving gNB lacks UE measurements of DL-PRS. Likewise, the measurement on SSB made as a part of RRM are not readily available at the location server. In an embodiment, the RRM measurements on SSB available at the s-gNB are reported to the location server by the s-gNB unsolicited and/or in response to a request from the location server. Nevertheless, the measurements do not reflect the full channel conditions between the set of TRPs where the SRS is expected to be received. The main issue is that the choice of spatial filter at the UE is left to UE implementation and the reported measurement values for serving cell and the neighboring cell in case of SSB measurements or reference TRP and other TRPs in case of DL-PRS measurement may correspond to different spatial filters used at the UE. Therefore, the mechanism of reporting SSB measurement is to report the measurement on SSB including the spatial filter used at the UE to the location server. In order to reach the furthest TRP needed for estimating the position, the SSB from a TRP hosting a neighboring cell or a TRP with weaker DL-PRS signal needs to be used as a pathloss reference, such that the beam from such TRP is directed towards the UE. In addition, the UE needs to select its spatial relation such that the UE beamforming targets the aforesaid TRP. However, there are following shortcomings in the specification, which cause issues with reachability and oversaturation.

1) Without evaluation of all possible beam pairs many SRS resources may be needed or the gNB has to process many beams
2) The sidelobes of the UE antenna arrays are not taken into account. The main lobe of the spatial filter may point to a far away TRP and a high transmit power is configured according to the pathloss. In this case a near TRP may receive a strong signal through a sidelobe. This signal may be sufficient or may even overload the TRP.
3) Using larger number of SRS resources and TRPs may increase the positioning accuracy. However, if massive MIMO technologies with narrow beams are used, the procedure for establishing and updating the spatial relationship may become complex and time consuming.
4) In case of moving devices and/or NLOS reception the spatial relationship may need regular updates. For example, it may happen that at the LOS signal is blocked by an obstacle and a reflected signal from another beam is selected at the beginning. If the LOS signal is no longer blocked the receive condition changes.
5) The assumption that the channel is reciprocal may be not fulfilled. Hence, the use of DL signals as reference for the power control may result in a limited accuracy of the power control anyway.

Examples for the issues are highlighted in FIG. 2 and/or FIG. 3.

Figure 4:
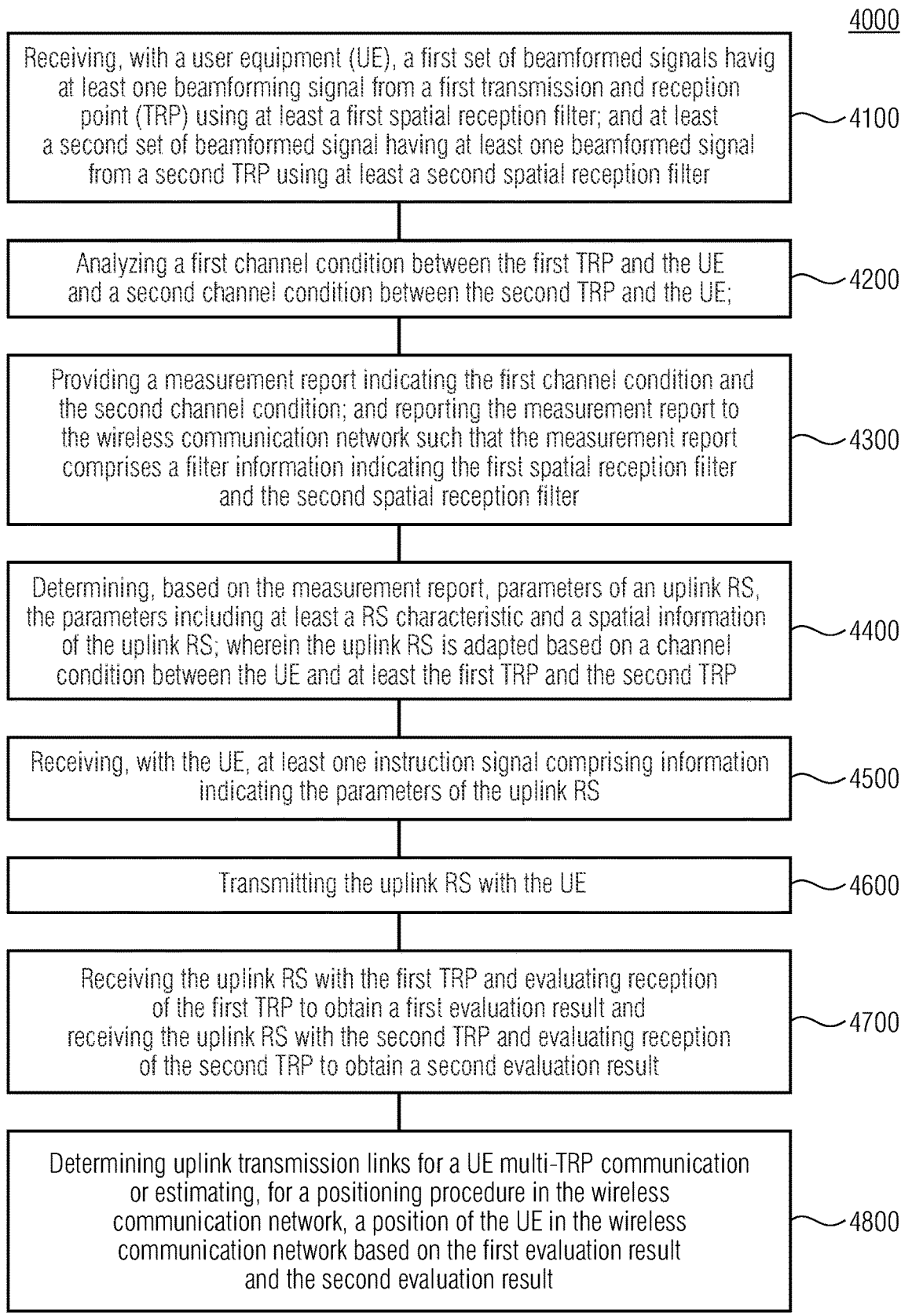
FIG. 4 shows a schematic block diagram of a method according to an embodiment.

FIG. 4 shows a schematic block diagram of a method 4000 according to an embodiment. In 4100 a UE receives a first set of beamformed signals having at least one beamforming signal from a first TRP using at least a first spatial reception filter and receives at least a second set of beamformed signals having at least one beamformed signal from a second TRP using at least a second spatial reception filter.

In 4200 a first channel condition is analyzed between the first TRP and the UE and a second channel condition is analyzed between the second TRP and the UE. Analyzing may be performed, for example, at the UE as it is the receiver of the beamformed signals. However, this does not exclude to provide measurement data such as raw data so as to allow a different entity to analyze the channel condition.

In 4300 a measurement report is provided or generated, the measurement report indicating the first channel condition and the second channel condition. The measurement report is reported or transmitted to the wireless communication network such that the measurement report comprises a filter information indicating the first spatial reception filter and the second spatial reception filter.

In 4400 parameters of a positioning RS are determined based on the reception report. The parameters include at least a RS characteristic and a spatial information of the uplink RS, e.g., a positioning RS, wherein the positioning RS is adapted based on a channel condition between the UE and at least the first TRP and the second TRP. The method may be implemented such that the positioning RS is adapted based on the channel condition between the UE and the at least one TRP, whilst this channel condition is determined at the UE.

In 4500 the UE receives at least one instruction signal comprising information indicating the parameters of the positioning RS.

In 4600 the positioning RS is transmitted with the UE. In 4700 the positioning RS is received with the first TRP and reception of the first TRP is evaluated to obtain a first evaluation result. Further, the positioning RS is received with the second TRP and reception of the second TRP is evaluated to obtain a second evaluation result. A position of the UE in the wireless communication network may be determined for a positioning procedure in the wireless communication network and may be determined or estimated based on the first evaluation result and the second evaluation result in 4800. Alternatively or in addition, uplink transmission links for a UE multi-TRP communication may be determined.

Figure 5:
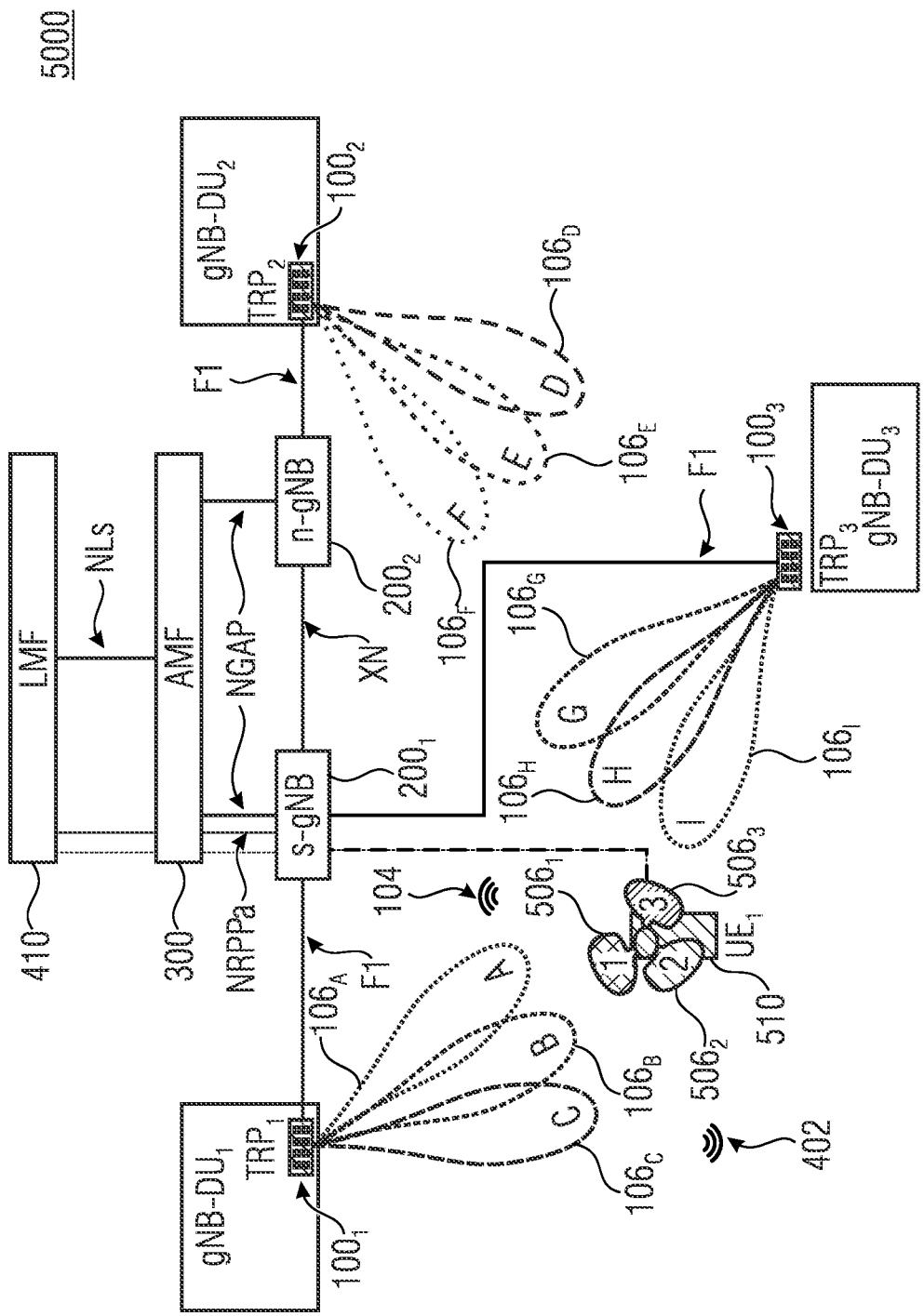
FIG. 5 shows a schematic block diagram of a wireless communication network according to an embodiment.

FIG. 5 shows a schematic block diagram of a wireless communication network according to an embodiment. The wireless communication network 5000 comprises partly same elements and/or entities when compared to wireless communication network 1000. In particular, gNBs $200_1$ and $200_2$ and TRPs $100_1$-$100_3$ may be implemented as described in connection with wireless communication network 1000. The wireless communication network 5000 is implemented to execute, for example, method 4000. As a part thereof, the UE may be configured for transmitting a measurement report 104, therefore providing additional information to the wireless communication network which allows AMF 300 and an LMF 410 to process or determine parameters of a positioning reference signal which is to be transmitted by the UE in a modified manner.

The measurement report 104 may comprise filter information as described in connection with 4300 of method 4000. The filter information may include information transparently indicating the first spatial filter and/or the second spatial filter. Alternatively or in addition, the filter information may include information that is unambiguously associated with the first spatial filter and/or the second spatial filter at the UE. That is, parameters such as gains, combination of antenna elements of the like that allow to set a spatial filter at the UE may be transmitted. Alternatively or in addition, identifiers that allow to identify or retrieve such settings at the network entities or network controllers may be transmitted. This may allow to make it transparent to the network, which setting was used such that a setting of the positioning RS in view of the spatial filter to be used may be computed or determined at the network controller, e.g., in a remote-control manner. When generating the measurement report so as to comprise the filter information to be unambiguously associated with the first spatial filter and/or the second spatial filter at the UE, the UE may remember its settings and may report, for example, an identifier or the like being associated with a specific filter setting at the UE. However, transmitter of the filter setting itself may be saved which is advantageous. However, the network may nevertheless make reference to the setting when using the identifier provided by the UE.

Analyzing the channel condition may comprise selecting a first spatial filter characteristic matching the first set of beamformed signals, e.g., based on a selection criteria, and selecting a second spatial filter characteristic matching the second set of beamformed signals. For example, a corresponding beam may be selected by the UE according to a beam correspondence procedure so as to determine a beam to fit best according to the mentioned criteria to the set of beams transmitted by the TRP, the signals transmitted therewith respectively. This may be executed such that the filter information indicates the first spatial filter characteristic and the second spatial filter characteristic. For example, each of TRPs $100_1$, $100_2$ and $100_3$ may sequentially or in parallel transmit their beamformed signals $106_A$-$106_I$ whilst UE 510 may receive those signals using different spatial filters or reception beam patterns $506_1$, $506_2$ and $506_3$. Although the signals 106, e.g., downlink (DL) RS, are illustrated so as to comprise a different spatial characteristic, embodiments are not limited hereto. One or more RS transmitted by a TRP and/or a UE may comprise a same or similar spatial characteristic at the antenna and may allow for different propagation properties based on the signal characteristic.

In connection with the embodiment described herein, a wireless signal may be transmitted and may be received. For transmitting, transmission beam patterns or transmission beams may be formed. For receiving, reception beam patterns or reception beams may be formed. Forming a beam may comprise using or implementing a spatial filter in connection with usage of respective antenna elements. For the sake of a better understanding, transmitted signals or transmission beam patterns are referenced with letters as, for example, signals 502 shown in FIG. 1 and signals 106 shown in FIG. 5. Reception beam patterns are indicated by numbers as illustrated, for example, for signals 102 in FIG. 1 or signals 506 in FIG. 5.

Referring again to FIG. 5, a number of signals 106 being transmitted by each TRP may be same or equal among the TRPs 101, 102 and 103 but may also differ. Choosing a number of at least 1, at least 2, at least 3, at least 5, at least 7, at least 9, at least 10 or any other suitable number of reference signals 106 to be transmitted by a signal TRP may be selected based on network requirements. Additionally, a number of reception beam patterns 506 may be at least 1, at least 2, or at most the number of different beam patterns 506 the UE 510 is adapted to generate. As will be explained in more detail, the UE may provide for a full measurement report 104 providing information indicating a full set of information about RS 106 it receives. However, this full measurement report may be limited due to multiple considerations therefore allowing to save resources for transmissions as well as measurement capacity.

The fact of providing the network with a suitable amount of information to determine the parameters of the positioning RS may be obtained in either case. When considering the drawbacks illustrated in connection with FIG. 2 and FIG. 3, for example, the measurement report 104 may indicate at least a reception beam pattern 506 that fits best (according to boundary conditions being specified by the UE and/or the network) with regard to the set of RS $106_A$-$106_C$, $106_B$-$106_F$ and $106_G$-$106_I$. However, when referring to a full measurement report, the network may also obtain knowledge about performance and/or channel condition in connection with other RS 106.

That is, the network may obtain knowledge about beams and their performance at the UE, e.g., when using assumptions about a reciprocity of uplink (UL) channels from the UE to the plurality of TRPs in view of the downlink (DL) channels. That is, a high channel quality or high signal power received at the UE may be interpreted as a high signal power to be received at the TRP when using a nominal power. Further, a low signal power or low signal quality determined between the TRP and the UE in view of a downlink signal to the UE may be interpreted as a low quality channel or a low signal power to be expected when the UE transmits a signal to the TRP through this channel.

When determining the parameters of the positioning RS, the network controller or controller entity that may be arranged, at least in parts, at a base station of the wireless communication network 5000 and/or at least partly at a location server configured to operate in a wireless communication network, e.g., LMF 410. For example, s-gNB $200_1$ may be adapted so as to comprise the described controller entity. In connection with FIG. 5, LMF 410 may implement the additional functionality of evaluating measurement report 104 so as to determine the parameters of the positioning RS.

Determining the parameters of the positioning RS may comprise deriving information indicating a derived spatial filter, i.e., a spatial filter being derived thereby, and being associated with the spatial information of the positioning RS. That is, the controller entity may determine the spatial filter to be used by the UE by having knowledge about the channels that are available at the UE.

The wireless communication network 5000 may transmit an instruction signal 402 to UE 510, e.g., so as to provide for a basis for receiving the instruction signal of 4500. Although the description provided relates to a single instruction signal so as to trigger transmission of a single positing reference signal, embodiments are not limited hereto. By way of a single instruction signal, the UE may be instructed to transmit a plurality of at least 2, at least 3, at least 5 or at least 10 positioning RS. Alternatively or in addition, more than a single instruction signal may be transmitted to the UE.

The UE may be instructed to transmit a positioning RS aperiodically, semi-persistently and/or periodically, based on the needs within the network. The UE may continuously update the power setting of a semi-persistent or periodic transmission, e.g., as it may move through the network, the change location leading to changed channels. That is, the position of the UE may be determined repeatedly based on adjusting an allocation based on measurements at the TRPs or by requesting new measurements from the UE. Alternatively or in addition, the spatial relation and/or the pathloss may be determined repeatedly so as to update the respective value. As an option this may include to update references or fallbacks which are predefined, e.g., a selected TRP that is dedicated to serve as a fallback in a case where the UE may not determine the spatial relation and/or the pathloss reference. Updating also fallback may allow maintain the advantages of having a fallback even in a changed environment of the wireless communication network. Such an update of the spatial relation and/or pathloss reference may be done by use of RRC reconfiguration, MAC CE and/or DCI signaling. For example, the UE may be instructed or triggered to transmit the SRS as configured by the base station or s-gNB. By use of such a trigger, the spatial relation and/or the pathloss reference RS may be updated, e.g., using RRC reconfiguration, MAC CE and/or DCI signaling.

As described, as an alternative or in addition to the positioning uplink transmission links for a UE multi-TRP communication may be determined.

Figure 6:
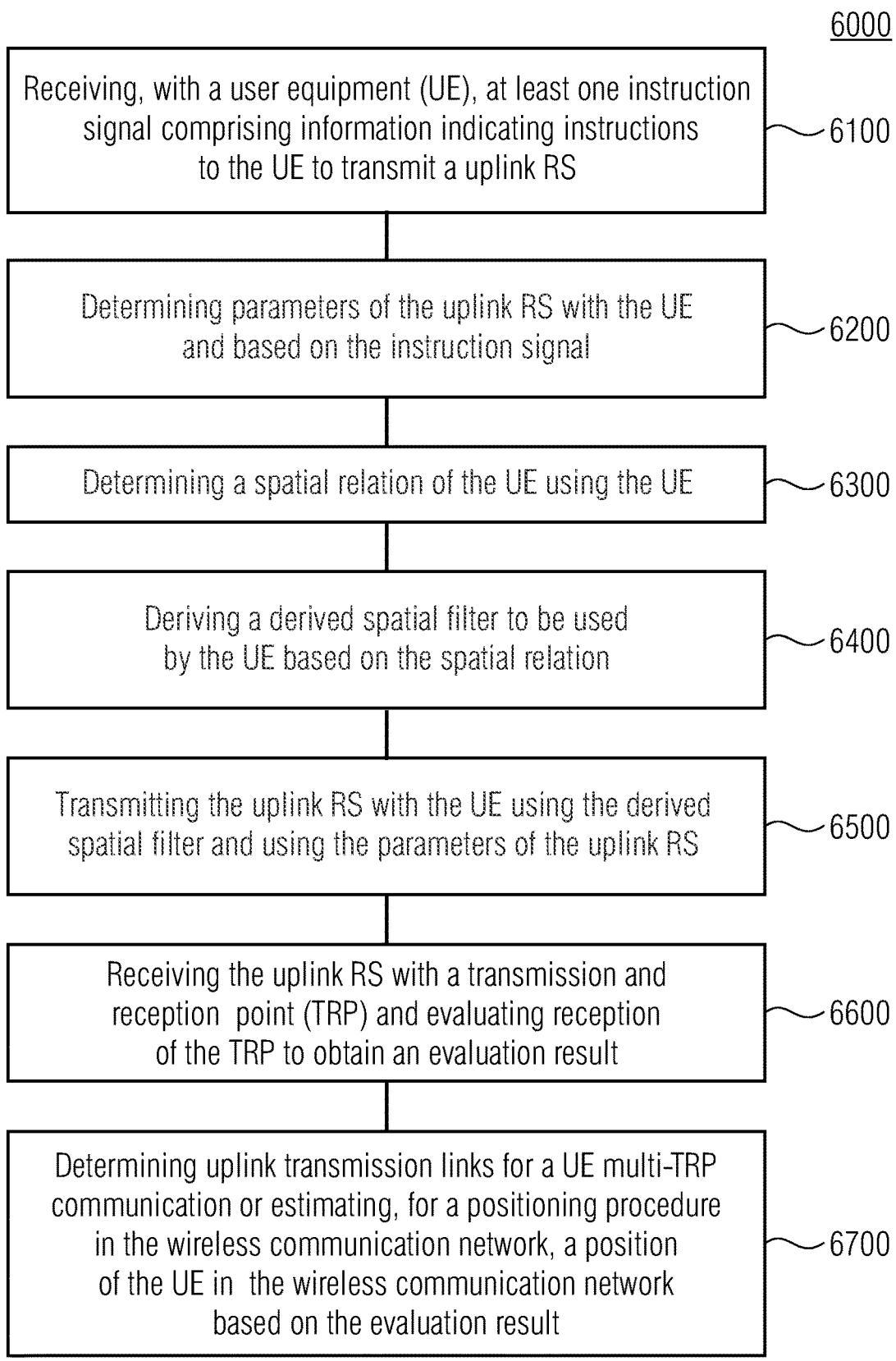
FIG. 6 shows a schematic block diagram of a method according to an embodiment in which a part of determining a positioning device is implemented at a user equipment (UE)

FIG. 6 shows a schematic block diagram of a method 6000 according to an embodiment. Method 6000 may be implemented independently from method 4000 but may allow for synergetic effects when being implemented together with method 4000. In 6100 a user equipment (UE) receives at least one instruction signal comprising information indicating instructions to the UE to transmit a positioning RS. For example, signal 402 may be transmitted. In 6200 parameters of the positioning RS are determined with the UE and based on the instruction signal. In 6300, a spatial relation of the UE is determined by use of the UE, e.g., at the UE. It is to be noted that a sequence or order of steps to be executed is not necessarily the sequence illustrated in FIG. 6. For example, 6200 and 6300 may be implemented in a changed order and/or together.

In 6400, a derived spatial filter is derived, the derived spatial filter to be used by the UE based on the spatial relation. In 6500, the positioning RS is transmitted with the UE using the derived spatial filter and using the parameters of the positioning RS. In 6600 the positioning RS is received with a TRP and reception of the TRP is evaluated to obtain an evaluation result. The position of the UE in the wireless communication network and/or uplink transmission links for a UE multi-TRP communication may be determined based on the evaluation result in 6700.

When compared to method 4000, method 6000 also allows to obtain a positioning RS by use of information obtained at the UE. However, as the UE is able to make decisions about the positioning RS at least to a certain extent, the transmittal of the measurement report may provide for further advantages but may also be skipped. For example, a method according to an embodiment, e.g., method 4000 and/or 6000 may comprise determining a channel condition between at least one TRP transmitting a DL RS and the UE, wherein determining the channel condition comprises determining a reception quality of the DL RS. For example, the DL RS may be one of an SSB related to a TRP not serving the UE, a DL-PRS, a CSI-RS and a phase tracking reference signal (PTRS). For example, the uplink Rs or positioning RS to be transmitted by the UE may be a sounding RS (SRS).

For example, the UE may receive boundaries of the parameters to be used for the positioning RS and may determine the parameters of the positioning RS within the boundaries. Such boundaries may be transmitted, to the UE, as part of the instruction signal but may also be transmitted by different signals or may be predetermined, i.e., known to the UE. For example, at least one parameter of the positioning RS may be indicated in the instruction signal, e.g., as a boundary, by a minimum value and/or a minimum value so as to define at least a part of a value interval allowing the UE to select a value of the parameter within the value interval. For example, the parameters may comprise a minimum value and/or a maximum value of at least one of a transmission power of the positioning RS and/or an equivalent isotopically radiated power (EIRP). That is, the instruction signal may be generated so as to indicate, to the UE, to select a transmission power for the positioning RS so as to comprise at least the minimum reception power ($P_{min}$) and at most the maximum reception power. However, one of a minimum value and the maximum value may also be predefined, e.g., as part of a standardization and/or network control setting such that transmission of only one of a minimum value and a maximum value may lead to a valid value interval from which the UE may select its value. For example, the UE may measure the DL RS according the selected spatial relationship so as to determine the pathloss. For example, a value a may be set to a value >0 or =0, α denoting a fractional pathloss compensation parameter. The UE may continuously or repeatedly adjust a transmit power to be used for transmitting a positioning RS such that for the determined pathloss and the selected α a result transmit power level to be used for transmitting the positioning RS results in a reception power larger than $P_{min}$ being a minimum reception power at a number of selected TRP and/or a lower than a maximum reception power. That is, The pathloss is estimated using pathloss reference signal and spatial relation specified. From this, a new value of power is computed to ensure $P_0$ between min and max at the receiver TRP.

Determining the parameters of the positioning RS and/or determining of the spatial relation of the UE may be executed based on measurement data obtained with the UE. For example, reference signals transmitted by one or more TRP of wireless communication network 5000 or 1000 may be evaluated for obtaining information that allows to determine the parameters. For example, a channel condition between at least one TRP of the wireless communication network and the UE may be determined by the UE.

Method 6000 allows a method in which the UE is adapted to not report the determined channel condition to the network, e.g., in a first operating mode. For example, if the information assessable to the UE to determine the parameters of the positioning RS sufficiently, then transmittal of a measurement report may be skipped. However, method 6000 may also be adapted to further comprise analyzing a channel condition between the TRP and the UE, providing a measurement report indicating the channel condition, and reporting the measurement report to the wireless communication network, such that the parameters of the positioning RS are determined based on the measurement report. That is, the measurement report may nevertheless facilitate the determination of the positioning RS. For example, the boundaries or selection criteria indicated in the instruction signal may be based on the measurement report. This may allow for periodically, aperiodically or based upon requests updating information that provides a basis for the assumption from which the boundaries are determined.

For example, the method may further comprise a receiving, with the UE, a set of beamformed signals having at least one beamforming signal from the TRP, such that analyzing the channel condition comprises selecting a spatial filter characteristic matching the set of beamformed signals, e.g., based on a selection criteria as described in connection with method 4000. Thereby, the measurement report may indicate the spatial filter characteristic. Method 6000 may further be adapted so as to consider more than a single TRP, e.g., at least a second, a third, a fourth, a fifth or a sixth TRP. For a pre-sized positioning, methods 4000 and/or 6000 may be executed so as to use at least four TRPs. At least one TRP may be a TRP not serving the UE, e.g., TRP $100_2$.

That is, the parameters of the positioning RS such as transmission power and/or spatial characteristics may be determined at the network side and/or at the UE side. Both options may include measurements in view of the channel condition which may, at least optionally, be reported with the measurement report. The measurement report, when being transmitted to the network or being used internally at the UE, may indicate a performance of a spatial reception filter characteristic and may be generated to indicate at least one of a received signal reference power (RSRP), a received signal reference quality (RSRQ), a signal to interference+noise ratio (SINR), a time of arrival (ToA) of a DLRS, a channel input response (CIR) and a K-factor, e.g., indicating a ratio of power received through a Line-of-Sight (LoS) path and at least one non-LoS path.

Such values may be reported for each used spatial filter and/or for each received DLRS 106. However, such results may be combined e.g., to obtain a set or even a single value being selected according to a specific criteria e.g., according to "transmit the best 1, 2, 3, 4, . . . ", transmit a mean value with regard to multiple DLRS and a single spatial filter and/or vice versa or the like.

Especially in cases where the parameters of the positioning RS are determined based on a measurement report received from the UE, the measurement report may indicate a performance of a spatial reception filter characteristic. The measurement report may be generated so as to indicate at least one of a ToA Rx-Tx-beam difference in which the UE measures the time of arrival (ToA estimates on the DL RS and consistency check using different UEs spatial filters, a signal quality in which the UE measures the signal quality (in respect to the expected ToA measurement performance) from the DL RS based on an estimate for the channel characteristic such as LoS/non-LoS (nLoS) detection, a packet data protocol (PDP) profile or the like. Alternatively or in addition, the measurement report may indicate at least one or an RSRP, an RSRQ, an SINR, a difference between RSRP of different received signals and/or filters, an RSRP of strong signals only, e.g., of signals that are received with a signal power above a predefined threshold value, in particular, a value being higher than the sensitivity of the antenna so as to exclude received weak signals. Alternatively or in addition, the measurement report may indicate at least one of a RSRP of a number of best links to a TRP related to a spatial filter of the UE. That is, when compared to reporting RSRP of strong signals only, a predefined number of links may be reported instead of all links that have at least a predefined RSRP. However, both options are also combinable. Alternatively or in addition, the measurement report may indicate at least one of an ID of a number of best links to a TRP related to a spatial filter of the UE, an index of a number of useful links, e.g., having an RSRP above a threshold, and/or a default spatial filter.

The positioning RS may be defined or influenced by a plurality of parameters, wherein some or all of the parameters may be determined when determining the parameters of the positioning RS. According to an embodiment, determining the parameters of the positioning RS of method 4000 and/or of method 6000 may comprise evaluating a measurement report to determine the optimal configuring (or a configuration for filling the target requirements) the UE's SRS transmit spatial filter (indicated by specifying the spatial relation parameter) and the transmit power control setting; calculating, at a controller entity of the wireless network, e.g., the location server, RRC entity and/or the s-gNB, the set of SRS resources that are needed to ensure reception at certain selected TRPs from the TRPs available in the network, wherein the controller entity may take into account at least one or more of the following when determining the SRS resources:
  a target signal strength at the input of the TRP, which includes
    margin between a minimum power needed to evaluate the UL signal at the TRP, and/or
    a head room margin to the maximum power at the input of the TRP causing oversaturation or impairments to other UL signals sharing the same frequency band;
  a transmit power of the reference signals that are used for downlink signal measurements
  RSRP reported by the UE as an absolute value or a difference between RS signals
  a signal quality indicated by the UE and/or
  an indicator which link may provide the best ToA accuracy.

Embodiments may comprise the following steps, wherein the sequence stated does not necessarily define a sequence in which the steps are executed.
  Step 1: Before configuring the SRS for positioning purpose the network (NW) may request measurement reports from the UE on DL signals. The NW may provide the UE with assistance data on the DL signals or the UE may detect the DL signals on its own. The main parameter to be reported is the RSRP (reference signal received power). Further parameter may be calculated to estimate the quality of the link and to assist the NW to select spatial filters providing the best ToA accuracy.
  The UE may be asked to provide:
    full reporting (all configured DL RS on all available UE spatial filter configurations)
    According to the assistance data provided by the NW reports for selected RS signals are generated
    The UE may be asked to provide reports at least for links subject of oversaturation. This may be for example RS signals received with high power or low pathloss (if the UE knows the transmit power the UE can calculate the pathloss)
    The UE may already detect good combinations of DL RS signals and UE spatial filters and will provide measurement reports for this subset only
  Step 2: A NW will evaluate these reports to determine an optimal configuration (or a configuration fulfilling the target requirements) the UE's SRS Tx spatial relation and Tx power control setting.
    Calculating at the coordinating entity, either the location server or the s-gNB, the set of SRS resources that are needed to ensure reception at certain selected TRPs from the set of TRPs available in the network.

The coordinating entity may take into account at least one of more of the following when determining the SRS resources Target signal strength at the input of the TRP, which includes margin between to minimum power needed to evaluate the UL signal at the TRP, Headroom margin to the maximum power at the input of the TRP causing oversaturation or impairments to other UL signals sharing the same frequency band.

the transmit power of the reference signals that are used for downlink signal measurement, and the RSRP reported by the UE (absolute value or difference between the RS signals)

the signal quality indicated by the UE. The signal may include also an indicator which link may provide the best ToA accuracy.

Step 3A: Signaling the UE to transmit the SRS using the resources computed. The configuration of the SRS resource including at least Selection of the spatial filter to be used for each SRS resource Selection of the transmit power either by Setting a fixed value or configuring a RS used to adjust the transmit power according measurements on a downlink signal The protocol for signaling the UE to transmit SRS for positioning is already specified in the Rel 16 of the standard.

Step 3B: The signaling may add further signaling data, which are not yet part of Rel. 16 of the specification. Examples include: specifying the fallback pathloss relation or signaling the fallback spatial relation. In addition, the behavior when these additional parameters are specified may be added in future to the specification. Specifying the fallback pathloss relation and spatial relation and their behavior are described in XXXX.

Step 3C: Signaling the TRPs which beam needs to be activated to receive the signal, and which beams may suffer from oversaturation. This includes signaling over the NRPPa interface and F1AP interface (in case of split gNB architecture) or over the XN interface.

Step 4: Trigger the UE to transmit the SRS as configured by the s-gNB. The standard supports aperiodic, semi-persistent and periodic transmissions. The trigger may also update the spatial relation and pathloss reference RS using MAC CE or DCI signaling.

Step 5A: Procedure to be implemented by the UE to continuously update the power setting of semi-persistent or periodic transmissions are configured Step 5B: The configuration of SRS resources may be adjusted based on measurements at the TRPs or requesting new measurements according to step 1

In connection with the explained measurement report, the RSRP may be measured by measuring, with the UE, the RSRP on the DL RS from the serving and neighboring TRPs. RSRQ may be measured on the DL RS from the serving and neighboring TRPs with the UE. SINR may be measured, with the UE on the DL RS from the serving and neighboring TRPs. The ToA of a DL RS, e.g., a ToA of an Rx/Tx beam difference may comprise that the UE measures the time of arrival estimates on the DL RS and consistency check using different UE spatial filters. For example, if the UE is able to receive the signal from several beams of a TRP (and the effective position of all beams are nearly identical), the UE can estimate the ToA differences between the beams. This criterion can be used complementary to the RSRP or the ToA criteria is selected for the selection of the spatial filter and the RSRP criteria is used for the power control only. This criterion may be especially useful if the direct path may be impaired by destructive multi-path propagation with low delay or if strong multi-path components arrive with significant contribution to the overall RSRP. By way of example, which may be taken into account as a simplified version of a scenario illustrated in FIG. 5, TRP 1 may transmit the TRS reference signal of resources having index A, B and C within a resource set $q_S$. The UE performs the measurements with the Rx spatial filter 1, 2 and 3. The UE computes the ToA matrix for the Tx-Rx links and removes the known offset that results when the DL resources are transmitted at different times (if the TRP sense DL RS A, B and C at the same time AND the UE can receive on Rx-beam 1, 2, 3 and $t_{offset}$ is 0; however, this case may be unlikely to occur such that an offset may be considered. The normalized ToA received from resource N $DL_N$ with the Rx spatial filter $S_y$ within a resource set $q_S$ can be represented by:

$$ToA_{DL_N,s_y}(q_s) = ToA_{DL_N,s_y}(q_s) - t_{offset}$$

By way of non-limiting examples and for illustration purpose only, the measurements at the UE can be, in one scenario, according to the values given in FIG. 7, e.g., representing a TOA in nanoseconds It is to be noted that calculating the different ToA between the Rx spatial filters (1,2,3) is added to the standard by way of the described embodiments. Calculating the difference between the DL resources with one spatial filter is known from other positioning methods.

Alternatively or in addition, the UE may measure the signal quality (in respect to the expected ToA measurement performance) from the DL RS based on an estimate for the channel characteristics (LoS/nLoS detection, PDP profile, . . . ).

For example, DL RS to be used by the TRP so as to transmit a beam formed signal to the UE may comprise a synchronization signal block from the serving and/or neighboring TRP, and/or DL positioning reference signals (PRS) from the serving and/or neighboring TRP, and/or a channel state information (CSI) reference signal, e.g., from the serving TRP(s).

After having discussed possible implementations of a source of measurements and the measurements to be taken, in the following, details will be provided in connection with the content of the measurement report, i.e., information to be reported by the UE. Beyond known RSRP, RSRQ and SINR reports in which the UE reports the respective parameter measured or indicated by the network to a network entity (LMF or serving-gNB), the determined ToA Rx/Tx beam difference may be reported.

Further, the results of the measured signal quality may be reported with the UE. The UE may alternatively or in addition be adapted to provide for calculations or derived information based on the measurement data. For example, the measurement report may comprise information regarding a difference between RSRPs. For example, in connection with RSRP, the UE may report the RSRP difference only, thereby avoiding the RSRP values themselves to be transmitted. This may be an alternative reporting method focusing on the adjustment of the Tx power within the range defined by values such as a "minimum needed power" and "maximum power allowed to avoid over saturation". This may be useful to reduce the amount of signaling data. In the simplest case, it may be sufficient to report the RSRP of the strongest signal and the difference to the weakest signal identified by the UE as useful. This simplifies, for example, the reporting in case of beams with low directivity.

Alternatively or in addition, the UE may report the RSRP of strong signals only. In many cases, it may sufficient to increase the used power up to the limit defined by the capability of the UE or the value causing over saturation. To identify beam pass which may cause over saturation it may be sufficient to report the strongest signals only.

Alternatively or in addition, the UE may report the RSRP of best link(s) to a TRP (and a related UE filter index). The UE may select an appropriate spatial filter useful for many TRPs. Hence, the spatial filter can no longer be identified by a spatial relation to a DL RS. In this case, the UE may report the selected spatial filter by index or a different identifier and may report the RSRP for the RS transmitted by the TRP.

Alternatively or in addition, the UE may report the index of the best links (only), e.g., avoid a report of links which are not to be considered a part of the best links. For example, signals with the best RSRP may not be suited for ToA estimation. An alternative criterion (e.g., channel impulse characteristics) may be useful. For example, the UE may perform the measurements and a reference to the TRP spatial filter may be defined by the transmitted RS signal used for the measurement. For the selection of the UE spatial filter, a reference to a DL RS may not work. Hence, in this case, embodiments implement a method that supports alternative methods to select the spatial filter of the UE. The UE may report, for example, an index of the used spatial filter and the network entity may refer to this filter by indicating this index. It is to be noted, that such a referencing may also be implemented when not limiting the number of links being reported.

Alternatively or in addition, an index of useful links, e.g., links with an RSRP above a certain threshold, may be reported. The network may define a needed RSRP to detect links useful for positioning. The UE may just report the related spatial filter(s), e.g., one or several, for filling this requirement for a certain number of DL RS. The network may define that the needed number of TRPs and/or the UE may report a list of needed spatial filters (i.e., needed SRS resources, together with the number of TRPs which can be reached.

Alternatively or in addition, the UE may report a default spatial filter. For example, the UE may report, if the Rx spatial filter is the same as it used to receive with the default spatial filter that may be used, for example, in a fallback mode which is described below.

Although the measurement options illustrated above refer to RSRP, a different and/or an additional parameter may be used for such calculations, e.g., RSRQ or SINR.

Optionally, embodiments described herein may comprise providing support information comprising a systems data or a measurement configuration (MC) and system information (SI) to the UE. The support information may comprise information related to a RS supported in the wireless communication network. The method may further comprise providing a measurement report with the UE, the measurement report indicating a channel condition between the UE and at least one TRP determined by the UE based on the RS. This may be of particular advantage when the RS is transmitted to a UE and the UE is adapted or instructed to report the RSRP difference only. In connection with forming such a difference, a supporting information may provide for advantages. For example, the support information may be provided by a RRC entity, e.g., measurement configuration or as system information, and/or a location management function (LMF) entity of the wireless communication network, e.g., as a systems data. For example, such a method may comprise determining a channel condition between the UE and a TRP based on a correlation technique and using the support information for the correlation technique. That is, the support information may provide for a reference to be used with the correlation technique. The support information or assistance data provided from the NW to the UE can include:

No assistance data provided

Assistance data on the DL-RS (Providing assistance data by the network to a UE is supported in Rel-16)

The following is provided to the UE by higher layers:
   If the DL RS to be used is a SSB, provide the time/frequency occupancy, PCI list, periodicity of the SSB.
   If the DL RS to be used is a DL-PRS, provide the time/frequency occupancy of the DL-PRS.

TRP transmit power (to enable pathloss estimation by the UE)

Location of TRPs or some form of information telling that two or more TRPs are co-located.

Beside the topic which measurements to take and which information to report, embodiments also relate to the topic for which spatial filter pairs a report is generated, if the measurement report is provided. For example, the RSRP (and/or other information) is provided for all requested links, the request being provided, for example, by the network. Those requested links may be all possible links. Alternatively, the LPP and/or the RRC may select already a subset due to diverse criteria. That is, the set of links may be restricted by the network. Alternatively or in addition, the UE may report for links above a certain threshold/number only. That is, the UE may restrict the number. Embodiments provide for a method that comprises providing the UE with information indicating a subset of a set of spatial filter supported by the UE, transmitting a set of DLRS with at least one TRP and determining a channel condition between the at least one TRP and the UE by using only the subset of spatial filters at the UE, and reporting the reception quality to the network, e.g., as part of a measurement report. That is, the UE may limit the measurement report according to the limited set of beam pairs.

Alternatively or in addition, a method according to embodiments may comprise selecting, at the UE, a subset of a set of spatial filters supported by the UE, the subset related to TRP, e.g., a TRP serving the UE. The method comprises transmitting a set of DLRS with at least one TRP, e.g., the selected TRP. The method further comprises determining a channel condition between the at least one TRP and the UE by using only the subset of spatial filters at the UE. Further, the reception quality is reported to the network, e.g., as part of a measurement report. For example, spatial filters of the subset of spatial filters may be distinguished from one another by a filter ID regardless if the UE is provided with the information indicating the subset of if the UE selects the subset. A spatial filter of the subset of spatial filters may be determined based on a spatial relationship between the UE and an SSB.

In other words, the parameters of the positioning RS may be determined based on a measurement report provided by the UE, the measurement report indicating all configured DL RS on all available UE spatial filter configurations, a part of the full report being selected based on supporting information provided by the network data, e.g., a systems data, so as to select a part of the full report of selected RS signals transmitted by at least one TRP such as DL RS, a part of the full report being selected so as to comprise information related to links subject of oversaturation, e.g., RS signals received at the UE with high power or low pathloss, and/or a part of the full report being selected based on a determined good combination of DL RS signals and UE spatial filters, e.g., so as to provide the measurement report for this subset only. It is to be noted, that instead of a full report and instead of only one of the described subsets, the measurement report may comprise a plurality of subsets, e.g., good combinations in connection with links that are deemed to be subject to oversaturation.

Positioning methods to be used for determining the position of the UE, e.g., in 4800 and/or 6700, may incorporate or implement, for example, An uplink-time difference of arrival (UL-TDOA)
Round trip time with multiple TRPs (multi-RTT)
Round trip time with a single TRP and UL-TDOA with other TDOA
Angle of arrival (AoA with multiple TRPs)
Uplink map based positioning (fingerprinting)

A measurement report to be provided within the described embodiments may be structured in a plurality of ways. For example, reporting formats to be used for the measurement report may include:

At least one table of all values (according to the selected measurements) for a selected subset of links or for all links
A reporting of differences to predefined values
Maximum values
  e.g., one or more values per TRP that indicate if the TRP is useful and a related index
  best values (two or more) vs. TRP (useful to estimate gain of gNB processes more than one received beam per TRP)
  best values (two or more) vs. UE spatial filter (useful to estimate gain if more SRS resources are transmitted
  minimum values and/or maximum values vs. UE spatial filters (useful to detect UE characteristics and to estimate the potential gain of additional SRS resources)
  reporting of good combinations: the UE may select already useful links and provide the reports for this subset only The UE can report the measurements to the LMF via the LPP or to the s-gNB via the RRC protocol. However, as an alternative, sidelink communication may also be used. The s-gNB configures the UE with the needed SRS resources using the RRC protocol the configuration may be generated either directly at the s-gNB, e.g., by exchanging information with other gNBs in the network, for example, using the XM interface, or by taking the recommendation from the LMF.

To enable the LMF to compute the SRS configuration, the LMF communicates with the UE using the LPP protocol, through which the LMF may signal the UE to make certain measurements, and/or report back the measurements. The LMF may additionally interact with other networks such as next generation-random access networks (NG-RAN nodes such as NG-eNB or gNBs) using the NRPPa protocol to request measurements from the RAN network nodes. It may also optionally request the NG-RAN nodes to report measurement the NG-RAN node collects for radio resource management (RRM) proposes using the NRPPa interface.

In case of split base-station architecture, configuration of the TRPs, measurement requests, etc., may be signaled between gNB-CU and gNB-DU using the F1AP interface. Based on the measurements, the LMF make take recommendations for the SRS configuration and signal to the s-gNB using the NRPPa protocol. Other ways of signaling and reporting may also be used.

In connection with step 2 and 3 indicated above, and in view of a selection of the needed SRS resources and the SRS Tx power setting, the s-gNB or the LMF may analyze the reports and derive the SRS configuration, e.g., based on method 4000. This can be performed in different steps:

1. Calculate the pathloss. Note: If the reference points for the pathloss are the input power to the transmit (TX) antenna and the output of the RX antenna the pathloss is the sum of propagation loss of the channel itself and the antenna gains. Unless otherwise specified the transmit power refers to the power at the input of the transmit antenna.
2. Estimate the minimum SRS transmit power
3. Search for useable beam pairs (links). The following links do not belong to usable beam pairs and may be not further considered
    a. Links where the RSRP was below the detection threshold and the UE was not able to report measurement on the corresponding reference signals.
    b. Links which could be detected, but to reach these TRPs on the beam transmitting the RS, a transmit power exceeding the capability of the UE or the allowed P_CMAX value configured for the UE by the network for a particular frequency band is needed, so these cannot be used.
4. Evaluate the useable links and search for
    a. Is it possible to reach a sufficient number of TRPs with just one SRS resource?
    b. Determine the combination of needed SRS resources to reach the desired TRPs. The combination of SRS resources may be selected based on various criteria such as reducing the number of resources, reducing transmit power, taking into account frequency stability between different transmission, reducing ToA error.
5. Calculate the (minimum) needed transmit power for the selected resources
6. Check if for any beam pair the TRP will a receive a signal close or above the oversaturation point if the needed transmit power is used.
    a. If the headroom is high the transmit power can be increased
    b. If the minimum transmit power may already cause oversaturation or the signal may cause degradation to other signals (if non-linearities may cause interference to other signals, for example) remove the SRS resource from the list of to be configured SRS resources and look for alternatives
7. Optionally determine additional SRS resource according to step 5 and 6 to achieve "diversity" (e.g. the ToA is measured for several links representing the same distance (or at least similar distance if (small) difference of the positions of the transmit or RX antenna are taken into account.
8. For each SRS resource the power control is defined accordingly
    a. If the SRS is configured according to Release 16 the following method may be used
        i. A SRS resource set may include just one SRS resource
        ii. The spatial filter used for the SRS transmission is configured at resource level by giving a reference to a downlink signal. Assuming reciprocal channels the UE selects the spatial filter over which it receives this downlink signal with the highest signal strength iii. Alternatively the UE may use the same spatial filter as it used for providing the measurements according to step 1 being described in connection with measuring and reporting TRP beams subject to different UE spatial filter, i.e., the measurements to be done, the calculations described and the possible reporting.

b. According to release 16 of the standard TS38.213 two options are possible for the selection of the transmit power i. The UE is configured with a fixed power setting $\alpha_{SRS,b,f,c}(q_s)=0$ and $P_{O,SRS,b,f,c}(q_s)$ to the desired value according to the power control procedure briefly described herein ii. The power may be adjusted according to a DL RS. In this case the reference signal is selected by PathlossReferenceRS-Config at SRS resource set level and the values for $\alpha_{SRS,b,f,c}(q_s)$ and $P_{O,SRS,b,f,c}(q_s)$ are selected accordingly.

c. In future releases of the 5G standard additional methods for the power control and the SRS configuration may be possible. Possible enhancements are subject of embodiments described herein.

That is, the method may be executed such that the controller entity of the wireless communication network sets a transmission power of the positioning RS by providing the instruction signal so as to comprise α=0, α denoting a fractional pathloss compensation parameter being set to at least 0 and at most 1. A value $P_{0,SRS}$ being the desired value for the transmission power, and a value for the maximum transmission power, e.g., $P_{cmax}$ being a value greater than $P_{0,SRS}$ so as to indicate a maximum transmission power and therefore, a boundary. For example, the UE may select a value between $P_{0,SRS}$ and the maximum transmission power based on own measurements or considerations.

Additional examples of the present invention will be described in the following. Although providing details in connection with different examples, the examples are more to be understood as different scenarios within the embodied wireless network, the entities thereof and/or the embodied method. That is, according to an embodiment, one or more of the given examples may be implemented at a same time or subsequently, e.g., a different operating mode. In other words, features of the examples given may be combined with each other without limitation.

Example 1: SSB is Used as DL Reference Signal, Full Reporting of the RSRP

In this embodiment, an example for the reporting is given and an example for the procedure to derive the parameter for the SRS configuration and related configuration commands is given (based on features supported by release 16).

For the present example, it is assumed that:
a network comprises three TRPs. In the equations given, k denotes the TRP index.

For each TRP, three beams are assumed, i denotes the beam index. For illustration reason, numbers are used as index.

The TRP index and the beam index can be combined to a SSB index (or $SSB_{ID}$). In the example given the $SSB_{ID}$ is defined by $SSB_{ID}=3*(k-1)+i$. The $SSB_{ID} \in \{1 \ldots 9\}$ in this example.

For the UE three spatial filters are assumed. j denotes the spatial filter index of the UE. Note: the selection of the spatial filter of the UE by index is not supported by release 16, the spatial filter has to be selected by a spatial relationship.

Figure 8:
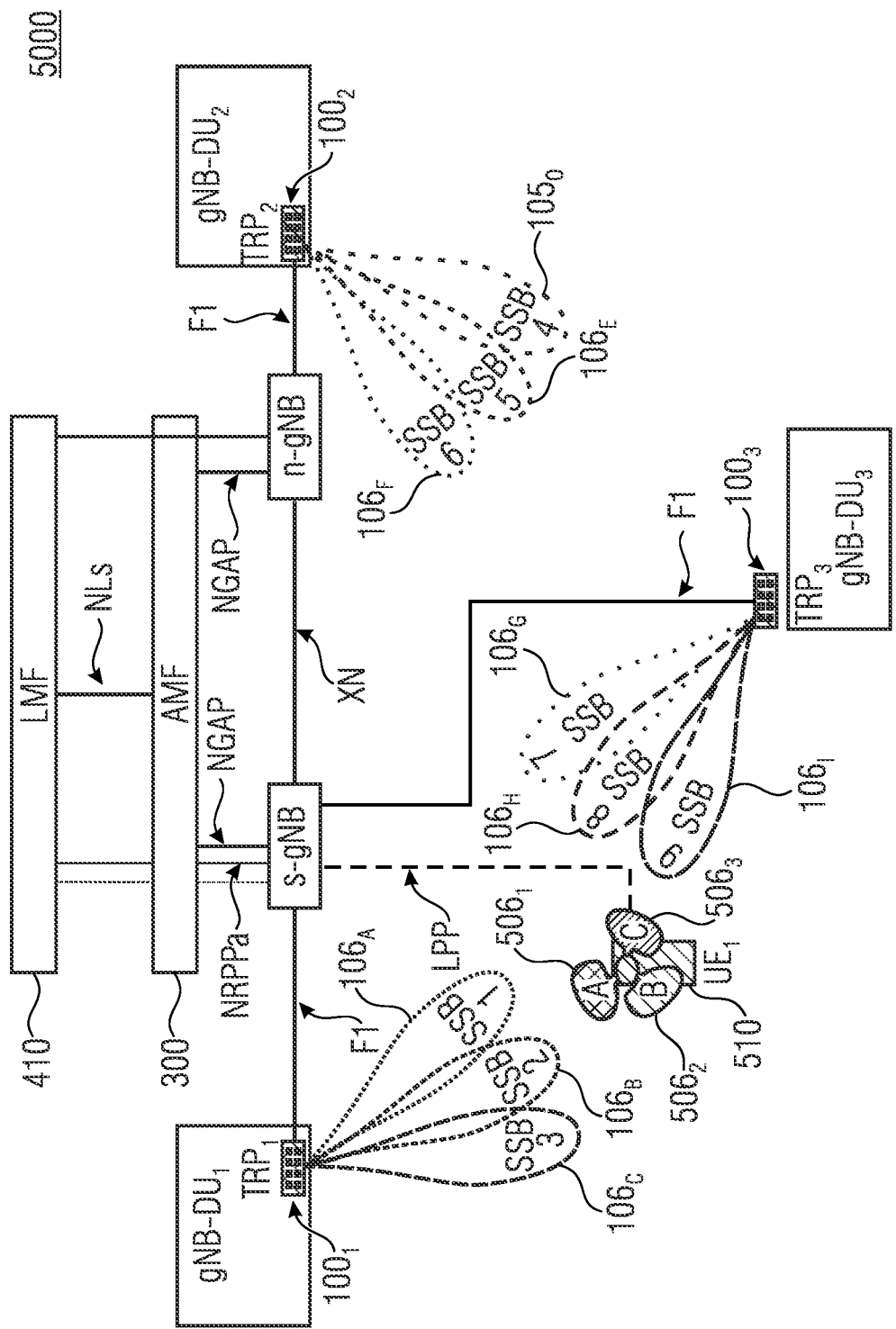
FIG. 8 shows a schematic block diagram of the wireless communication network of FIG. 5 in which a plurality of TRP transmits signals, according to an embodiment.

FIG. 8 shows a schematic block diagram of the wireless communication network 5000 in which a numeration of signals 106 and 506 is amended so as to refer to SSB1 to SSB9 and to further relate to spatial filters A, B and C. however, this does not amend a functionality of wireless communication network 5000. That is, FIG. 8 shows a depiction of UE measurement of various SSBs from different TRPs with various UE beamforming.

The RSRP may be derived from the signal strength of the SSB. At least three methods may be distinguished:

1. The SSB is detected in the same way as for the initial access to the network. In this case, a strong signal is assumed that the UE may also be able to decode the physical broadcast channel (PBCH) and can derive further information for additional measurements 2. If the UE is in RRC_CONNECTED state the UE may receive assistance data or support information and knows at least the physical cell ID (PCI) of the TRPs in the location area. The Pas or PCI range may be provided by the s-gNB. If the PCI is known, the primary synchronization signal (PSS) and the secondary synchronization signal (SSS) sequences are known and the UE is able to also detect very vague SSBs using correlation techniques, for example. The signal strength of the received SSB may depend on the distance and the SSB-transmit power. A network may include additional TRPs covering a small local area (e.g., "femto cells") or positioning only TRPs using a low transfer power. These additional TRPs may be useful for positioning purpose, even if the UE is already outside the coverage area of this femto cell 3. If the UE is in the RRC_CONNECTED mode, the UE may also receive further assistance data from the LMF and to simplify the detection of the SSB. The assistance data may, for example, include further details of the SSB configuration (e.g., a number of beams, position of the SSB in the frame, . . . ).

Figure 9:
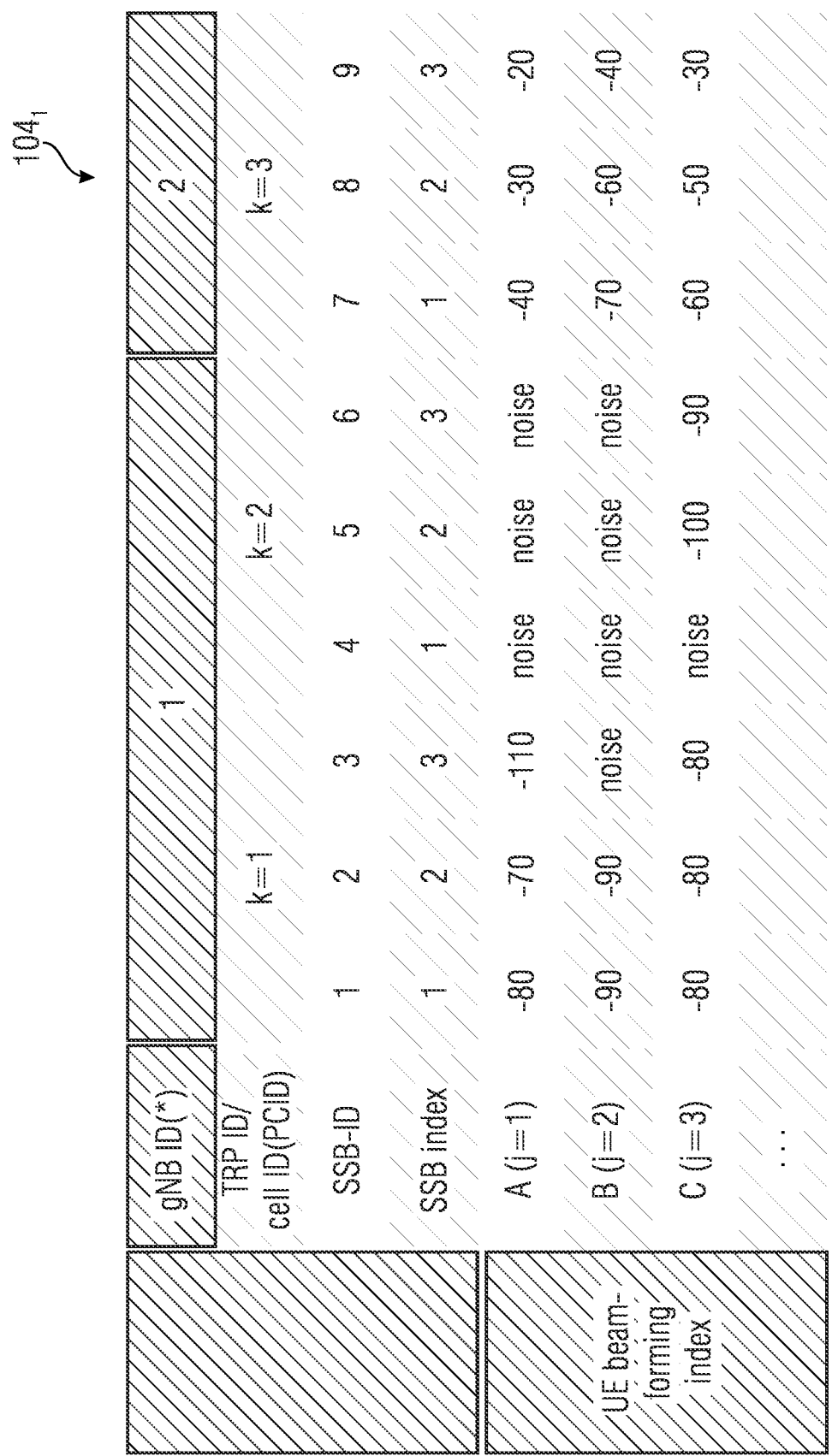
FIG. 9 shows a schematic illustration of content of a possible measurement report according to an embodiment.

FIG. 9 shows a schematic illustration of content of a possible measurement report 104 according to an embodiment. Note that for the illustration, the downlink measurement are made on SSB. However, the principle equally applies when the measurement is based on any downlink reference signal (such as DL-PRS, CSI-RS or PTRS) or any combination thereof. The illustration is made in a tabular form, wherein the table is based on a set of assumptions:

The PCI identifies the TRP in case of SSB—In case the TRP cannot be identified by PCI alone, NCGI may be used. Appropriate identifiers such as TRP-ID, together with other information such as NARFCN, NCGI may be used in case of other downlink reference signals to uniquely identify the TRP sending out the reference signal.

The SSB position defines the beam of the TRP and is given as SSB-index

The PCI and the SS beam-index can be combined to a SSB-ID (or another identifier is associated to the beam by higher layer signaling, or the beam can be uniquely identified by a combination of a number of physical layer parameters). Likewise, in case of downlink positioning reference signals, the identifier should be selected so that the UE is able to identify a downlink beam within a group of downlink beams from one or more TRPs.

The different spatial filter configuration of the UE is reference as "UE beamforming index". Note that using different antenna elements with different antenna patterns or different position/orientation on the UE may also be a method for implementing different spatial filers.

The example values given in the table are based on the following assumptions:
  TRP1 is at medium distance
    Beam 1 and beam 2 provide useful power level
    Beam 3 is very weak
  TRP is at high distance
    Only beam 2 and 3 (SSB-ID5 and SSB-ID6) can be detected by the UE
    The best beam is beam 3 (SSB-ID=6)
  TRP3 is close to the UE
    Especially beam 3 may be subject of overload. Spatial filters A and C ($506_1$ and $506_3$) provide a high signal strength. The spatial filter A ($506_1$) is the best in this example
  Spatial filter C can reach all TRPs (assuming reciprocity)
    Assuming the TRP3 is the s-gNB and a spatial relationship to SSB-ID=9 ($106_I$) is selected, the UE would select spatial filter A ($506_1$)
    To force the UE to select spatial filter C ($506_3$) two methods are considered
      Support direct selection of the spatial filter beam index (at network side)
      Use TRP2, beam 3 (SSB-ID=6, $106_F$) as reference for the spatial relationship.

The table given in FIG. 9 may represent the $RSRP_{(k,i,j)}$. Assuming the TRP transmit power is for each beam given by $P_{TX(k,i)}$, the pathloss can be calculated In the same way the minimum received power at the input of the TRP may be known for each beam and is given by $P_{RX,min(k,i)}$ (Note: The needed input power may depend on the SRS configuration (bandwidth, transmission comb number, number of OFDM symbols assigned to the SRS) and the TRP performance. This may be implementation specific) the needed minimum UE transmit power can be calculated by $$P_{SRS,min(k,i,j)} = P_{RX,min(k,i)} + PL_{(k,i,j)}$$

Furthermore the power level causing oversaturation of the TRP may be also known and given by $P_{RX,max(k,i)}$ (Note: For the maximum power it should be distinguished between the maximum power per BWP (or power spectral density) an the overall input power (e.g. power causing overload at the ADC). For simplicity reason this is not further distinguished in this document).

$$P_{SRS,max(k,i,j)} = P_{RX,max(k,i)} + PL_{(k,i,j)}$$

FIG. 9 shows the measurement values of received power in dBm, noise indicates a signal power below a usage threshold.

Figure 10A:
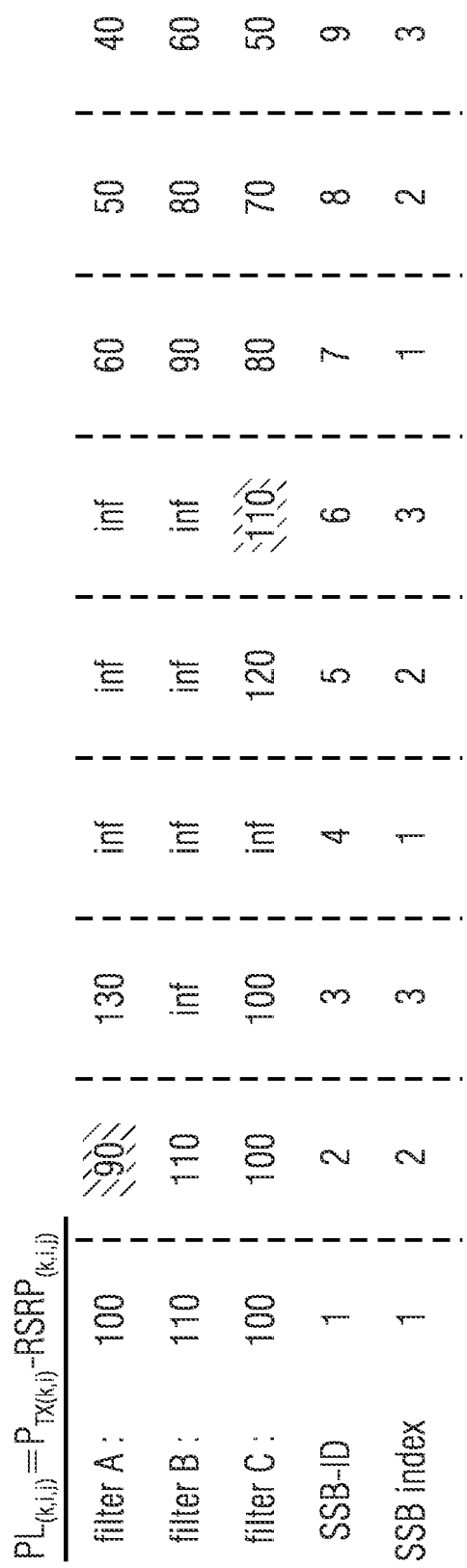
Figure 10B:
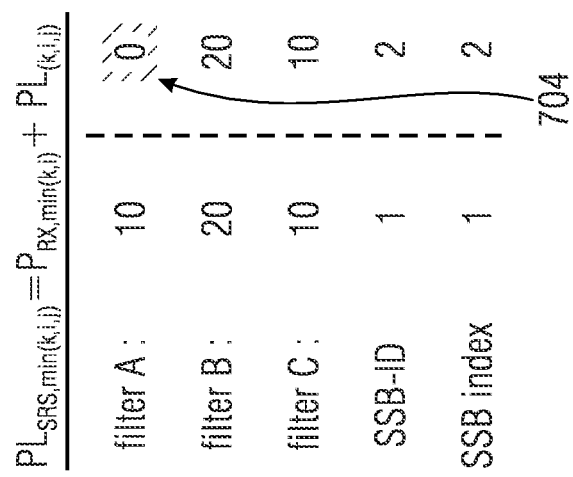

FIGS. 10a and 10b show a schematic table representation of calculations being made with the measurements performed with the UE.

As an example, $P_{RX,min(k,i)}=-90$ dBm (minimum received power) and $P_{RX,max(k,i)}=-20$ dBm (maximum received power before oversaturation) is assumed for all k and i for the example, whilst this does not exclude embodiments in which those values differ among k and/or among i. A result of the assumption is given in FIG. 10a in which the power loss (PL) for each SSB-ID is calculated. The pathloss may be calculated by subtracting the $RSRP_{(k,i,j)}$ from the transmit power $P_{TX(k,i)}$ that is, from the measurement report $104_1$ the controller entity may obtain, in knowledge of the used transmit power and the measurement report, the pathloss for each SSB-ID.

Therefrom, the needed SRS transmit power can be calculated, e.g., with $P_{RX,min(k,i)}=-90$ dBm resulting in $P_{srs,min(k,l,j)}=P_{RX,min(k,i)}+PL_{(k,l,j)}$. That is, the minimum transmit power may be determined by adding the determined pathloss illustrated in FIG. 10a to the minimum received power.

The results show that assuming for each SSB ID the best UE spatial filter can be selected by using the filter with the highest RSRP (this implies lowest pathloss and therefore the lowest needed transmit power) the first filter (A) $506_1$ can be selected by using a reference to $SSB_{ID}=2$ ($106_B$). The filter B ($506_2$) can't be selected as there is no way supported in the release 16 to force the UE to select a dedicated filter. Further, filter C ($506_3$) can be selected by a reference to SSB-ID=6 ($106_F$).

Further, for spatial filter A (first row) the UE was not able to detect the signal from TRP2 (all values—INF/noise in the RSRP report and hence, a transmit power of "INF" (infinite) would be needed. For TRP1, the spatial filter related to SSB-ID=3 will provide a useful signal if the SRS transmit power is selected to be 40 dBm, see result 702. To reach TRP1 and TRP3 using filter A and using the best TRP spatial filter, the minimum needed power is 0 dBm, see result 704. If spatial filter C (third row) is used, all TRPs can be reached. If for TRP2 the spatial filter related to SSB-index=3(SSB-ID=6) is selected, a transmit power of 20 dBm is sufficient, see result 706.

The calculated power can be cross-checked with the power causing oversaturation. With $P_{rx,max(k,i)}=-20$ dBm, the result is, as shown in FIG. 10c from which it may be derived that for the spatial filter C a power of up to 30 dBm can be configured before oversaturation may occur at TRP3 which is the TRP close to the UE, see result 708.

According to this result, the network (gNB, LMF or any RRC entity) may configure the UE to transmit the SRS according to one embodiment, as follows:
  1. Option 1: Only one SRS resource set is used containing one SRS resource:
    a. The SRS resource (bandwidth, number of symbols, transmission comb number) is selected according to positioning requirements. In case of limited margin the RRC may assign more OFDM symbols and/or higher transmission comb numbers to increase the link margin
    b. The spatial filter for the resource is selected by the using the IE spatialRelationInfoPos-r16 (see TS 38.331 V16.0.0) using a reference to $SSB_{ID}=6$
    c. The transmit power for the SRS resource is configured at the SRS resource set level by using the IE alpha-r16, p0-r16, pathlossReferenceRS-Pos-r16 using a reference to $SSB_{ID}=6$ (only needed if alpha-r16>0). The standard allows to use
      i. alpha-r16=0 (no pathloss compensation=fixed power) or alpha-r16>0 (full or partial pathloss compensation
      ii. p0-r16 can be any value between −202 and 24 [dBm]
    Note: In this case the UE is configured one SRS resource set including only one SRS resource for the given example. In a more complicated case, the UE may be able to reach the needed number of TRPs only with multiple SRS resources. In this case, the LMF may configure multiple resource sets with possibly multiple resources. The number of sets to be configured depends then on the number of links whose pathloss the UE needs to track.
2. Option 2: Two SRS resource sets each including one SRS resource
   a. For the example, the spatial filter A is configured by reference to $SSB_{ID}=2$.
   b. A second SRS resource set is configured using spatial filter C with reference to $SSB_{ID}=2$.
3. Option 3: Constant power setting, Spatial relationship is only needed for the selection of the UE transmit spatial filter: One SRS resource set is configured containing two SRS resources
   a. The example above show that for spatial filter A, a transmit power up to 20 dBm can be used.
   b. Hence it is possible to use the same (constant) power settings for both resources.
   c. For the SRS transmit spatial filter different references can be given at resource level
      i. For the first resource $SSB_{ID}=2$ is selected to ensure This may be considered as a network that is a recommendation to the UE which power and/or spatial filter and/or SRS configuration to be used, at least within some boundaries indicated in a respective signal. The UE can decide to follow this recommendation but may also be implemented to the side differently.

Example 2: Enhancements to Release 16

This chapter focus on possible enhancements to Release 16 for alternative embodiments of the procedure and related signaling.
Direct selection of the UE spatial filter by index
Allow for each SRS resource a different reference signal for power control
   pathlossReferenceRS-Pos-r16 or similar is added to each SRS resource
$P_{CMAX}$ is a common parameter valid for all UE in the cell. At a $P_{max,SRS}$ to the SRS resource or resource definition to give an upper limit for the SRS transmit power (this power may be higher than $P_{CMAX}$ (if low values are selected for $P_{CMAX}$ to minimize interference to other cells, but for positioning purpose higher values are allowed) or lower than $P_{CMAX}$ if the interference caused by SRS for positioning shall be limited
Support SRS resources with simultaneous transmissions over several spatial filters
   Can be combined with direct selection of the UE spatial filter
   A related capability report is needed
   Remark: The definition of codebook based/non-codebook based shall be further discussed in the context of SRS for positioning. There is no need to estimate the codebook (applied to data) therefore both definitions may be valid.

Example 3: Indication of the Spatial Filter for Default SRS

The UE can send an indication on the DL-RSs detected with the same UE-RX-spatial filter default spatial filter (Spatial filter A in FIG. 6) then the LMF will know that this SRS resource will operate in default mode and can configure the power accordingly (i.e. if the flag was on the LMF can configure the OLPC setting according to the last resource conditioned that default spatial relation did not change).

The procedure from the 3GPP standard can be like, where:
[ ] indicates for a new field to be defined and the Underlined text is new procedure:
(1) Define the default spatial filter relation:
   When a higher layer parameter [DefaultSRS] is set 'enabled' or the higher layer parameter spatialRelationInfo is not configured, and if the higher layer parameter is configured as an SRS-for-Positioning resource set, the UE shall transmit the target SRS resource with the same spatial filter used for the RS resource obtained from the SS/PBCH block of the serving cell that the UE uses to obtain MIB.
(2) Define the procedure for UE when the DefaultSpatialFilter is configured:
   When the higher layer parameter spatialRelationInfo is configured, and if the higher layer parameter is configured as an SRS-for-Positioning resource set, and if higher layer parameter [DefaultSpatialFilter] is configured, the UE shall report whether the RS indicated in the higher layer parameter spatialRelationInfo can be received with the same spatial filter used for the RS resource obtained from the SS/PBCH block of the serving cell that the UE uses to obtain MIB.
The UE reporting is subject to the UE's capability.
The UE support of spatialRelationCritera, DefaultSpatialFilter is [subject to the UE's capability].
The UE spatial filter selection is subject to the UE's implementation.

Example 4: Measurement Reporting without Explicitly UE Beamforming Index

Figure 11:
FIG. 11 a schematic tabular representation of a limited measurement report according to an embodiment.

UE-beamforming index may be replaced by specifying a spatial relation to a DL RS like SSB or PRS. One or several SSBs may be preselected and the measurement report may include the RSRP and/or RSRQ and/or SINR thereof or associated therewith. An example of such a measurement report is shown in FIG. 11. A reporting of the measurement of a reference signal such as SSB, CSI, DL-PRS or the like is illustrated. The row is indexed by the best UE reception beam (tracked by the UE) for receiving a certain RS, and provides the measurement when the same UE beamforming is used for receiving other RSs. The measurement quantity may be, for example, RSRP, RSRQ, SINR or the like. It is to be noted that the examples given, especially the numbers and/or quantities and/or values are shown for giving an example without limiting the embodiments described herein.

Example 5: DL-PRS is Used as a Reference, the ToA Difference is Used as Criteria When referring again to FIG. 7, an example embodied with the present specification relates to determining the position of the UE based on measurements that relate to a different ToA between the RX-spatial filters.

Example 6: UE-Signaled Spatial Relation and Pathloss Reference for Reducing Signaling Overhead FIG. 12 shows a schematic illustration of a possible content which may be comprised in a measurement report 1043 according to an embodiment. That is, after computing the respective information, the UE may report at least some of the illustrated information, in particular, the spatial filter, the ID, the beams measured, a spatial relation, an optimization criteria, i.e., for which the measurement is optimized for, beams on other TRPs, acceptable beams on other TRPs, overload beams and additional measurements, e.g., for signaling which of the DL beams are reported with the measurement values (for example a bitmap with respect to the beams measured field). The measurement report 1043 may further comprise measurement values being a list of measurement values associated with the measurement indicated above.

The ID may comprise an identifier for the SRS configuration. The beams measured may comprise a list of DL-RS that are measured. The spatial relation may comprise an indication of which DL RS (CSI-RS, SSB, DL-BRS, etc.) is used as spatial relation. It may alternatively or in addition comprise a UE-signaled index.

To indicate for which goal the measurements are optimized, the UE may indicate which is the best DLRS received by this spatial relation. In view of the beams on other TRPs, the UE may indicate the best beam on other TRPs reachable by this SRS configuration. Acceptable beams on other TRPs may indicate the beams where the SRS might be acceptably received at the TRPs. Overloaded beams may indicate the beams that should not be turned on, otherwise oversaturation may happen.

According to embodiments, a measurement report may comprise additional information and/or may comprise only part of the illustrated optimization. For example, there may be an indicator for the beams while omitting an indicator for acceptable beams or overloaded beams. Alternatively, an indicator of overloaded beams may also provide for sufficient information, indicating that other beams might be used to a certain extent or the like.

The network can request the UE to specifically report values on certain beams and the reachability situation (overload, normal or unreachable) on other beams. If the network has requested measurements on certain beams, the measurement on the beams may be included. Otherwise, the UE may choose not to report the measurement values or may select to report a certain subset of measurements.

The coordinating network entity (e.g., LMF or s-gNB) may signal the TRPs the following:
  the beams that are optimal to the UE by some criteria such as RSRP or TOA
  the beams that can alternatively or additionally be activated to receive the UE signals and/or the beams that cannot be activated when the aforesaid UE is transmitting, to avoid overload or severe interference to other links.

A method in accordance with embodiments may comprise determining a transmission power for the positioning RS, for example, based on the assumptions illustrated in connection with FIG. 9, FIG. 10a, FIG. 10b and/or FIG. 10c. Determining a transmission power for the positioning RS may be implemented such that the parameters of a positioning RS comprise information indicating the transmission power of the positioning RS being used by the UE. The transmission power may be determined as a fixed value or may be determined by configuring and transmitting a RS, the RS being received with the UE and the RS being used to adjust the transmit power according to measurements on a downlink signal by the UE.

Embodiments according to the present invention may comprise instructing at least one TRP to deactivate at least partially, i.e., to switch off or to implement a suitable attenuation, at least one spatial reception pattern or beam during a time interval in which the UE transmits the positioning RS. The at least one spatial reception pattern is determined based on the positioning RS, e.g., to avoid oversaturation at the TRP. Alternatively or in addition, the TRP may be instructed to activate at least one spatial reception pattern during a time interval in which the UE transmits the positioning RS, wherein the at least one spatial reception pattern is determined based on the positioning RS, e.g., to receive the signal. This does not prevent to determine the position of the UE by receiving the positioning RS transmitted by the UE with a plurality of TRP. Embodied methods comprise evaluating reception of the positioning RS at the plurality of TRP and determining the position of the UE based on the evaluated receptions.

Figure 13:
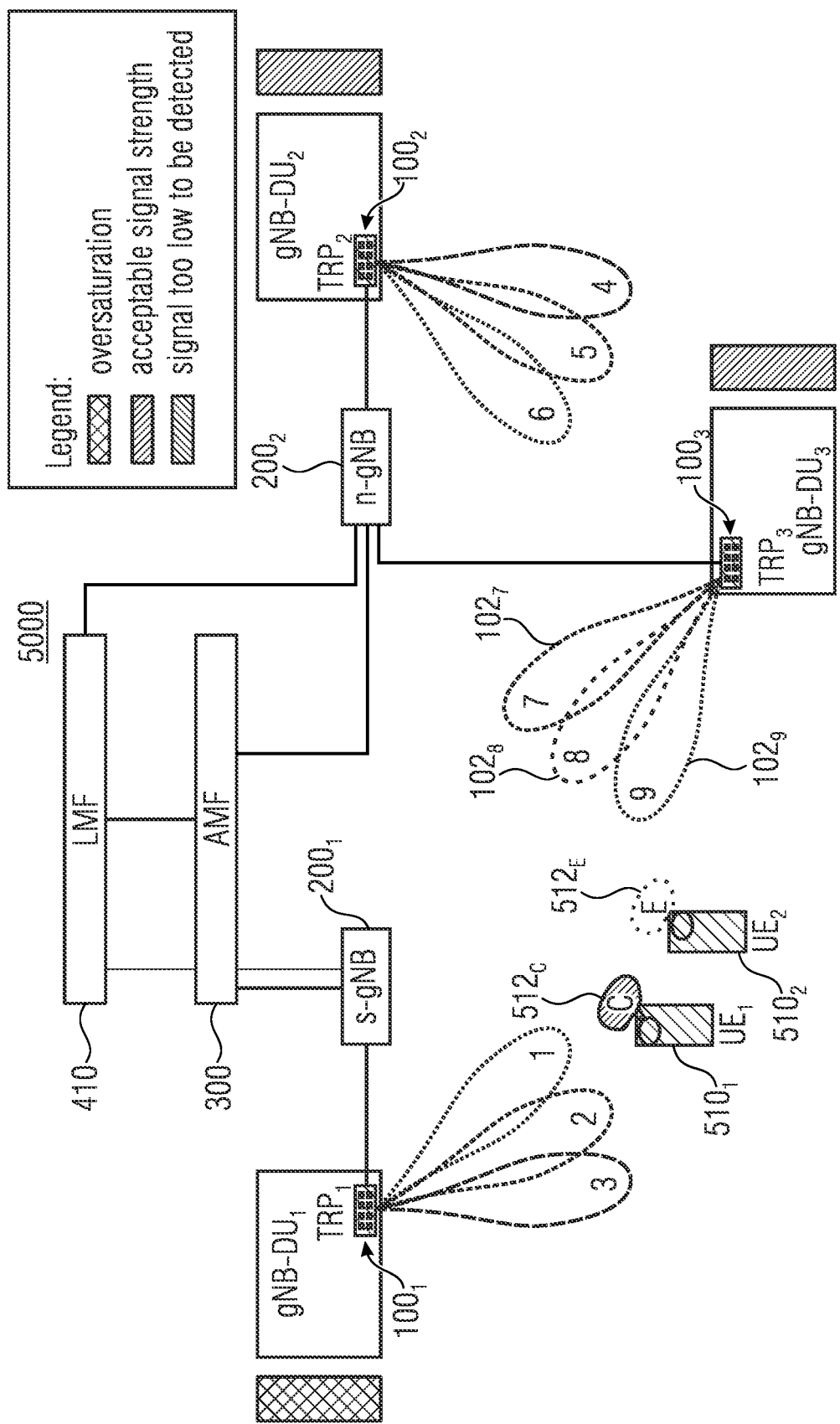
FIG. 13 shows a scenario of the wireless communication network of FIG. 5 in which two UEs are arranged, according to an embodiment.

FIG. 13 shows a scenario of the wireless communication network 5000 in which $UE_1$, $510_1$ and $UE_2$, $510_2$ transmit a positioning RS by use of spatial filters $512_C$, $512_E$ respectively. Considerations of the network may allow to consider transmission or more than one single UE.

For example, UE $510_2$ may be considered to be not scheduled with beam $102_7$ or $102_8$ as long as UE $510_1$ is scheduled to use its spatial filter $512_C$. Otherwise, the TRP $100_3$ is overloaded and cannot receive UE $510_2$. In this case, the coordinating entity LMF or s-gNB (for UE $510_1$) may instruct the gNB hosting TRP $100_3$ to not activate beam $102_7$ and $102_8$ for any of the users. That is, the parameters of the positioning RS and/or the beams to be activated and/or deactivated at the TRP may be determined in a global manner including a consideration of cross-correlations.

Example 7: Fallback if the Reference Pathloss Cannot be Measured

Figure 14:
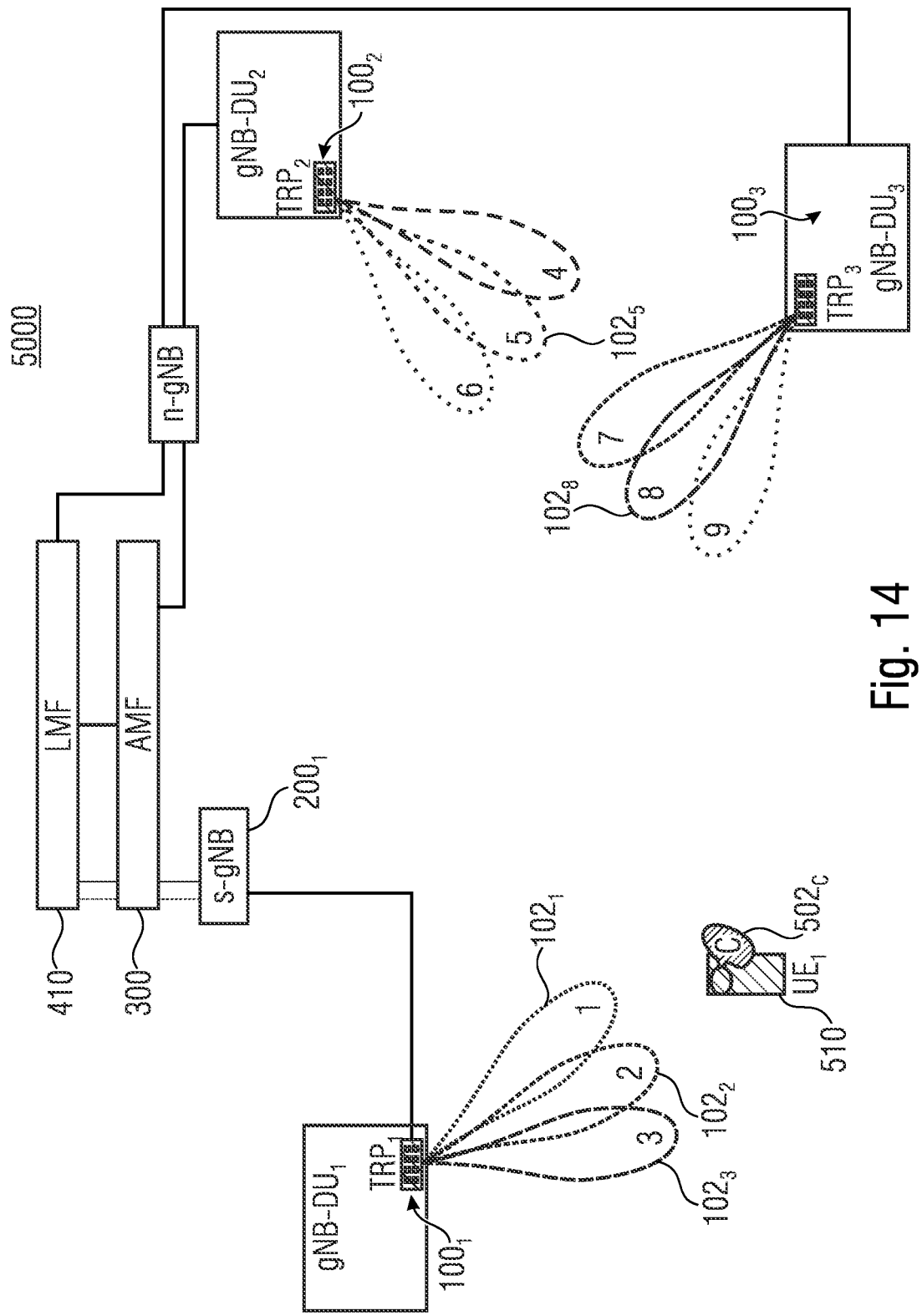
FIG. 14 shows a schematic block diagram of wireless communication network of FIG. 5 in an example scenario in which the UE is configured to transmit a sounding reference signal by its serving cell, according to an embodiment.
Figure 18:
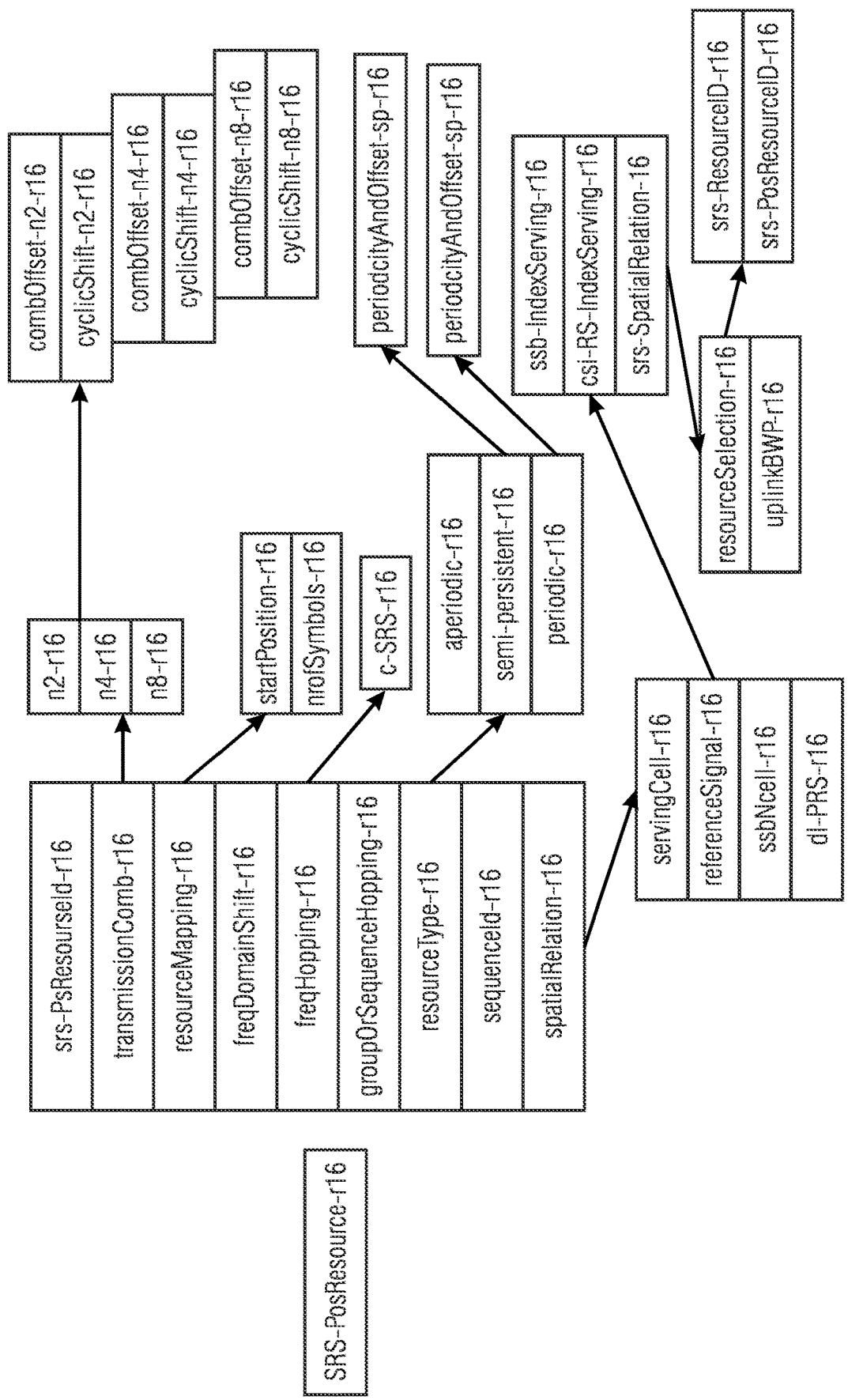
FIG. 18 shows a schematic representation of known parameters of a sounding reference signal SRS that are defined at resource level.
Figure 19:
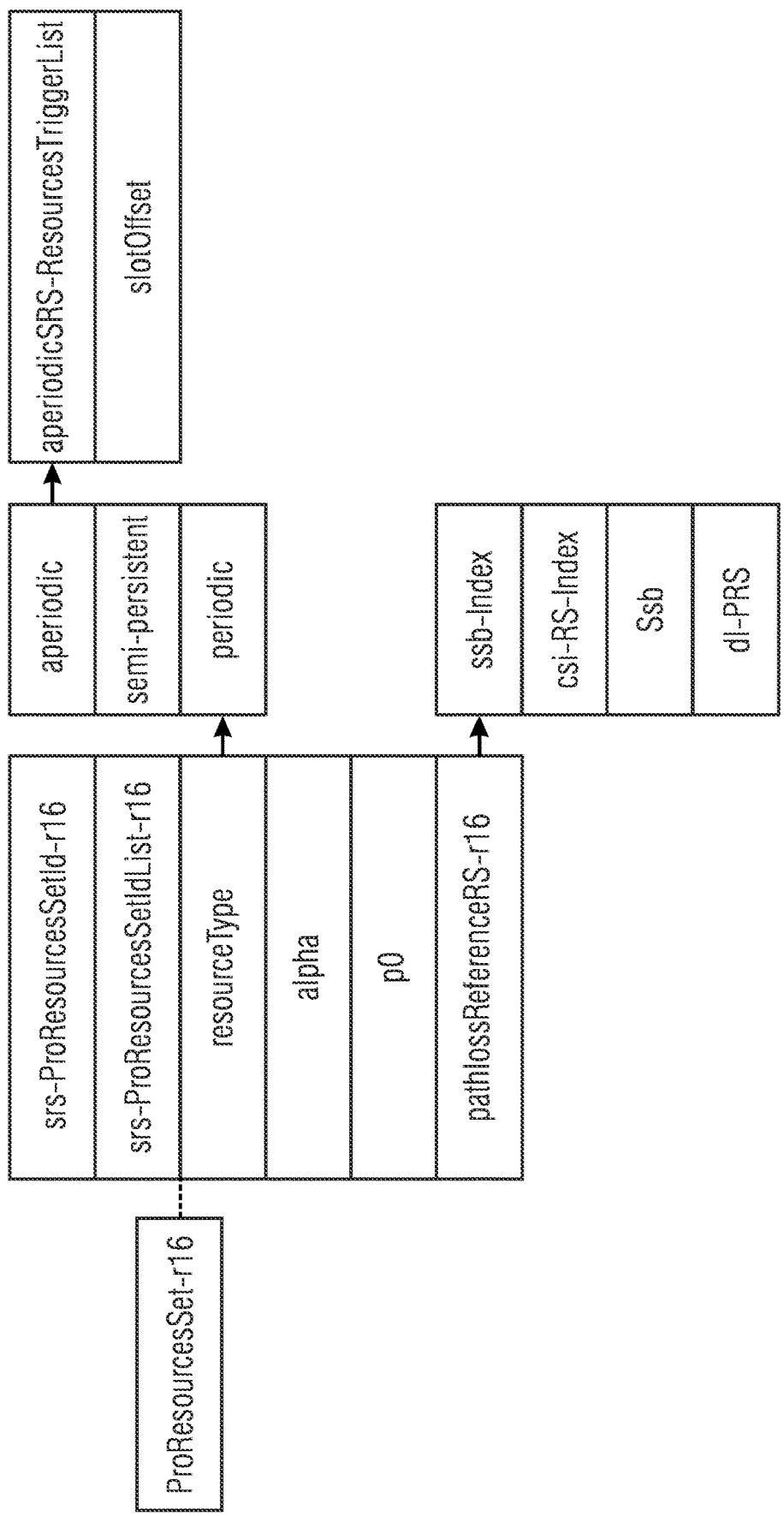
FIG. 19 shows a schematic representation of known parameters of a sounding reference signal SRS that are defined at resource-set level.

FIG. 14 shows a schematic block diagram of wireless communication network 5000 in an example scenario in which the UE is configured to transmit the SRS or positioning RS by its serving cell, with an intention of reaching TRP $100_2$ using spatial filter C or $500_C$. The UE may, for example, be configured to use the DL RS corresponding to beam $106_5$, i.e., beam $102_5$ as a pathloss reference signal for power control and/or for spatial relation.

According to Rel.16 of 38.213, in an event that the UE determines that it cannot accurately measure the pathloss using the downlink reference signal signaled by the higher layer as a pathloss reference RS, then the UE calculates the pathloss using the RS resource obtained from the SS/PBCH block of the serving cell that the UE used to obtain the master information block (MIB).

In the example given in connection with FIG. 14, it may be assumed that the RS transmitted on beam 5 is used as a downlink pathloss reference signal and the UE has determined that it couldn't determine the pathloss accurately, it may use the fallback mode that the RS on beam 2 (assuming that UE 510 decoded MIB from the beam corresponding to beam 102) as a pathloss reference. As a result, the power control is carried out with respect to TRP $100_1$ and the power may not be sufficient to reach TRP $100_2$.

On the other hand, the network may have additional information about other TRPs which may a similar pathloss with regard to the UE. The network may be able to utilize its knowledge of location of TRPs and beam directions to configure the alternative pathloss reference RS.

To enable a reasonable alternative for pathloss instead of using a fallback to its serving cell, the network may be able to also provide the UE with an alternative RS to be used as fallback, if the UE is unable to determine pathloss accurately according to the configured downlink pathloss RS. When compared to release 16, if the UE cannot determine the pathloss accurately according to the downlink reference signal, signaled by the higher layer as pathloss reference RS, and if the UE is also configured with a fallback downlink RS for pathloss reference being introduced as a new RRC parameter, then the UE may calculate the pathloss using the RS resource provided by the network as a fallback downlink RS for computing pathloss. For example, in an embodied method, the TRP is a selected TRP which is selected for the positioning procedure based on a measurement report so as to receive the RS from the UE such that the instruction signal is generated so as to comprise the parameters of the positioning RS so as to be tuned with respect to the at least one TRP. The selected TRP may be selected according to the pathloss reference. According to an embodiment, the parameters of the positioning RS are tuned with respect to the at least one TRP in a case where a prior determination of a pathloss RS in the wireless communication network is unsuccessful. For example, the selected TRP may be selected based on the similar pathloss with respect to the UE. According to an embodiment, the parameters of the positioning RS are determined based on determining a pathloss reference RS that is defined at a RS resource set level of the wireless communication network; determining a spatial relation between the UE and the at least one TRP; and determining a nominal receive power of the TRP that is defined at the RS resource set level of the wireless communication network. Determining the pathloss reference RS may comprise a quasi-collocation (QCL) of at least two RS.

The specification do not specify how the pathloss reference RS and the spatial relation will be established, leaving it up to implementation. A possible implementation according to an embodiment is based on "beam sweeping". The TRP sequentially transmits reference signals using different beam characteristics and the UE scans the signal by selecting different receive spatial filters and reports back the signal strength. Using these measurement reports, the network entity (LMF; location management function or the s-gNB) can determine beam pairs. The UE beamforming can be indicated by associating the UE beamforming previously used by the UE for reporting measurement of a certain reference signal or for transmitting another SRS.

According to an embodiment which may be implemented in addition or as an alternative, the UE may determine a determined spatial relationship in the wireless communication network based on a Time of Arrival (ToA) of a DL RS jointly with a received signal reference power (RSRP) of the DL RS.

Those are examples to determine what is called a spatial relation. Typically, the spatial relationship may be established according to the signal strength. The beam providing the highest receive power may be selected as the UE beamforming, but the selection of spatial relation is left for UE implementation.

A UE in RRC_CONNECTED state can be configured to measure and report the RSRP (Reference Signal Receive Power), RSRQ (Reference Signal Receive Quality) and SINR (Signal to Interference+Noise Ratio) for a serving cell as well as a neighboring cell. The measured values can be configured to be reported periodically, and the number of RS indices to report can be specified. The measurement is configured and reported to SSB (synchronization signal block) and CSI-RS (channel state information-reference signal) for a list of cells on a frequency layer. The LMF shall retrieve the UE reported RRM (radio resource management) measurements from the s-gNB or the UE for the purpose of determining SRS configurations.

Likewise, within an LPP session, the location server has a mechanism to request a UE for RSRP measurements on DL-PRS and the UE reports the requested measurements as configured. Furthermore, in 3GPP the spatial relation and pathloss reference signal along with other SRS configurations are provided by the location server (LMF) to the s-gNB as recommendations and the s-gNB actually configures the UE with SRS, or triggers the UE to start transmitting the SRS (in case of semi-persistent and aperiodic configurations).

According to an embodiment, determining the pathloss reference RS may comprise execution of a beam-sweeping at the TRP as described, the specification does not specify how the pathloss reference RS and the spatial relation will be established, thereby leaving it up to implementation. A proposed implementation is based on beam-sweeping. According to an embodiment, determining the pathloss reference RS comprises execution of a beam-sweeping process at the TRP to transmit a plurality of beams or RS. The method comprises scanning of the swept plurality of beams at the UE or using the UE. The method comprises reporting at least a result of the scanning to the network, e.g., using a measurement report. The method further comprises determining a beam pair based on the reporting, wherein one beam of the beam pair is one of the swept plurality of beams. According to the embodiment, the method comprises determining at least a part of a spatial information of the positioning RS based on the determined beam path. Thereby, the UE may calculate the pathloss using the RS resource provided by the network as fallback downlink RS for computing pathloss. If the UEs can still not determine the pathloss reference RS from the fallback RS provided, and the UE may calculate the pathloss using the RS resource obtained from the SS/PBCH block of the serving cell that the UE used to obtain the MIB. Alternatively, the UE may avoid transmitting on such SRS resource and report a failure to the network. It is, according to an embodiment, a method and a UE may be implemented such that in case the UE determines that it cannot determine the pathloss reference and cannot determine the pathloss reference RS from the fallback, then it may report information indicating a failure in determining the pathloss reference to the network.

The UE may signal the network whether it has used the fallback RS or the default pathloss RS, when it is unable to determine the pathloss according to the configured downlink pathloss RS. That is, a method may be implemented in a way and/or devices may be adapted so as to, for transmitting the positioning RS, the UE tries to determine a pathloss RS or a spatial relation in the wireless communication network, e.g., as a usual operation. In a case where the determination is unsuccessful, the UE may use at least one of a default spatial relationship; a RS being tuned to a selected TRP, e.g., as a fallback RS, and a pathloss reference being tuned to the selected TRP, whichever is more appropriate and/or available. The action taken may be signaled to the network, e.g., the UE may signal, to the network, the use of the default spatial relationship; the RS being tuned to the selected TRP, and/or the pathloss reference being tuned to the selected TRP.

In the example above, the UE 510 may be configured with downlink pathloss reference RS as RS transmitted on beam 5, i.e., the beam corresponding to beam $102_5$, in particular, the transmission beam pattern corresponding to reception beam pattern $102_5$. Further, the UE may be configured to have a fallback downlink reference RS as an RS transmitted on the beam corresponding to beam $102_8$. Now, if the UE cannot determine pathloss accurately using the RS transmitted on the beam corresponding to beam $102_5$, then it transmits the SRS using pathloss determined using the RS transmitted on the beam corresponding to beam $102_8$.

Likewise, if the UE is not able to accurately measure the pathloss or alternatively RSRP, DOA, TDOA, AOD or the like using the configured spatial relation, it may utilize the fallback spatial relation if it is configured with a fallback spatial relation. If the UE is unable to measure on fallback either, that may either resort to default spatial relation, the RS for spatial relation used for acquiring the MIB or alternatively avoid transmitting such as RS and report the failure to the network. FIGS. 15a and 15b show a non-limiting example of a snippet ASN.1 code showing the configuration of SRS resource set for positioning with the message SRS config, which is modified to include the additional signaling to indicate the fallback behavior (highlighted by underlining the code) to the UE. FIGS. 15a and 15b show a common code in which the code being shown in FIG. 15b follows the code of FIG. 15a. In lines 47 to 53, additional code is included that defines the fallback pathloss reference RS.

FIGS. 16 and 17 show additional ASN.1 code, snippets thereof respectively.

The UE PosRSMeasFailure-Resolution is used, for example, by the UE to signal to the network the information regarding failures detected by the UE and measuring downlink RS. For example, FIG. 17 shows such a PosRSMeas-Failure-Resolution information element.

It is to be noted that the code illustrated is for information propose and may be modified without deviating from the structure, the information transmitted or the functionality implemented therewith.

The embodiments described herein allow to generate precise positioning based on considerations on a network level which is supported by measurement reports provided by a single UE or by multi UEs. As described, for example, in connection with FIG. 13, two UEs $510_1$ and $510_2$, both transmitting their measurement reports allows the air controller entity to consider the situation, the spatial requirements and the demands of each of the UEs together with each of the TRPs and allows for a global consideration of defining the parameters of the positioning RS, e.g., the SRS used for positioning. That is, within the range of reception of the TRPs used or present and within the range that is effected when transmitting with the UE(s) the positioning RS and/or operation of the TRP (e.g., when defining beams to be activated and/or deactivated) may be tuned. A similar option may be obtained even without a measurement report when allowing the UE to determine the parameters of the positioning RS with the UE, at least within boundaries. With only minor differences in the information contained in the instruction signal the advantages may be obtained. It is to be note that the described boundaries may be transmitted in the instruction signal but may also be predefined or known at the UE. For example, the UE may have knowledge or information that it may deviate from the transmission power or the like by a predefined range, e.g., +/−20 dBm, +/−10 dBm or a certain percentage. According to an embodiment, the instruction signal may be generated to comprise instructions indicating a spatial information of the positioning RS, a RS characteristic, e.g., symbols to be transmitted, and a transmission power to be used for transmitting the positioning RS. The transmission power may be an explicit value but may also be a relative value to a nominal transmit power being known to the UE.

Alternatively or in addition, the instruction signal may also comprise information indicating implicitly the transmission power. For example, an absence of an explicit value, the UE may fall back to a predefined value. This may allow to have a low communication overhead. According to an embodiment, the instruction signal may be generated to comprise instructions indicating a plurality of sets of parameters such that the UE is instructed to transmit a plurality of positioning RS, each positioning RS having an associated spatial information and an associated transmission power. That is, a UE may be instructed to transmit a plurality of different positioning RS.

According to an embodiment, an embodied method is executed such that the parameters of the positioning RS are determined based on a channel condition of a set of channels the UE faces, e.g., LoS and/or nLoS paths to one or more TRPs, each channel comprising a beamformed signal travelling through a propagation channel and being received with an RX beam formed by the UE. That is, by receiving a signal through a propagation channel, the UE may determine the channel condition where the beamformed signal has faced.

According to an embodiment, the parameters of the positioning RS are determined based on a measurement report received from the UE. The measurement report may indicate a performance of a spatial reception filter characteristic, i.e., an RX beamformed by the UE (which includes an omnidirectional pattern if the UE antenna has an omnidirectional radiation characteristic), for receiving a DL RS transmitted by the wireless network. The method may be implemented such that for each of a plurality of DL RS at least one RX beam is formed with UE, wherein the measurement report is provided so as to indicate at least one of the formed RX beams. As discussed, the measurement report may be used to inform the network about its current situation, wherein this may provide for advantages when determining the parameters at the network side and when determining the parameters at the UE. The measurement report may be generated so as to indicate a relationship between the formed RX beams and a default RX beam. For example, the default RX beam may be a fall back RX beam such that the network not only receives information about the beam itself but also about the performance when compared to the default RX beam.

According to an embodiment, the parameters of the positioning RS are determined based on a measurement report received from the UE, the measurement report indicating a performance of a spatial reception filter characteristic. The measurement report may be generated for all links between the UE and a TRP that comprises a channel quality of at least a threshold value. This threshold value may be understood as all links that are known to the UE, e.g., based on a determined activity on the channel. However, limitation of such a full measurement report may be obtained by setting the threshold to a predefined minimum channel quality and/or to a predefined number of channels to be reported.

According to an embodiment, a method comprises determining a channel condition between at least one TRP that transmits a DL RS and the UE, wherein determining the channel condition comprises determining a reception quality of the DL RS. The DL RS may be, for example, at least one of a SSB related to a TRP not serving the UE, a DL positioning reference signal (DL-PRS), a CSI-RS and a PTRS.

According to an embodiment, a method comprises determining a pathloss between the UE and a plurality of TRP. The pathloss may be determined at a controller entity such as RRC or LMF. Based thereon, the positioning RS may be determined at least in parts based on the determined pathloss. That is, the UE may have knowledge about the signal it receives. Combined with the knowledge about the signal being transmitted the pathloss may be determined as described, for example, in connection with FIG. 10a. The instruction signal may indicate the positioning RS, a spatial filter to be used for transmitting the positioning RS and a signal power to be used for transmitting the positioning RS. According to an embodiment, the controller entity may be provided with information indicating a minimum needed input power to be received at each of the plurality of TRP and indicating a maximum allowed input power to be received at each of the plurality of TRP. That is, $P_{RX,min}$ and $P_{RX,max}$ may be provided. The method may further comprise calculating, using the controller entity, for at least the positioning RS and in combination with different spatial filters of the UE, a minimum transmission power and/or a maximum transmission power of the positioning RS for a respective spatial filter. The parameters of the positioning RS may be determined such that at least a first TRP and a second TRP, advantageously at least 3 TRP, at least 4 TRP or a higher number, receive the positioning RS with a receive power with at least a minimum reception power of the respective TRP and at most a maximum reception power of the TRP. More particular, the minimum reception power and the maximum reception power of all of the considered TRP may commonly be considered, i.e., the maximum transmission power may be selected such that none of the TRPs (at least in connection with the beams thereof (which are not deactivated) is oversaturated. That is, not only the separate TRPs may be considered, but it is also possible to jointly consider all of the TRP requirements.

The signal power, e.g., the transmission power, may thus be determined based on a measurement report received from the UE, the measurement report indicating a channel quality of DL channels from the plurality of TRP to the UE. The transmission power may be determined based on an assumed reciprocity of UL channels from the UE to the plurality of TRPs in view of the DL channels. That is, it may be assumed that the UL channel from the UE to the TRP provides for a same or a similar pathloss when compared to the DL channel.

In connection with at least some of the embodiments, reference was made to a method being implemented within a network. However, embodiments of the present invention are not limited hereto but also refer to UEs operating in a wireless communication network and to controller entities operating in such a network.

According to an embodiment, a user equipment (UE) configured for operating in a wireless communication network that supports a plurality of reference signals (RS) such as SRS is provided. The UE comprises a wireless interface configured for transceiving signals, wherein the UE is capable of beam forming with the wireless interface so as to form different beams. The UE is configured for receiving a first set of beam formed signals having at least one beam forming signal from a first TRP using at least a first spatial reception filter, and receiving at least a second set of beam formed signals having at least one beam formed signal from a second TRP using at least a second spatial reception filter. The UE is configured for analyzing a first channel condition between the first TRP and the UE and a second channel condition between the second TRP and the UE. The UE is configured for providing a measurement report indicating the first channel condition and the second channel condition, and reporting the measurement report to the wireless communication network such that the measurement report comprises a filter information indicating the first spatial reception filter and the second spatial reception filter which includes making the spatial filter index transparent to the network and includes associating an ID to the filter to identify the filter at the UE. Indicating the first spatial filter covers both options and combinations thereof. The UE is configured for receiving, based on the measurement report, for a positioning procedure in the wireless communication network, at least one instruction signal comprising information indicating parameters of a positioning RS, the parameters including at least an RS characteristic and a spatial information of the RS. The UE is configured for transmitting the positioning RS according to the instructed signal.

A UE that is adapted so as to determine the parameters, at least within boundaries, on its own may comprise a wireless interface configured for transceiving signals. The UE may be configured for receiving, for a positioning procedure and a wireless communication network, at least one instruction signal comprising information indicating instructions to the UE to transmit a positioning RS. The UE is configured for determining parameters of the positioning RS based on the instruction signal, determining a spatial relation of the UE, deriving a derived spatial filter to be used as based on the spatial relation and for transmitting the positioning RS using the derived spatial filter and using the parameters of the positioning RS.

In connection with a UE that is allowed or instructed to provide the measurement report, a controller entity configured for controlling at least a part of an operation of a wireless communication network that supports a plurality of RS, the wireless communication network comprising a plurality of TRPs, the wireless communication network being adapted to communicate with a UE is configured for transmitting, to the UE, a first set of beamformed signals having at least one beamforming signal from a first TRP and at least a second set of beamformed signals having at least one beamformed signal from a second TRP. The controller entity is configured for receiving a measurement report from the UE, indicating the first channel condition and the second channel condition. The controller entity is configured for evaluating the measurement report for a filter information indicating a first spatial reception filter associated with the first set of beamformed signals and a second spatial reception filter associated with the second set of beamformed signals. The controller entity is adapted for determining, based on the measurement report, parameters of a positioning RS, the parameters including at least an RS characteristic and a spatial information of the RS. The positioning RS is adapted based on a channel condition between the UE and at least the first TRP and the second TRP. The spatial information of the RS is determined based on the filter information. The controller entity is configured for transmitting, for a positioning procedure in the wireless communication network, to the UE at least one instruction signal comprising information indicating the parameters of the positioning RS. The controller entity. Is configured for receiving a first evaluation result indicating an evaluation of a reception of the positioning RS with the first TRP and receiving a second evaluation result indicating an evaluation of a reception of the positioning RS with the second TRP. The controller entity is adapted for determining a position of the UE in the wireless communication network based on the first evaluation result and the second evaluation result, optionally under consideration of additional receptions, e.g., of a third and a fourth reception of the positioning RS with a third and a fourth TRP.

In connection with the UE determining the parameters, a controller entity may be configured for transmitting, to the UE, information indicating boundaries of a parameter of a positioning RS within the boundaries to instruct the UE to select the parameter within the boundaries. Both implementations may be realized independently from each other but may also be implemented commonly, e.g., based on different operating modes of the network and/or the UE.

The UEs described in connection with the embodiments may be implemented, for example, as the UE 510 in wireless communication network 500. Controller entity may be implemented, at least in parts, at the LMF 410, at the s-gNB 200₁ and/or at a different, additional node. That is, embodiments also refer to a base station configured for operating at least a cell of a wireless communication network, the base station comprising a described controller entity. Further embodiments relate to a location server configured to operate in a wireless communication network, the communication server comprising a controller entity according to an embodiment.

Further embodiments relate to a wireless communication network having at least one UE and at least one controller entity as being described herein.

Both options being described herein, providing the measurement report as a basis for the parameters of the positioning RS and allowing the UE to determine the parameters may use a UE that makes measurements of downlink reference signals such as SSB, CSI-RS, DL-PRS or the like from multiple TRPs for its available spatial filters for the purpose of adapting beamforming at the UE and/or TRP and for power control of uplink positioning signals (e.g., SRS). The channel characteristic may be determined by measuring the downlink reference signal by one or more of an RSRP, a pathloss estimate, a ToA and/or a ToA difference between different spatial filters at the UE.

In a case where the network determines the beamforming and downlink reference signal for determining a power, the UE reports the measurements to the network entity, which may be the serving gNB or a location server, for example. The UE may make the UE spatial filter index transparent to the network and associate this ID to the downlink measurements made using this spatial filter. Alternatively or in addition, the UE may report the measurements made by a particular UE spatial filter index by internally associating this spatial filter to a downlink reference signal. According to an independent aspect in which the network entity determines the parameter such as the transmission power, and/or the symbols, type or characteristic of the positioning RS, the network may then refer to the UE downlink filter by this ID.

According to a dependent aspect, the UE may be configured to measure on certain downlink signals, e.g., provided by a systems data or support information.

According to a dependent aspect here from, the UE may report all links to the LMF for all of its spatial filters. Alternatively, the UE may partially process the measurement and down select which measurement to report in detail and which measurement reports fully. For a subset of the available spatial filters, the UE may down select a subset of downlink beams it is configured to measure and report the detailed measurement on these links, for other links, it may provide only consolidated information such as "too weak link/below threshold", "overloaded beams/above threshold", "optimal beam", "alternative beam", etc. That is, the described subsets do not exclude to provide additional information such as the described consolidated information. For example, such an embodiment is described in connection with example 7. The UE may provide for a selected reporting, together with the reporting of the beam combination of TRPs and UE, the network requests detailed measurement on.

According to another dependent aspect, based on the UE measurement report of downlink signals for spatial filters at the UE, the LMF may determine a combination of SRS resources needed to acquire the measurements for filling some criteria. The criteria may include but is not limited to at least one of the following combinations thereof:
1. reduction in a number of SRS resources used for positioning
2. reduction in total transmitted power
3. minimization of ToA error
4. identifying needed links, links for additional resilience, diversity and the like
5. optimizing radio resource usage among UEs, reducing mutual interference between UEs and the like.

Further dependent aspects relate to the LMF to also identify which beams at the TRP are needed to be activated to receive the transmitted SRS and report measurements back to the LMF, which beams should be deactivated at the TRP for all UEs when the considered UE is transmitting one or more of SRS resources identified.

Another dependent aspect relates to the LMF to signal the TRPs that are needed or selected to receive the signals from the UE to activate certain beams, optionally activate and/or make measurement on certain beams for resilience and/or signal to a TRP to turn off reception on certain beams based on the controller and the calculation.

According to another dependent aspect, the LMF may signal the s-gNB the configuration of SRS for positioning including the pathloss reference RS and spatial relation based on its computation.

As a further optionally dependent aspect, the LMF may identify downlink reference signals to use as fall back if the UE cannot accurately measure the pathloss reference RS and spatial relation. The s-gNB may additionally send these parameters in SRS configuration to the UE. If the UE fails to receive the above RS, the UE may use the default downlink RS for pathloss and spatial relation, which is the beam from which the UE decoded its MIB.

As a further dependent aspect, the UE may send a message to the network that it has used the fallback or the default pathloss RS/spatial relation, as opposed to the standard one.

As a further dependent aspect, signaling from the network to the UE is provided to indicate a change of spatial relation and/or of the power control, for example, using the RRC reconfiguration, a medium access control (MAC) control element (CE), and/or using layer 1 downlink control information (DCI).

As another independent aspect, which may, however, also rely on the determine channel characteristic, the UE may determine autonomously the UE beamforming and transmit power within a range specified by the network. The UE does not necessarily report the measurements. The UE may compute suitable power within the minimum and maximum range specified by the network and spatial filter (which could be one or more) for transmission of SRS, positioning RS. The instruction signal may contain minimum transmission power, maximum transmission power and/or equivalent isotopically radiated power. The network may mandate the UE to make measurements at least on a subset of downlink reference RS. Based thereon, the UE may transmit the SRS using the SRS configuration received from the network and the power/spatial relation. As a dependent aspect hereto, the spatial filter used for a measurement may be an omnidirectional antenna or omnidirectional reception characteristic.

Embodiments described herein allow the network to identify the suitable beams pointing of the TRP towards the UE and the selection of the spatial filter for the SRS for positioning used. Embodiments allow to reduce the number of SRS resources needed put forward for positioning use when compared to known concepts. Embodiments allow for a low or even minimum effort for power control, for a lower or even minimum amount of interference to other services and for optimizing the ToA measurement accuracy in a network. Furthermore, with simplified power control procedures, the latency for positioning services may be reduced.

Full reporting of measurement pertaining to all DL-RS and all UE spatial filters to the network may need a significant overhead. Therefore, the network may mandate the UE to make measurements on all beams it is configured to measure but only report back to the network on a smaller subset of these beams.

This subset of the DL RS on which the measurement needs to be conveyed to the network may be:
1) Explicitly configured by the network
2) Selected by the UE→Here the UE may choose to report only the measurements from the best beam of the TRP, only the measurement on the beam where oversaturation could occur, or on alternative beams or a combination of above. The criteria for selection may be specified by the network or be UE implementation specific.

Based on the computation from example 1, the beams on DL and UL which are optimum for reception at each of the TRP, which beams can still be received at the TRP and which beam are overloaded can be computed.

Provided that the UE knows the following either by inferring or by explicit assistance data, it can make the computations done in example 1. To allow this, a UE may be provided the following data by the network:
1) The transmit power of the downlink reference signals.
2) The dynamic range of the TRP in terms of offset from the reference power level (Pref) intended to be received at the TRP (oversaturation limit and minimum detectable threshold).
   The range may be same network-wide or specified individually for each TRP.

In the following an outline of some of the embodiments described herein is given:
(1) A method for selecting the SRS (Sounding Reference Signal) configuration to be transmitted by a UE (User Equipment), characterized by:
  a. Receiving from the UE a measurement report on the analysis performed on DL RS serving and neighboring TRP, and
  b. Receiving information on the UE Rx-spatial filters in relation with the measurement report, and
  c. Determining based on (a) and (b) a configuration for the SRS resource and resource set
  d. Provide an indication on the Tx-spatial filter the UE shall select per SRS resource configuration
(2) A method according to item 1 where the measurement reports are provided for all available links.
(3) A method according to item 1, where the information in 1b. include an indication whether the spatial filter used to receive a DL-RS was the same as the Rx-Default spatial filter
(4) A method according to item 1, where the SRS transmission is configured for the neighboring TRPs
(5) A method according to item 2 where only links with a signal quality sufficient to detect the SSB ID
(6) A method according to item 2 where the RRC or LMF provides assistance data to the UE allowing the detection of SSBs received at low signal quality
(7) A method according item 1 where the RRC or LMF selects a subset of the spatial filters supported by the UE and the UE reports the signal quality of the other SSBs received through these spatial filters.
(8) A method according item 1 where the UE selects a subset of the spatial filters supported by the UE and the UE reports the signal quality of the other SSBs received through these spatial filters.
(9) A method according item 5 or 6 where the UE filter is defined by an index
(10) A method according item 5 or 6 where the UE filter is defined by a spatial relationship to a SSB
(11) A method according any of the preceding items where the report are based on RSRP
(12) A method according any of the preceding items where the report includes SINR values
(13) A method according to any of the preceding items where the RRC or LMF provides assistance data and where the signal strength is determined by correlation techniques
(14) A method according to any of the preceding items where the report includes additional signal characteristics (e.g. CIR characteristics, K-factor estimates, ... )

Items related to the RRC procedure
(15) A method according to item 1 where the RRC knows the transmit power of each DL beam of all TRPs and can calculate the pathloss
(16) A method according to item 13 where the RRC knows the minimum needed input power ($P_{RX,min}$) and the maximum allowed input power (Pmax) for each TRP receive beam and can calculate the needed minimum and maximum SRS transmit power for each UE spatial filter and TRP RX beam configuration assuming reciprocal behavior of the channel (propagation and antenna characteristics).
(17) A method according to item 14 where the RRC can select according to the calculated Pmin and Pmax the needed SRS resources, and the allowed SRS transmit power range defined by Pmin and Pmax.
(18) A method according to item 15 where the RRC configures the SRS transmit power directly by setting alpha=0
  $P_{0,SRS}$=desired value
  $P_{CMAX}$ to any value greater or equal to $P_{0,SRS}$
(19) A method according to item 15, where alpha >0 is used and the signal level is adjusted continuously by the UE, where the UE
  measures the DL RS according the selected spatial relationship
  The $P_{0\_SRS}$ is set to ensure that for the nominal pathloss and the selected alpha the resulting power level is $>=P_{min}$ In the following, additional embodiments and aspects of the invention will be described which can be used individually or in combination with any of the features and functionalities and details described herein.

According to a first aspect, a method for operating a wireless communication network that supports a plurality of reference signals (RS) such as sounding reference signals comprises: receiving, with a user equipment (UE), a first set of beamformed signals having at least one beamforming signal from a first transmission and reception point (TRP) using at least a first spatial reception filter; and at least a second set of beamformed signal having at least one beamformed signal from a second TRP using at least a second spatial reception filter; analyzing a first channel condition between the first TRP and the UE and a second channel condition between the second TRP and the UE; providing a measurement report indicating the first channel condition and the second channel condition; and reporting the measurement report to the wireless communication network such that the measurement report comprises a filter information indicating the first spatial reception filter and the second spatial reception filter; determining, based on the measurement report, parameters of a uplink RS, the parameters including at least a RS characteristic and a spatial information of the RS; wherein the uplink RS is adapted based on a channel condition between the UE and at least the first TRP and the second TRP; receiving, with the UE, at least one instruction signal comprising information indicating the parameters of the uplink RS; transmitting the uplink RS with the UE; receiving the uplink RS with the first TRP and evaluating reception of the first TRP to obtain a first evaluation result and receiving the uplink RS with the second TRP and evaluating reception of the second TRP to obtain a second evaluation result; and determining uplink transmission links for a UE multi-TRP communication or estimating, for a positioning procedure in the wireless communication network, a position of the UE in the wireless communication network based on the first evaluation result and the second evaluation result.

According to a second aspect when referring back to the first aspect, the filter information includes information transparently indicating the first spatial filter and/or the second spatial filter; or includes information that is unambiguously associated with the first spatial filter and/or the second spatial filter at the UE.

According to a third aspect when referring back to any one of the first to second aspects, analyzing the channel condition comprises selecting a first spatial filter characteristic matching the first set of beamformed signals and selecting a second spatial filter characteristic matching the second set of beamformed signals; such that the filter information indicates the first spatial filter characteristic and the second spatial filter characteristic.

According to a fourth aspect when referring back to any of the previous aspects, determining the parameters of the uplink RS comprises deriving information indicating a derived spatial filter being associated with the spatial information of the uplink RS.

According to a fifth aspect when referring back to any of the previous aspects, the UE is instructed to transmit a plurality of uplink RS for the positioning procedure.

A sixth aspect relates to a method for operating a wireless communication network that supports a plurality of reference signals (RS) such as sounding reference signals, the method comprising: receiving, with a user equipment (UE), at least one instruction signal comprising information indicating instructions to the UE to transmit an uplink RS; determining parameters of the uplink RS with the UE and based on the instruction signal; determining, using the UE, a spatial relation of the UE; deriving a derived spatial filter to be used by the UE based on the spatial relation; transmitting the uplink RS with the UE using the derived spatial filter and using the parameters of the uplink RS; receiving the uplink RS with the TRP and evaluating reception of the TRP to obtain an evaluation result; and determining uplink transmission links for a UE multi-TRP communication or estimating, for a positioning procedure in the wireless communication network, a position of the UE in the wireless communication network based on the evaluation result.

According to a seventh aspect when referring back to the sixth aspect, the method comprises receiving, e.g., as part of the instruction signal, information indicating boundaries of the parameters such that the UE determines the parameters of the uplink RS within the boundaries.

According to an eighth aspect when referring back to any one of the sixth or seventh aspects, the parameters comprise a minimum value and/or a maximum value of at least one of: a transmission power of the uplink RS; and an equivalent isotropically radiated power.

According to a ninth aspect when referring back to any one of the sixth to eighth aspects, determining the parameters of the uplink RS and/or determining of the spatial relation of the UE is executed based on measurement data obtained with the UE, the method comprising: analyzing a channel condition between at least one transmission and reception point (TRP) of the wireless communication network and the UE of the wireless communication network with the UE; such that the uplink RS is adapted based on the channel condition between the UE and the at least one TRP.

According to a tenth aspect when referring back to any one of the sixth to ninth aspects, the UE is adapted to not report the determined channel condition to the network.

According to an eleventh aspect when referring back to any one of the sixth to tenth aspects, the method further comprises: analyzing a channel condition between the TRP and the UE; and providing a measurement report indicating the channel condition; and reporting the measurement report to the wireless communication network; such that the parameters of the uplink RS are determined based on the measurement report.

According to a twelfth aspect when referring back to the eleventh aspect, the method further comprises: receiving, with the UE, a set of beamformed signals having at least one beamforming signal from the TRP; such that analyzing the channel condition comprises selecting a spatial filter characteristic matching the set of beamformed signals; and such that the measurement report indicates the spatial filter characteristic.

According to a thirteenth aspect when referring back to any one of the ninth to twelfth aspects, wherein the at least one TRP is a TRP not serving the UE.

According to a fifteenth aspect when referring back to any one of the previous aspects, the method comprises: determining a transmission power for the uplink RS; such that the parameters of a uplink RS indicated in the instruction signal comprise information indicating the transmission power of the uplink RS being used by the UE.

According to a sixteenth aspect when referring back to the fifteenth aspect, the transmission power is determined as a fixed value; or the transmission power is determined by configuring and transmitting a RS, receiving the RS with the UE and using the RS to adjust the transmit power according to measurements on a downlink signal by the UE.

According to a seventeenth aspect when referring back to any one of the previous aspects, at least one parameter of the uplink RS is indicated in the instruction signal, e.g., as a boundary, by a minimum value and/or a minimum value so as to define at least a part of a value interval; wherein the UE selects a value of the parameter within the value interval.

According to an eighteenth aspect when referring back to the seventeenth aspect, the parameters of a uplink RS include a transmission power of the uplink RS, wherein the instruction signal indicates at least one of: a minimum transmission power; a maximum transmission power; and an equivalent isotropically radiated power (EIRP).

According to a nineteenth aspect when referring back to any of the previous aspects, the instruction signal is generated to comprise instructions indicating a spatial information of the uplink RS, a RS characteristic and a transmission power to be used for transmitting the uplink RS.

According to an twentieth aspect when referring back to the nineteenth aspect, the instruction signal is generated to comprise instructions indicating a plurality of sets of parameters such that the UE is instructed to transmit a plurality of uplink RS each having an associated spatial information and an associated transmission power.

According to a twenty-first aspect when referring back to any one of the previous aspects, the method further comprises: instructing at least one TRP to deactivate at least partially at least one spatial reception pattern during a time interval in which the UE transmits the uplink RS, wherein the at least one spatial reception pattern is determined based on the uplink RS, e.g., to avoid oversaturation at the TRP; and/or instructing at least one TRP to activate at least one spatial reception pattern during a time interval in which the UE transmits the uplink RS, wherein the at least one spatial reception pattern is determined based on the uplink RS, e.g., to receive the signal.

According to a twenty-second aspect when referring back to any one of the previous aspects, for determining the uplink transmission links or the position of the UE, the uplink RS transmitted by the UE is received with a plurality of TRP, the method comprising evaluating reception of the uplink RS at the plurality of TRP and determining the uplink transmission links or the position of the UE based on the evaluated receptions.

According to a twenty-third aspect when referring back to any one of the previous aspects, the TRP is a selected TRP which is selected for the positioning procedure based on a measurement report so as to receive the RS from the UE such that the instruction signal is generated so as to comprise the parameters of the uplink RS so as to be tuned with respect to the at least one TRP.

According to a twenty-fourth aspect when referring back to the twenty-third aspect, the parameters of the uplink RS are tuned with respect to the at least one TRP in a case where a prior determination of a pathloss RS in the wireless communication network is unsuccessful.

According to a twenty-fifth aspect when referring back to any one of the previous aspects, the parameters of the uplink RS are determined based on: determining a pathloss reference RS that is defined at a SRS resource set level of the wireless communication network; determining a spatial relation between the UE and the at least one TRP; and determining a nominal receive power of the TRP that is defined at the SRS resource set level of the wireless communication network.

According to a twenty-sixth aspect when referring back to the twenty-fifth aspect, determining the pathloss reference RS comprises a quasi-colocation (QCL) of at least two RS.

According to a twenty-seventh aspect when referring back to any one of the twenty-fifth or twenty-sixth aspects, determining the pathloss reference RS comprises: execution of a beam-sweeping process at the TRP to transmit a plurality of beams; scanning of the swept plurality of beams at the UE; reporting at least a result of the scanning to the network, e.g., using a measurement report; determining a beam pair based on the reporting, wherein one beam of the beam pair is one of the swept plurality of beams; and determining at least a part of a spatial information of the uplink RS based on the determined beam pair.

According to a twenty-eighth aspect when referring back to any one of the previous aspects, for transmitting the uplink RS, the UE tries to determine a pathloss RS or a spatial relation in the wireless communication network; wherein in a case where the determination is unsuccessful, the UE uses at least one of a default spatial relationship; a RS being tuned to a selected TRP, e.g., as a fallback RS, and a pathloss reference being tuned to the selected TRP; wherein the UE signals, to the network, the use of the default spatial relationship; the RS being tuned to the selected TRP, and/or the pathloss reference being tuned to the selected TRP.

According to a twenty-ninth aspect when referring back to any one of the previous aspects, a spatial relation and/or a pathloss reference used by the UE for transmitting the uplink RS is updated by use of at least one of: a radio resource control (RRC) reconfiguration; a medium access control (MAC) control element (CE); and a Downlink Control Information (DCI).

According to a thirtieth aspect when referring back to any one of the previous aspects, the parameters of the uplink RS are determined based on a channel condition of a set of channels the UE faces, each channel comprising a beamformed signal travelling through a propagation channel and being received with an RX beam being formed by the UE.

According to a thirty-first aspect when referring back to any one of the previous aspects, the parameters of the uplink RS are determined based on a measurement report received from the UE that indicates a performance of a spatial reception filter characteristic, i.e., a RX beam formed by the UE, for receiving a DL RS transmitted by the wireless network; wherein for each of a plurality of DL RS at least one RX beam is formed with the UE, wherein the measurement report is provided so as to indicate at least one of the formed RX beams.

According to a thirty-second aspect when referring back to the thirty-first aspect, the measurement report is generated so as to indicate a relationship between the formed RX beams and a default RX beam.

According to a thirty-third aspect when referring back to any one of the previous aspects, the UE determines a determined spatial relationship in the wireless communication network based on a ToA of DL RS jointly with a received signal reference power (RSRP) of the DL RS.

According to a thirty-fourth aspect when referring back to any one of the previous aspects, the parameters of the uplink RS are determined based on a measurement report received from the UE that indicates a performance of a spatial reception filter characteristic; wherein the measurement report is generated for all links between the UE and a TRP that comprise a channel quality of at least a threshold value, e.g., all links that are known to the UE.

According to a thirty-fifth aspect when referring back to any one of the previous aspects, the parameters of the uplink RS are determined based on a measurement report received from the UE that indicates a performance of a spatial reception filter characteristic, wherein the measurement report is generated so as to indicate at least one of: a received signal reference power (RSRP); a received signal reference quality (RSRQ); a signal to interference plus noise ratio (SINR); a Time of Arrival (ToA) of a DL RS; receive signal time difference (RSTD); a channel impulse response (CIR); and a K-factor, e.g., indicating a ratio of power received through a Line-of-Sight (LoS) path and at least one non-LoS path.

According to a thirty-sixth aspect when referring back to any one of the previous aspects, the parameters of the uplink RS are determined based on a measurement report received from the UE that indicates a performance of a spatial reception filter characteristic, wherein the measurement report is generated so as to indicate at least one of: a ToA Rx/Tx-Beam difference in which the UE measures the time of arrival (ToA) estimates on the DL RS and consistency check using different UE spatial filters; a signal quality in which the UE measures the signal quality (in respect to the expected ToA measurement performance) form the DL RS based on an estimate for the channel characteristics (LoS/nLoS detection, PDP profile, . . . ); a reference signal receive power (RSRP); a reference signal receive quality (RSRQ); a signal to interference plus noise ratio (SINR), a difference between RSRP; a RSRP of strong signals only; a RSRP of a number of best links to a TRP related to a spatial filter of the UE; an ID of a number of best links to a TRP related to a spatial filter of the UE; an index of a number of useful links, e.g., having a RSRP above a threshold; and a default spatial filter.

According to a thirty-seventh aspect when referring back to any one of the previous aspects, the method comprises: providing support information comprising assistance data or measurement configuration and system information to the UE, the support information comprising information related to a RS supported in the wireless communication network; transmitting the RS; and receiving the RS with the UE; in which the UE reports the RSRP difference only; and providing a measurement report with the UE, the measurement report indicating a channel condition between the UE and at least one TRP determined by the UE.

According to a thirty-eighth aspect when referring back to the thirty-seventh aspect, the support information is provided by a radio resource control (RRC) entity, e.g., as system information and/or measurement configuration, and/or a location management function (LMF) entity of the wireless communication network, e.g., as assistance data.

According to a thirty-ninth aspect when referring back to any one of the thirty-seventh or thirty-eighth aspects, the method comprises determining a channel condition between the UE and a TRP based on a correlation technique and using the support information for the correlation technique.

According to a fortieth aspect when referring back to any one of the previous aspects, the method comprises: providing the UE with information indicating a subset of a set of spatial filters supported by the UE, transmitting a set of DL RS with at least one TRP; determining a channel condition between the at least one TRP and the UE by using only the subset of spatial filters at the UE; and reporting the reception quality to the network, e.g., as part of a measurement report.

According to a forty-first aspect when referring back to any one of the previous aspects, the method comprises: selecting at the UE a subset of a set of spatial filters supported by the UE, the subset related to a TRP, e.g., serving the UE; and transmitting a set of DL RS with at least one TRP; determining a channel condition between the at least one TRP and the UE by using only the subset of spatial filters at the UE; and reporting the reception quality to the network, e.g., as part of a measurement report.

According to a forty-second aspect when referring back to any one of the fortieth of forty-first aspects, the spatial filters of the subset of spatial filters are distinguished from one another by a filter ID.

According to a forty-third aspect when referring back to any one of the fortieth to forty-second aspects, a spatial filter of the subset of spatial filters is determined based on a spatial relationship between the UE and an SSB.

According to a forty-fourth aspect when referring back to any one of the previous aspects, the method comprises determining a channel condition between at least one TRP transmitting a DL RS and the UE; wherein determining the channel condition comprises determining a reception quality of the DL RS.

According to a forty-fifth aspect when referring back to the forty-fourth aspect, the DL RS is one of: a synchronization signal block (SSB) related to a TRP not serving the UE; a DL positioning reference signal (DL-PRS); a channel state information reference signal (CSI-RS); and a phase tracking reference signal (PTRS).

According to a forty-sixth aspect when referring back to any one of the previous aspects, the uplink RS is a sounding RS (SRS).

According to a forty-seventh aspect when referring back to any one of the previous aspects, the method further comprises determining a pathloss between the UE and a plurality of TRP at a controller entity, e.g., a radio resource control (RRC); such that the uplink RS is determined at least in parts based on the determined path loss.

According to a forty-eighth aspect when referring back to the forty-seventh aspect, the instruction signal indicates the uplink RS, a spatial filter to be used for transmitting the uplink RS and a transmission power to be used for transmitting the uplink RS, the method comprising: providing the controller entity with information indicating a minimum needed input power to be received at each of the plurality of TRP; and indicating a maximum allowed input power to be received at each of the plurality of TRP; and calculating, using the controller entity, for at least the uplink RS and in combination with different spatial filters of the UE, a minimum transmission power and/or a maximum transmission power of the uplink RS for a respective spatial filter; and determining the parameters of the uplink RS such that that at least a first TRP and a second TRP receive the uplink RS with a receive power with at least a minimum reception power of the respective TRP and at most a maximum reception power of the TRP.

According to a forty-ninth aspect when referring back to the forty-eighth aspect, the transmission power is determined based on a measurement report received from the UE, the measurement report indicating a channel quality of downlink (DL) channels from the plurality TRP to the UE and based on an assumed reciprocity of UL channels from the UE to the plurality of TRPs in view of the DL channels.

According to a fiftieth aspect when referring back to any one of the forty-eighth to forty-ninth aspects, the instruction signal indicates, to the UE to select a transmission power for the uplink RS so as to comprise at least the minimum transmission power based on a minimum reception power of a plurality of TRP at most the maximum transmission power based on a maximum reception power of the plurality of TRP.

According to a fifty-first aspect when referring back to any one of the forty-seventh to fiftieth aspects, the controller entity of the wireless communication network sets a transmission power of the uplink RS by providing the instruction signals so as to comprise $\alpha=0$, $\alpha$ denoting a fractional pathloss compensation parameter; a value $P_{0,SRS}$ as a desired value; and a value for the maximum transmission power $P_{CMAX}$ as a value greater than $P_{0,SRS}$.

According to a fifty-second aspect when referring back to any one of the forty-seventh to fifty-first aspects, the UE measures the DL RS according the selected spatial relationship so as to determine the spatial relationship; wherein $\alpha$ is set to a value >0, $\alpha$ denoting a fractional pathloss compensation parameter; wherein the UE continuously or repeatedly adjusts a transmit power to be used for transmitting a uplink RS such that for the determined pathloss and the selected $\alpha$ a resulting transmit power level to be used for transmitting the uplink RS results in a reception power being larger than $P_{min}$ being a minimum reception power at a number of selected TRP.

According to a fifty-third aspect when referring back to any one of the previous aspects, the parameters of the uplink RS are determined based on a measurement report provided by the UE, the measurement report being: a full report indicating all configured DL RS on all available UE spatial filter configurations; a part of the full report being selected based on supporting information provided by the network so as to select a part of the full report of selected RS signals transmitted by at least one TRP; a part of the full report being selected so as to comprise information related to links subject of oversaturation, e.g., RS signals received at the UE with high power or low pathloss (if the UE knows the transmit power the UE can calculate the pathloss); and/or a part of the full report being selected by the based on a determined good combination of DL RS signals and UE spatial filters, e.g., so as to provide the measurement report for this subset only.

According to a fifty-fourth aspect when referring back to any one of the previous aspects, determining the parameters of the uplink RS comprises: evaluating a measurement report to determine the optimal configuring (or a configuration fulfilling the target requirements) the UE's SRS transmit spatial relation and transmit power control setting; and calculating, at a controller entity, e.g., the location server or the s-gNB, the set of SRS resources that are needed to ensure reception at certain selected TRPs from the set of TRPs available in the network; wherein the controller entity takes into account at least one or more of the following when determining the SRS resources: a target signal strength at the input of the TRP, which includes margin between the minimum power needed to evaluate the UL signal at the TRP and a target reference power, and/or a headroom margin to the maximum power at the input of the TRP causing oversaturation or impairments to other UL signals sharing the same frequency band; a transmit power of the reference signals that are used for downlink signal measurement, receive signal receive power (RSRP) reported by the UE (absolute value or difference between the RS signals); a signal quality indicated by the UE and/or an indicator which link may provide the best Time of Arrival (ToA) accuracy.

According to a fifty-fifth aspect when referring back to any one of the previous aspects, the UE is instructed to transmit a uplink RS aperiodically, semi-persistently and/or periodically.

According to a fifty-sixth aspect when referring back to the fifty-fifth aspect, the UE continuously updates the power setting of a semi-persistent or periodic transmission.

According to a fifty-seventh aspect when referring back to any one of the previous aspects, the position of the UE is determined repeatedly based on adjusting an allocation based on measurements at the TRPs or by requesting new measurements from the UE.

According to a fifty-eighth aspect when referring back to any one of the previous aspects, the position of the UE is determined based on at least one of: UL-TDOA (Uplink-Time Difference Of Arrival); Multi-RTT (Round Trip Time with multiple TRPs); AoA (angle of arrival) with multiple TRPs; and Uplink map-based positioning (fingerprinting).

According to a fifty-ninth aspect when referring back to any one of the previous aspects, the parameters of the uplink RS are determined based on measurement report provided by the UE, the measurement report comprising at least one of: a table of all values (according to the selected measurements); a reporting of difference of at least one measured value; a reporting of maximum values; One value per TRP to allow a decision if the TRP is useful, and a related index; Best values (two or more) versus TRP (useful to estimate gain of gNB processes more than one receive beam per TRP); Best values (two or more) versus UE spatial filter (useful to estimate gain if more SRS resources are transmitted Min/max versus UE spatial filters (useful to detect UE characteristics and to estimate the potential gain of additional SRS resources); Reporting of good combinations: The UE selects already useful links and provides the reports for this subset only.

According to a sixtieth aspect when referring back to any one of the previous aspects, the parameters of the uplink RS are determined based on measurement report provided by the UE, the measurement report being received by a wireless signal of the wireless communication network or by a sidelink.

A sixty-first aspect relates to a computer readable digital storage medium having stored thereon a computer program having a program code for performing, when running on a computer, a method according to one of previous aspects.

A sixty-second aspect relates to a user equipment (UE) configured for operating in a wireless communication network that supports a plurality of reference signals (RS) such as sounding reference signals, the UE comprising: a wireless interface configured for transceiving signals; wherein the UE is capable of beamforming with the wireless interface so as to form different beams; wherein the UE is configured for receiving a first set of beamformed signals having at least one beamforming signal from a first transmission and reception point (TRP) using at least a first spatial reception filter; and at least a second set of beamformed signals having at least one beamformed signal from a second TRP using at least a second spatial reception filter; wherein the UE is configured for analyzing a first channel condition between the first TRP and the UE and a second channel condition between the second TRP and the UE; wherein the UE is configured for providing a measurement report indicating the first channel condition and the second channel condition; and reporting the measurement report to the wireless communication network such that the measurement report comprises a filter information indicating the first spatial reception filter and the second spatial reception filter; wherein the UE is configured for receiving, based on the measurement report, at least one instruction signal comprising information indicating parameters of a uplink RS, the parameters including at least a RS characteristic and a spatial information of the RS; and wherein the UE is configured for transmitting the uplink RS according to the instruction signal.

A sixty-third aspect relates to a user equipment (UE) configured for operating in a wireless communication network that supports a plurality of reference signals (RS) such as sounding reference signals, the UE comprising a wireless interface configured for transceiving signals; wherein the UE is configured for: receiving at least one instruction signal comprising information indicating instructions to the UE to transmit a uplink RS; determining parameters of the uplink RS and based on the instructions signal; determining a spatial relation of the UE; deriving a derived spatial filter to be used based on the spatial relation; and transmitting the uplink RS using the derived spatial filter and using the parameters of the uplink RS.

A sixty-fourth aspect relates to a controller entity configured for controlling at least a part of an operation of a wireless communication network that supports a plurality of reference signals (RS) such as sounding reference signals, the wireless communication network comprising a plurality of transmission and reception points (TRPs), e.g., being part of a gNB, wherein the wireless communication network is adapted to communicate with a user equipment (UE), the controller entity being configured for: transmitting, to the UE, a first set of beamformed signals having at least one beamforming signal from a first TRP; and at least a second set of beamformed signal having at least one beamformed signal from a second TRP; receiving a measurement report from the UE, indicating the first channel condition and the second channel condition; and comprising a filter information indicating a first spatial reception filter associated with the first set of beamformed signals; and a second spatial reception filter associated with the second set of beamformed signals; determining, based on the measurement report, parameters of a uplink RS, the parameters including at least a RS characteristic and a spatial information of the uplink RS; wherein the uplink RS is adapted based on a channel condition between the UE and at least the first TRP and the second TRP, wherein the spatial information of the RS is determined based on the filter information; transmitting, to the UE, at least one instruction signal comprising information indicating the parameters of the uplink RS; receiving a first evaluation result indicating an evaluation of a reception of the uplink RS with the first TRP and receiving a second evaluation result indicating an evaluation of a reception of the uplink RS with the second TRP; and determining uplink transmission links for a UE multi-TRP communication or estimating for a positioning procedure in the wireless communication network, a position of the UE in the wireless communication network based on the first evaluation result and the second evaluation result.

A sixty-fifth aspect relates to a controller entity configured for controlling at least a part of an operation of a wireless communication network that supports a plurality of reference signals (RS) such as sounding reference signals, the wireless communication network comprising a plurality of transmission and reception points (TRPs), e.g., being part of a gNB, wherein the wireless communication network is adapted to communicate with a user equipment (UE), the controller entity being configured for: transmitting, to the UE, information indicating boundaries of a parameter of a uplink RS within the boundaries to instruct the UE to select the parameter within the boundaries.

A sixty-sixth aspect relates to a base station configured for operating at least a cell of a wireless communication network, wherein the base station comprises a controller entity of aspect 61 or 62.

A sixty-seventh aspect relates to a location server configured to operate in a wireless communication network, wherein the communication server comprises a controller entity of aspect 61 or 62.

A sixty-eighth aspect relates to a wireless communication network comprising: at least one UE according to aspect 62 or 63; and at least one controller entity according to aspect 64 or 65.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for operating a wireless communication network that supports a plurality of reference signals (RS), the method comprising:
receiving, with a user equipment (UE), a first set of beamformed signals comprising at least one beamforming signal from a first transmission and reception point (TRP) using at least a first spatial reception filter; and
at least a second set of beamformed signals comprising at least one beamformed signal from a second TRP using at least a second spatial reception filter;
analyzing a first channel condition between the first TRP and the UE and a second channel condition between the second TRP and the UE;
providing a measurement report indicating the first channel condition and the second channel condition; and reporting the measurement report to the wireless communication network such that the measurement report comprises a filter information indicating the first spatial reception filter and the second spatial reception filter;
determining, based on the measurement report, parameters of an uplink RS, the parameters comprising at least a characteristic of the uplink RS and a spatial information of the uplink RS; wherein the uplink RS is adapted based on a channel condition between the UE and at least the first TRP and the second TRP;
receiving, with the UE, at least one instruction signal comprising information indicating the parameters of the uplink RS;
transmitting the uplink RS with the UE;
receiving the uplink RS with the first TRP and evaluating reception of the first TRP to acquire a first evaluation result and receiving the uplink RS with the second TRP and evaluating reception of the second TRP to acquire a second evaluation result; and
determining uplink transmission links for a UE multi-TRP communication or estimating, for a positioning procedure in the wireless communication network, a position of the UE in the wireless communication network based on the first evaluation result and the second evaluation result.

2. The method of claim 1, further comprising:
wherein analyzing the first channel condition and the second channel condition comprises selecting a first spatial filter characteristic matching the first set of beamformed signals and selecting a second spatial filter characteristic matching the second set of beamformed signals;
such that the filter information indicates the first spatial filter characteristic and the second spatial filter characteristic.

3. The method of claim 1, wherein determining the parameters of the uplink RS comprises deriving information indicating a derived spatial filter being associated with the spatial information of the uplink RS.

4. The method of claim 1, wherein at least one parameter of the uplink RS is indicated in the instruction signal so as to define at least a part of a value interval; wherein the UE selects a value of the parameter within the value interval.

5. The method of claim 1, wherein, for determining the uplink transmission links or the position of the UE, the uplink RS transmitted by the UE is received with a plurality of TRP, the method comprising evaluating reception of the uplink RS at the plurality of TRP and determining the uplink transmission links or the position of the UE based on the evaluated receptions.

6. The method of claim 1, wherein, for transmitting the uplink RS, the UE tries to determine a pathloss RS or a spatial relation in the wireless communication network; wherein in a case where the determination is unsuccessful, the UE uses at least one of a default spatial relationship; a RS being tuned to a selected TRP and a pathloss reference being tuned to the selected TRP;
wherein the UE signals, to the wireless communication network, the use of the default spatial relationship; the RS being tuned to the selected TRP, and/or the pathloss reference being tuned to the selected TRP.

7. The method of claim 1, wherein the parameters of the uplink RS are determined based on the measurement report received from the UE that indicates a performance of a spatial reception filter characteristic for receiving a DL RS transmitted by the wireless communication network; wherein for each of a plurality of DL RS at least one RX beam is formed with the UE, wherein the measurement report is provided so as to indicate at least one of the formed RX beams.

8. The method of claim 1, wherein the UE determines a determined spatial relationship in the wireless communication network based on a ToA of DL RS jointly with a received signal reference power (RSRP) of the DL RS.

9. The method of claim 1, wherein the parameters of the uplink RS are determined based on the measurement report received from the UE that indicates a performance of a spatial reception filter characteristic; wherein the measurement report is generated for all links between the UE and a TRP that comprise a channel quality of at least a threshold value.

10. The method claim 1, further comprising:
providing support information comprising assistance data or measurement configuration and system information to the UE, the support information comprising information related to a RS supported in the wireless communication network;
transmitting the RS; and receiving the RS with the UE; in which the UE reports an RSRP difference only; and
providing the measurement report with the UE, the measurement report indicating a channel condition between the UE and at least one TRP determined by the UE.

11. The method claim 1, comprising:
providing the UE with information indicating a subset of a set of spatial filters supported by the UE,
transmitting a set of DL RS with at least one TRP;
determining a channel condition between the at least one TRP and the UE by using only the subset of spatial filters at the UE; and
reporting a reception quality to the wireless communication network.

12. The method claim 1, comprising:
selecting at the UE a subset of a set of spatial filters supported by the UE, the subset related to a TRP; and
transmitting a set of DL RS with at least one TRP;
determining a channel condition between the at least one TRP and the UE by using only the subset of spatial filters at the UE; and
reporting a reception quality to the wireless communication network.

13. The method of claim 1, wherein the parameters of the uplink RS are determined based on the measurement report provided by the UE, the measurement report being:
a full report indicating all configured DL RS on all available UE spatial filter configurations;
a part of the full report being selected based on supporting information provided by the wireless communication network so as to select the part of the full report of selected RS signals transmitted by at least one TRP;
a part of the full report being selected so as to comprise information related to links subject of oversaturation; and/or
a part of the full report being selected based on a determined good combination of DL RS signals and UE spatial filters.

14. The method of claim 1, wherein the position of the UE is determined repeatedly based on adjusting an allocation based on measurements at the TRPs or by requesting new measurements from the UE.

15. The method of claim 1, wherein the parameters of the uplink RS are determined based on the measurement report provided by the UE, the measurement report being received using a wireless signal of the wireless communication network or using a sidelink.

16. A method for operating a wireless communication network that supports a plurality of reference signals, the method comprising:
receiving, with a user equipment, at least one instruction signal comprising information indicating instructions to the UE to transmit an uplink RS;
determining parameters of the uplink RS with the UE and based on the instruction signal;
determining, using the UE, a spatial relation of the UE;
deriving a derived spatial filter to be used by the UE based on the spatial relation;
transmitting the uplink RS with the UE using the derived spatial filter and using the parameters of the uplink RS;
receiving the uplink RS with a transmission and reception point (TRP) and evaluating reception of the TRP to acquire an evaluation result; and
determining uplink transmission links for a UE multi-TRP communication or estimating, for a positioning procedure in the wireless communication network, a position of the UE in the wireless communication network based on the evaluation result.

17. The method of claim 16, wherein determining the parameters of the uplink RS and/or determining of the spatial relation of the UE is executed based on measurement data acquired with the UE, the method comprising:
analyzing a channel condition between at least one transmission and reception point of the wireless communication network and the UE of the wireless communication network with the UE;
such that the uplink RS is adapted based on the channel condition between the UE and the at least one TRP.

18. The method of claim 16, wherein at least one parameter of the uplink RS is indicated in the instruction signal so as to define at least a part of a value interval; wherein the UE selects a value of the parameter within the value interval.

19. The method of claim 16, wherein, for determining the uplink transmission links or the position of the UE, the uplink RS transmitted by the UE is received with a plurality of TRP, the method comprising evaluating reception of the uplink RS at the plurality of TRP and determining the uplink transmission links or the position of the UE based on the evaluated receptions.

20. The method of claim 16, wherein, for transmitting the uplink RS, the UE tries to determine a pathloss RS or a spatial relation in the wireless communication network; wherein in a case where the determination is unsuccessful, the UE uses at least one of a default spatial relationship; a RS being tuned to a selected TRP and a pathloss reference being tuned to the selected TRP;
wherein the UE signals, to the wireless communication network, the use of the default spatial relationship; the RS being tuned to the selected TRP, and/or the pathloss reference being tuned to the selected TRP.

21. The method of claim 16, wherein the parameters of the uplink RS are determined based on a measurement report received from the UE that indicates a performance of a spatial reception filter characteristic for receiving a DL RS transmitted by the wireless communication network; wherein for each of a plurality of DL RS at least one RX beam is formed with the UE, wherein the measurement report is provided so as to indicate at least one of the formed RX beams.

22. The method of claim 16, wherein the UE determines a determined spatial relationship in the wireless communication network based on a ToA of DL RS jointly with a received signal reference power of the DL RS.

23. The method of claim 16, wherein the parameters of the uplink RS are determined based on a measurement report received from the UE that indicates a performance of a spatial reception filter characteristic; wherein the measurement report is generated for all links between the UE and a TRP that comprise a channel quality of at least a threshold value.

24. The method of claim 16, further comprising:
providing support information comprising assistance data or measurement configuration and system information to the UE, the support information comprising information related to a RS supported in the wireless communication network;
transmitting the RS; and receiving the RS with the UE; in which the UE reports a RSRP difference only; and
providing a measurement report with the UE, the measurement report indicating a channel condition between the UE and at least one TRP determined by the UE.

25. The method of claim 16, comprising:
providing the UE with information indicating a subset of a set of spatial filters supported by the UE,
transmitting a set of DL RS with at least one TRP;
determining a channel condition between the at least one TRP and the UE by using only the subset of spatial filters at the UE; and
reporting a reception quality to the wireless communication network.

26. The method of claim 16, comprising:
selecting at the UE a subset of a set of spatial filters supported by the UE, the subset related to a TRP; and
transmitting a set of DL RS with at least one TRP;
determining a channel condition between the at least one TRP and the UE by using only the subset of spatial filters at the UE; and
reporting a reception quality to the wireless communication network.

27. The method of claim 16, wherein the parameters of the uplink RS are determined based on a measurement report provided by the UE, the measurement report being:
a full report indicating all configured DL RS on all available UE spatial filter configurations;
a part of the full report being selected based on supporting information provided by the wireless communication network so as to select a part of the full report of selected RS signals transmitted by at least one TRP;
a part of the full report being selected so as to comprise information related to links subject of oversaturation; and/or
a part of the full report being selected based on a determined good combination of DL RS signals and UE spatial filters.

28. The method of claim 16, wherein the position of the UE is determined repeatedly based on adjusting an allocation based on measurements at the TRPs or by requesting new measurements from the UE.

29. The method of claim 16, wherein the parameters of the uplink RS are determined based on measurement report provided by the UE, the measurement report being received using a wireless signal of the wireless communication network or using a sidelink.

30. A user equipment configured for operating in a wireless communication network that supports a plurality of reference signals, the UE comprising:
    a wireless interface configured for transceiving signals;
    wherein the UE is capable of beamforming with the wireless interface so as to form different beams;
    wherein the UE is configured for receiving a first set of beamformed signals comprising at least one beamforming signal from a first transmission and reception point (TRP) using at least a first spatial reception filter; and at least a second set of beamformed signals comprising at least one beamformed signal from a second TRP using at least a second spatial reception filter;
    wherein the UE is configured for analyzing a first channel condition between the first TRP and the UE and a second channel condition between the second TRP and the UE;
    wherein the UE is configured for providing a measurement report indicating the first channel condition and the second channel condition; and reporting the measurement report to the wireless communication network such that the measurement report comprises a filter information indicating the first spatial reception filter and the second spatial reception filter;
    wherein the UE is configured for receiving, based on the measurement report, at least one instruction signal comprising information indicating parameters of a uplink RS, the parameters comprising at least a RS characteristic and a spatial information of the RS; and
    wherein the UE is configured for transmitting the uplink RS according to the instruction signal.

31. A user equipment configured for operating in a wireless communication network that supports a plurality of reference signals, the UE comprising
    a wireless interface configured for transceiving signals;
    wherein the UE is configured for:
    receiving at least one instruction signal comprising information indicating instructions to the UE to transmit a uplink RS;
    determining parameters of the uplink RS and based on the instructions signal;
    determining a spatial relation of the UE;
    deriving a derived spatial filter to be used based on the spatial relation; and
    transmitting the uplink RS using the derived spatial filter and using the parameters of the uplink RS.

32. A controller entity configured for controlling at least a part of an operation of a wireless communication network that supports a plurality of reference signals, the wireless communication network comprising a plurality of transmission and reception points, wherein the wireless communication network is adapted to communicate with a user equipment, the controller entity being configured for:
    transmitting, to the UE, a first set of beamformed signals comprising at least one beamforming signal from a first transmission and reception point (TRP); and at least a second set of beamformed signals comprising at least one beamformed signal from a second TRP;
    receiving a measurement report from the UE, indicating a first channel condition and a second channel condition; and comprising a filter information indicating a first spatial reception filter associated with the first set of beamformed signals; and a second spatial reception filter associated with the second set of beamformed signals;
    determining, based on the measurement report, parameters of a uplink RS, the parameters comprising at least a RS characteristic and a spatial information of the uplink RS; wherein the uplink RS is adapted based on a channel condition between the UE and at least the first TRP and the second TRP, wherein the spatial information of the RS is determined based on the filter information;
    transmitting, to the UE, at least one instruction signal comprising information indicating the parameters of the uplink RS;
    receiving a first evaluation result indicating an evaluation of a reception of the uplink RS with the first TRP and receiving a second evaluation result indicating an evaluation of a reception of the uplink RS with the second TRP; and
    determining uplink transmission links for a UE multi-TRP communication or estimating for a positioning procedure in the wireless communication network, a position of the UE in the wireless communication network based on the first evaluation result and the second evaluation result.

33. A base station configured for operating at least a cell of a wireless communication network, wherein the base station comprises the controller entity of claim 32.

34. A location server configured to operate in a wireless communication network, wherein the location server comprises the controller entity of claim 32.

* * * * *